United States Patent
Shah et al.

(10) Patent No.: US 12,538,204 B2
(45) Date of Patent: Jan. 27, 2026

(54) METHODS, APPARATUSES, ARCHITECTURES AND SYSTEMS FOR HANDLING LINK DEGRADATION AND/OR LINK FAILURE IN AN INTEGRATED ACCESS AND BACKHAUL (IAB) NETWORK

(71) Applicant: InterDigital Patent Holdings, Inc., Wilmington, DE (US)

(72) Inventors: Yogendra Shah, Exton, PA (US); Muhammad Fazili, Audubon, PA (US); Ravikumar Pragada, Warrington, PA (US); Arnab Roy, Phoenixville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 335 days.

(21) Appl. No.: 18/031,705

(22) PCT Filed: Oct. 14, 2021

(86) PCT No.: PCT/US2021/054987
§ 371 (c)(1),
(2) Date: Apr. 13, 2023

(87) PCT Pub. No.: WO2022/081845
PCT Pub. Date: Apr. 21, 2022

(65) Prior Publication Data
US 2023/0397084 A1    Dec. 7, 2023

Related U.S. Application Data

(60) Provisional application No. 63/125,153, filed on Dec. 14, 2020, provisional application No. 63/092,074, filed on Oct. 15, 2020.

(51) Int. Cl.
*H04W 40/12* (2009.01)
*H04W 40/22* (2009.01)

(52) U.S. Cl.
CPC ........... *H04W 40/12* (2013.01); *H04W 40/22* (2013.01)

(58) Field of Classification Search
None
See application file for complete search history.

(56) References Cited

U.S. PATENT DOCUMENTS

2019/0098682 A1 * 3/2019 Park ......................... H04L 1/08
2020/0100124 A1   3/2020 Hampel et al.
(Continued)

FOREIGN PATENT DOCUMENTS

WO   WO 2020090987 A1   5/2020
WO   WO 2020165278 A1   8/2020

*Primary Examiner* — Brian S Roberts
(74) *Attorney, Agent, or Firm* — Volpe Koenig

(57) ABSTRACT

An Integrated Access and Backhaul, IAB, node determines link degradation in a primary path to a first Distributed Unit, DU, of a gNB, establishes a secondary path with a second DU of a gNB, detects link failure in the primary path, releases the primary path and makes the second primary path as a new primary path. A first IAB donor node receives an indication of link degradation from an IAB node in a network managed by the first IAB donor node, determines that an available IAB node is in a network managed by a second IAB donor node, sends to the second IAB donor node a request to connect the IAB node with the second IAB donor node and, in case the request is accepted, requests the IAB node to connect with the second IAB donor node. An IAB can also measure channel quality for a first path to a first IAB donor node and for a second path to a second IAB donor node and, in case the channel quality of both the first path and the second path is below a threshold, duplicate traffic on both the first path and the second path, in case the channel quality of the first path is below the threshold and the channel quality of the second channel is above the threshold, send traffic only over the second path and, in case the (Continued)

channel quality of the first path is above the threshold, send traffic only over the first path.

20 Claims, 20 Drawing Sheets

(56) References Cited

U.S. PATENT DOCUMENTS

| | | | |
|---|---|---|---|
| 2021/0266815 A1* | 8/2021 | Wei | H04W 88/14 |
| 2021/0328911 A1* | 10/2021 | Majmundar | H04W 40/248 |
| 2022/0015011 A1* | 1/2022 | Liu | H04W 76/15 |
| 2022/0015176 A1* | 1/2022 | Ishii | H04W 24/04 |
| 2023/0171651 A1* | 6/2023 | Liu | H04W 76/12 |
| | | | 370/331 |
| 2023/0292359 A1* | 9/2023 | Tesanovic | H04W 72/542 |

* cited by examiner

METHODS, APPARATUSES, ARCHITECTURES AND SYSTEMS FOR HANDLING LINK DEGRADATION AND/OR LINK FAILURE IN AN INTEGRATED ACCESS AND BACKHAUL (IAB) NETWORK

CROSS REFERENCE TO RELATED APPLICATIONS

This application is a U.S. National Stage Application under 35 U.S.C. § 371 of International Patent Application No. PCT/US2021/054987, filed Oct. 14, 2021, which claims the benefit of U.S. Provisional Patent Application Nos. (i) 63/092,074, filed Oct. 15, 2020, and (ii) 63/125,153, filed Dec. 14, 2020, each of which is incorporated herein by reference in its entirety.

BACKGROUND 5G systems promise to address an increase in the number of devices connecting, a drive towards higher and higher data rates, and use of applications sensitive to time and error such as robotic control and gaming. These requirements have driven a need to introduce a micro-cellular network with much closer spacing than the traditional several kilometers for macro-base stations.

However, introducing micro-base stations brings a whole new set of problems. One is the need to lay out cabling from the micro-base station to the radio head, and from the micro-base station back to the control unit, such as for example a macro-base station.

In an effort to avoid the inflexibility and cost of laying down cables, 3GPP has introduced an Integrated Access and Backhaul (IAB) micro-base station node, which connects to other IAB nodes or an IAB donor node (a macro-base station) in a tree structure. The IAB nodes utilize the wireless access frequency bands in a shared manner for both access links from User Equipment (UEs) to IAB nodes and for backhaul links between IAB nodes. In the following description, IAB networks and mesh networks are used interchangeably.

In 5G networks, the gNB can be one single logical node or it may consist of a central unit (CU) and one or more distributed unit(s) (DU(s)). A CU is a logical node hosting radio resource control (RRC), service data adaptation protocol (SDAP) and packet data convergence protocol (PDCP) of the gNB that controls the operation of one or more DUs. A DU is a logical node hosting radio link control (RLC), medium access control (MAC) and physical (PHY) layers of the gNB. The CU and the DU(s) it controls are connected via the F1 interface. The F1 application protocol (F1-AP) is used for conveying the lower-layer configuration information of the radio bearers between the CU and DU, as well as the setting up of a GTP tunnel between the DU and CU for each radio bearer.

IAB networks build on the gNB CU/DU split architecture by enabling a much more denser deployment of DUs in a micro-cellular network architecture of IAB nodes. An IAB donor node comprises a CU and one or more DU, similar to a gNB. An IAB node comprises a DU functionality on one side and a mobile termination (MT) functionality, which is similar to a UE function, on the other side. The IAB node terminates the DU functionality and the IAB donor node terminates the CU functionality. Multiple IAB nodes may be used in a hop-by-hop manner in a tree structure terminating at an IAB donor node. Hop-by-hop backhaul connections are used between IAB nodes, between a DU of a parent node and an MT of a child IAB node. The MT part is used to communicate with a parent node and the DU part is used to communicate with a child IAB node or a UE. There is a wireless link between IAB nodes, which provides a backhaul connection to a parent node.

Together with the introduction of a micro-cellular infrastructure, use of massive multiple-input and multiple output (MIMO) and active beam-steering enables high data rate transfer between a UE and a serving micro-base station. However, it is common to experience radio link failures (RLF) due to obstructions or interference, resulting in loss of connectivity.

SUMMARY

In one aspect, the present principles are directed to a method performed in a network node that is part of a first network of a first top node, the method comprising upon determining link degradation in the first network, broadcasting a link degradation message to neighbor nodes, the link degradation message destined for the first top node and indicating request for path setup, buffering uplink, UL, data, receiving configuration information of a backhaul path from the network node to a target network node, attaching, using the configuration information, to the target network node and transmitting data of the uplink data to the target network node.

In a further aspect, the present principles are directed to a network node comprising memory configured to store program code instructions and at least one hardware processor configured to execute the program code instructions to, upon determining link degradation in the first network, broadcast a link degradation message to neighbor nodes, the link degradation message destined for the first top node and indicating request for path setup, buffer uplink, UL, data, receive configuration information of a backhaul path from the network node to a target network node, attach, using the configuration information, to the target network node, and transmit data of the uplink data to the target network node.

In a further aspect, the present principles are directed to a method, performed by a source node in a network with a first and a second multi-hop communications path to a destination node, the method comprising receiving channel quality and capacity measurements messages from child nodes on the first path and the second path in the network, computing, based on channel quality and capacity measurements on first path hops and second path hops, an aggregate channel quality and capacity measurement for the first path and for the second path that reflects an aggregate channel quality to the destination node, and based on the aggregate channel quality and capacity measurement for the first path and second path, sending traffic over one of: only the first path, only the second path and both the first path and the second path.

In a further aspect, the present principles are directed to a source node comprising memory configured to store program code instructions and at least one hardware processor configured to execute the program code instructions to receive channel quality and capacity measurements messages from child nodes on the first path and the second path in the network, compute, based on channel quality and capacity measurements on first path hops and second path hops, an aggregate channel quality and capacity measurement for the first path and for the second path that reflects an aggregate channel quality to the destination node, and based on the aggregate channel quality and capacity measurement for the first path and second path, send traffic over one of: only the first path, only the second path and both the first path and the second path.

In a further aspect, the present principles are directed to a method, performed by a network node in a first network that provides service to at least one device via a first top node in the first network, the method comprising sending a request to attach to at least one neighbor network node in a second network of a second top node to establish a control path, receiving a configuration to attach to the at least one neighbor network node to establish the control path, and after determining occurrence of a trigger event, sending a message to activate full communications over a selected neighbor network node of the at least one neighbor network node, wherein the selected neighbor network node has a backhaul path via the second top node.

In a further aspect, the present principles are directed to a network node comprising memory configured to store program code instructions and at least one hardware processor configured to execute the program code instructions to send a request to attach to at least one neighbor network node in a second network of a second top node to establish a control path, receive a configuration to attach to the at least one neighbor network node to establish the control path, and after determining occurrence of a trigger event, send a message to activate full communications over a selected neighbor network node of the at least one neighbor network node, wherein the selected neighbor network node has a backhaul path via the second top node.

In a further aspect, the present principles are directed to a method, performed by a network node in a first network that passes traffic over a first path through a parent node to a first top node in the first network, the method comprising receiving from the parent node a path reconfiguration and channel quality of a second path, and based on a determination whether the new path satisfies QoS requirements of current traffic, reconfiguring the first path to the second path.

In a further aspect, the present principles are directed to a network node comprising memory configured to store program code instructions and at least one hardware processor configured to execute the program code instructions to receive from the parent node a path reconfiguration and channel quality of a second path, and based on a determination whether the new path satisfies QoS requirements of current traffic, reconfigure the first path to the second path.

In a further aspect, the present principles are directed to a method, performed by a first top node of a first network, the method comprising after receiving notification that a network node in the network is reconfiguring to establish secondary paths through a second top node of a second network and determining that at least one service quality of traffic flow for at least one end device served by the network node cannot be served by the first top node, reconfiguring the at least one traffic flow to the second top node, and migrating an anchor for traffic steering, splitting, switching, and duplication to a new network node.

In a further aspect, the present principles are directed to a top node comprising memory configured to store program code instructions and at least one hardware processor configured to execute the program code instructions to after receiving, by the top node in a first network, notification that a network node in the network is reconfiguring to establish secondary paths through a second top node of a second network and determining that at least one service quality of traffic flow for at least one end device served by the network node cannot be served by the first top node, reconfigure the at least one traffic flow to the second top node, and migrate an anchor for traffic steering, splitting, switching, and duplication to a new network node.

BRIEF DESCRIPTION OF THE DRAWINGS

Furthermore, like reference numerals in the figures indicate like elements, and wherein.

EXAMPLE NETWORKS FOR
IMPLEMENTATION OF THE EMBODIMENTS

Figure 1A:
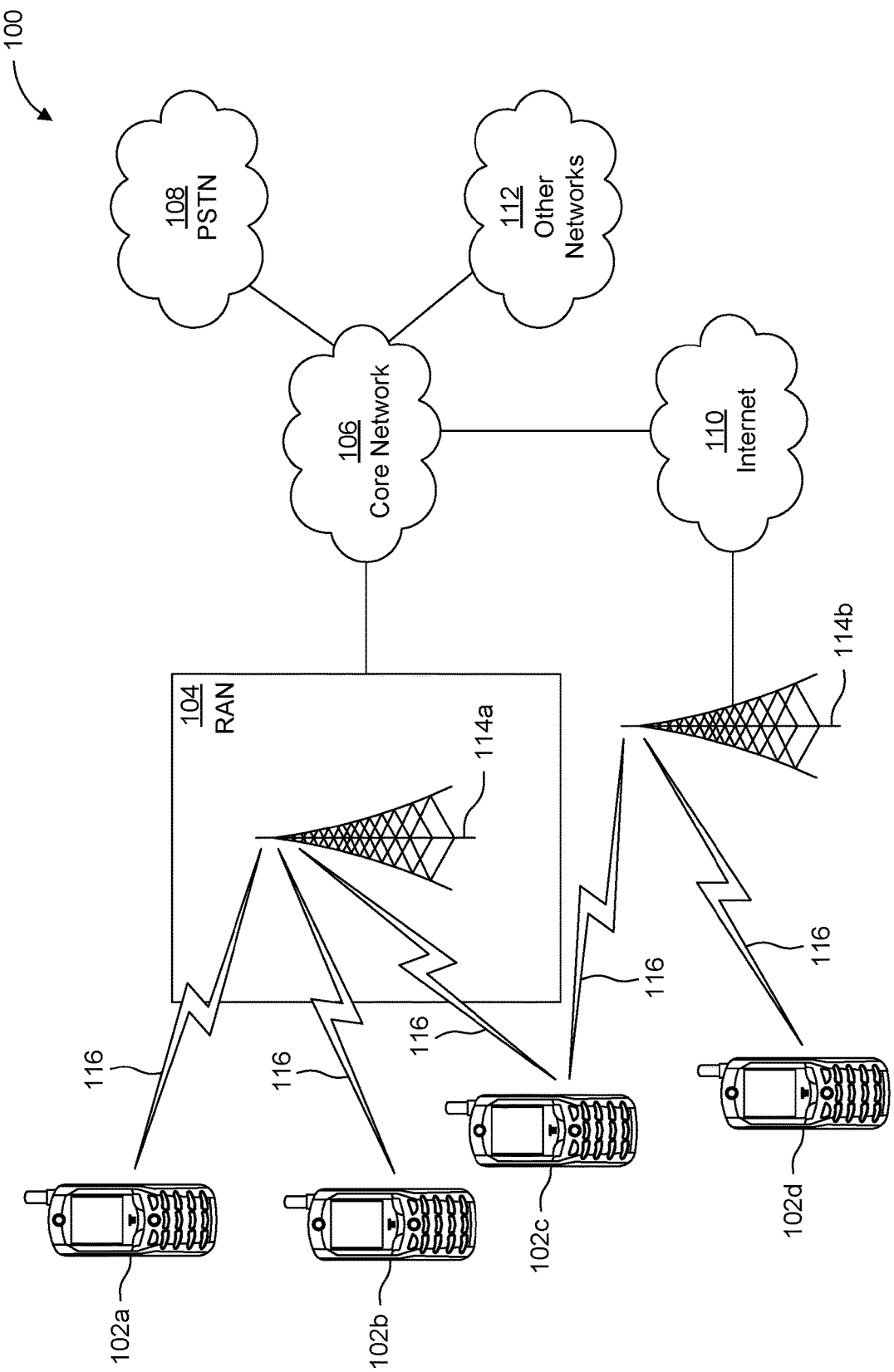
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a in the RAN 104 and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a in the RAN 104 and the WTRUs 102a, 102b, 102c may implement a radio technology such as NR Radio Access, which may establish the air interface 116 using New Radio (NR).

In an embodiment, the base station 114a in the RAN 104 and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The other networks 112 may include wired and/or wireless communications networks owned and/or operated by other service providers. For example, the other networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
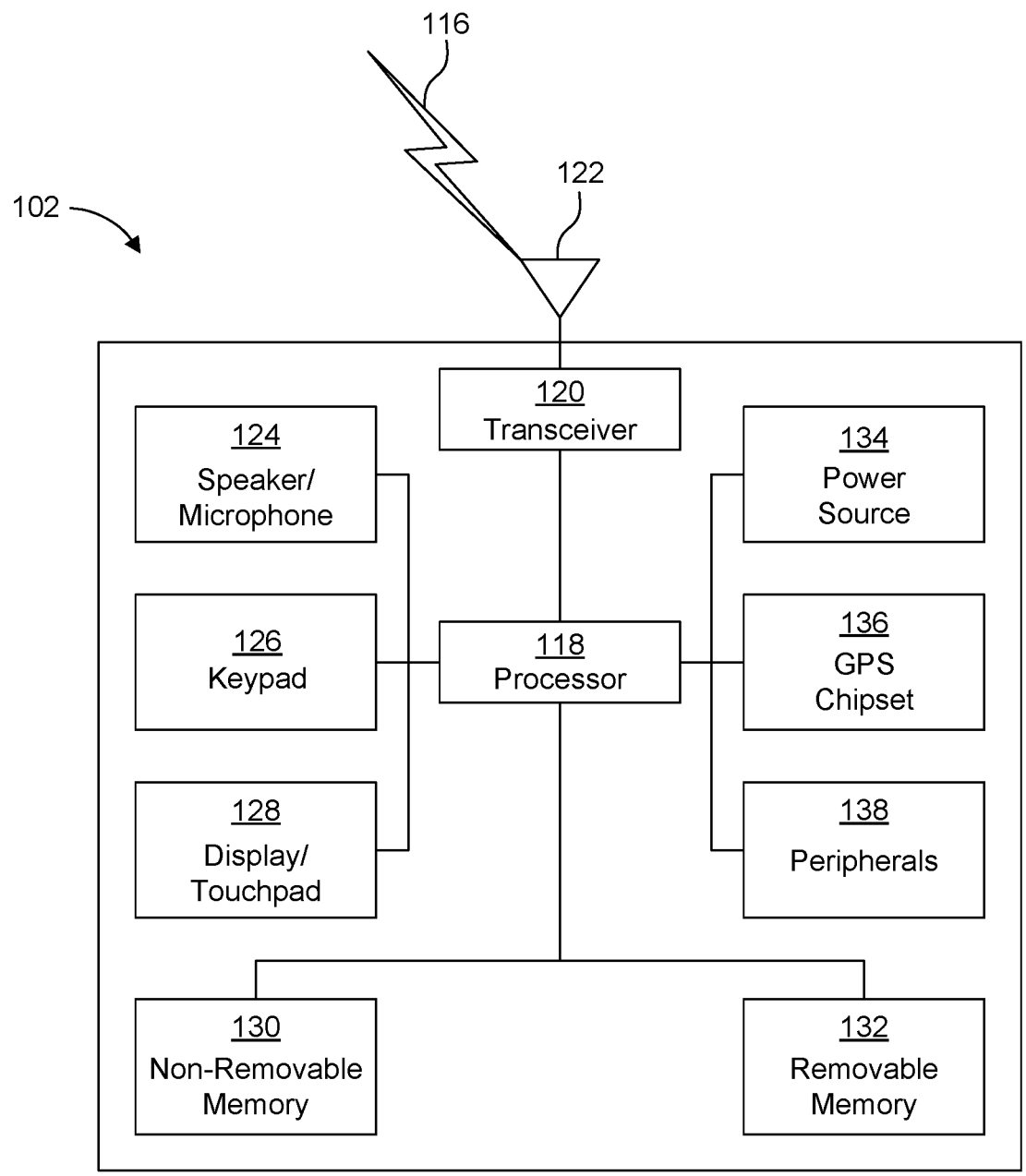
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a chipset 136 for a positioning system such as Global Positioning System (GPS), and/or other elements 138, among others. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a in FIG. 1A) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements 138, which may include one or more software and/or hardware modules that provide additional features, functionality and/or wired or wireless connectivity. For example, the elements 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The elements 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
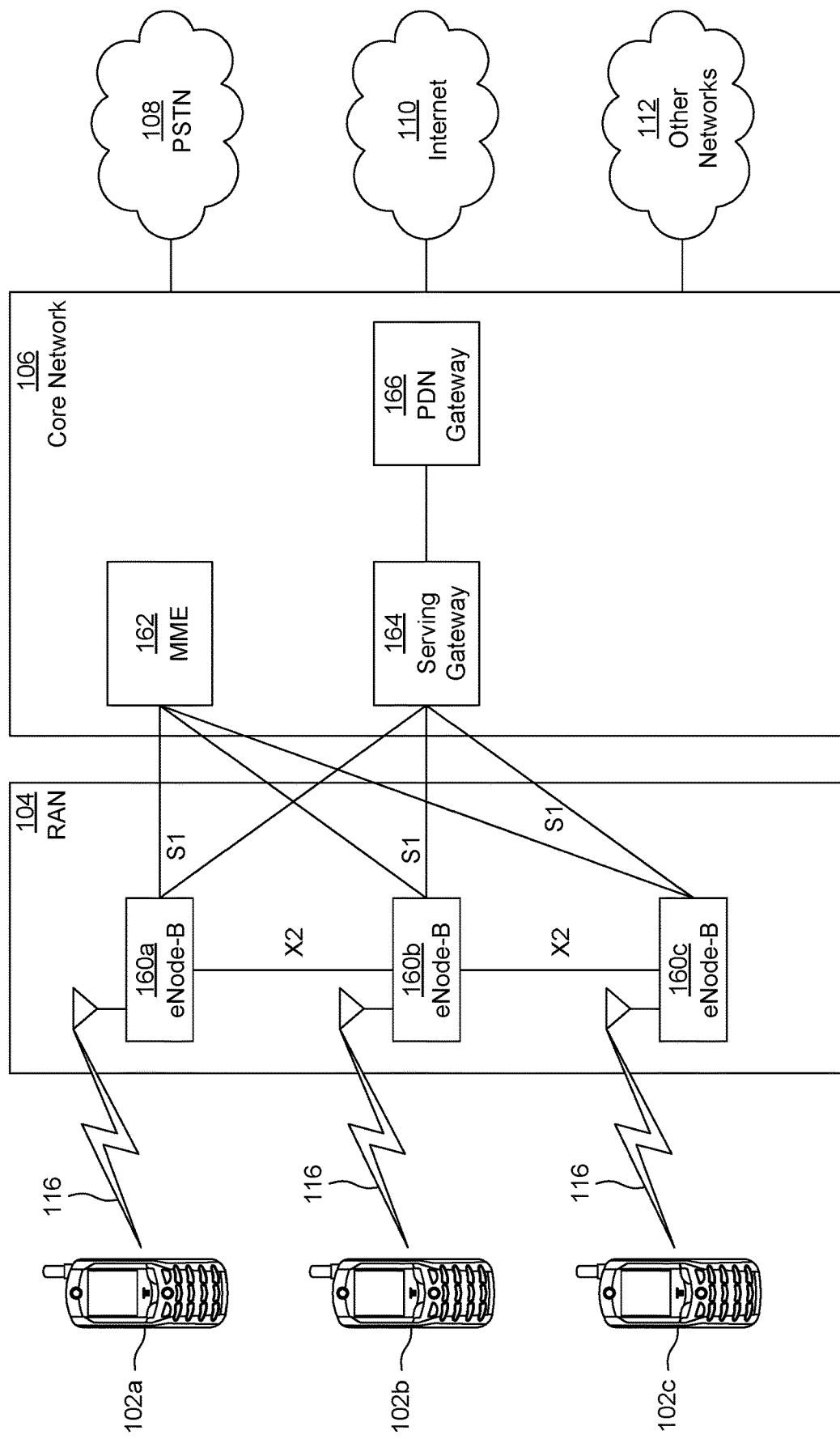
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
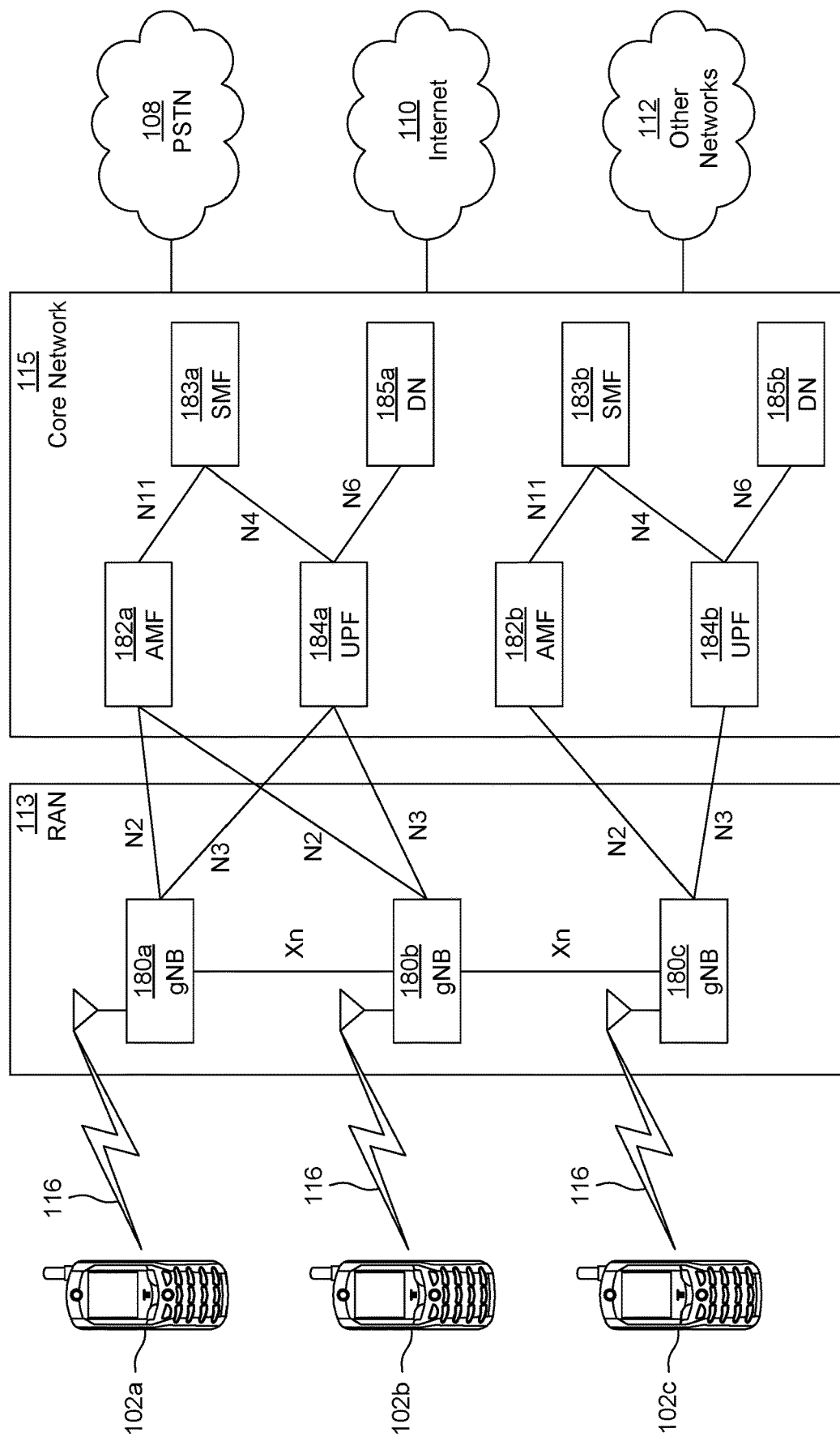
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b, 180c may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers (not shown) to the WTRU 102a. A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c in FIG. 1C). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

A mesh network is formed by connecting IAB nodes in a tree structure and in a hop-by-hop manner leading to an IAB donor node. The IAB nodes are internally connected by way of wireless links and the IAB donor nodes connect with the core network over a wired connection.

A UE may communicate with the network via its nearest IAB node that then forms a multi-hop backhaul path to an IAB donor node. Any of the hops along the End-to-end multi-hop (E2EMH) path may suffer a Radio Link Failure (RLF) due to degradation of link quality from interference or loss of coverage from obstructions. Given the nature of the multi-hop connectivity, a single RLF may impact the communications between child nodes and many UEs. Mechanisms are required to mitigate the impact of an RLF by detecting link degradation and by pre-emptive activation of an alternate path to a UE or by having access to an alternative path at all times.

Operations may be further impacted over a shared spectrum and require utilization of redundant paths to overcome latency problems caused due to a lack of channel availability at intermediate nodes. This may be caused by either co-channel interference from in-network or out-of-network transmitters or by temporary link degradation due to blockages, which at higher frequencies require directional transmissions. Local re-routing around degraded hop links could mitigate or overcome these problems.

UEs serviced by an IAB mesh network may suffer breakages and service interruption due to the occurrence of RLF on the backhaul. Given that communications are based on a multi-hop architecture, RLF on any one hop can disrupt service to many UEs. Detection of a link degradation and remediating this may improve service but may still continue to cause service disruption since channel conditions may change very quickly. Effectively and proactively addressing RLFs and can help maintaining continuity of service and robust service delivery.

The mesh link management procedures can be enhanced to make use of measurement information and mesh topology information to manage actively a primary E2EMH path and alternate paths to avoid interrupted communications to an impacted node and associated children node(s) and UEs due to an RLF.

Enhanced measurements together with the mesh topology information may be used to:
  Determine and actively manage an optimal primary E2EMH path.
  Determine alternate paths that bypass (avoid using) an RLF on a single hop of a primary E2EMH path, such as for example:
    a path that is locally coordinated at an impacted IAB node along the primary E2EMH path,
    a path that may be coordinated at an intermediate IAB node between the impacted IAB node and the IAB donor node of the primary E2EMH path,
    a path that may be coordinated at the IAB donor node of the primary E2EMH path, and
    a completely independent secondary E2EMH path that avoids any of the hops in the primary E2EMH path.

In multi-hop transmissions, each IAB donor node manages its own mesh network and IAB nodes.

There is typically little active coordination of traffic across the different mesh networks of different IAB donor nodes. Service delivery to UEs on the edge of two IAB donor node controlled mesh networks may suffer due to this lack of coordination. It could be useful to efficiently coordinate and share resources between two or more IAB donor nodes for inter-IAB donor node cooperation.

Enhanced support for integrating different mesh networks controlled by different IAB donor nodes and enabling IAB nodes to actively manage an integrated mesh topology could include one or more of:
  Having at least two parent paths for every IAB node.
  Establishing an initial integrated mesh network topology that may comprise multiple IAB donor nodes.
  Managing connectivity to one or more IAB donor nodes at the edge of two mesh networks.
  Adapting the mesh topology as the environment changes based on for example one or more of:
    short-term statistics and data to aid in dynamic mesh routing, and
    long-term statistics and data to adapt the static mesh topology view.
  Enabling IAB nodes to perform load balancing, perform diversity processing, handle multi-hop latency, and QoS requirements mapping.

IAB mesh network topology and management, including path determination, is conventionally under the control of an IAB donor node CU. However, in order to mitigate RLF and provide a rapid response to an RLF, it can be useful to provide more localized control of the mesh topology at each IAB node for routing decisions and topology management to circumvent RLFs and reduce the latency in recovering from an RLF.

Enhanced support for re-routing control of a mesh network can be used locally at IAB nodes to:
  Establish an initial integrated mesh network topology that may comprise multiple IAB donor nodes.
  Provide local information to each IAB donor node to enable this to perform re-routing to avoid an RLF on a hop of an E2EMH path that it is servicing.

Backhaul communications in an IAB mesh network are based on a hop-by-hop wireless backhaul path. Consequences of this approach is that there is a high likelihood of RLF impact on the communications for a UE. More robust mechanisms could help mitigate the effect of RLF.

Diversity processing in the form of dual connectivity or assignation of different beams to a primary and secondary path of a dual multi-hop path communications system can provide resiliency against RLF.

Figure 2:
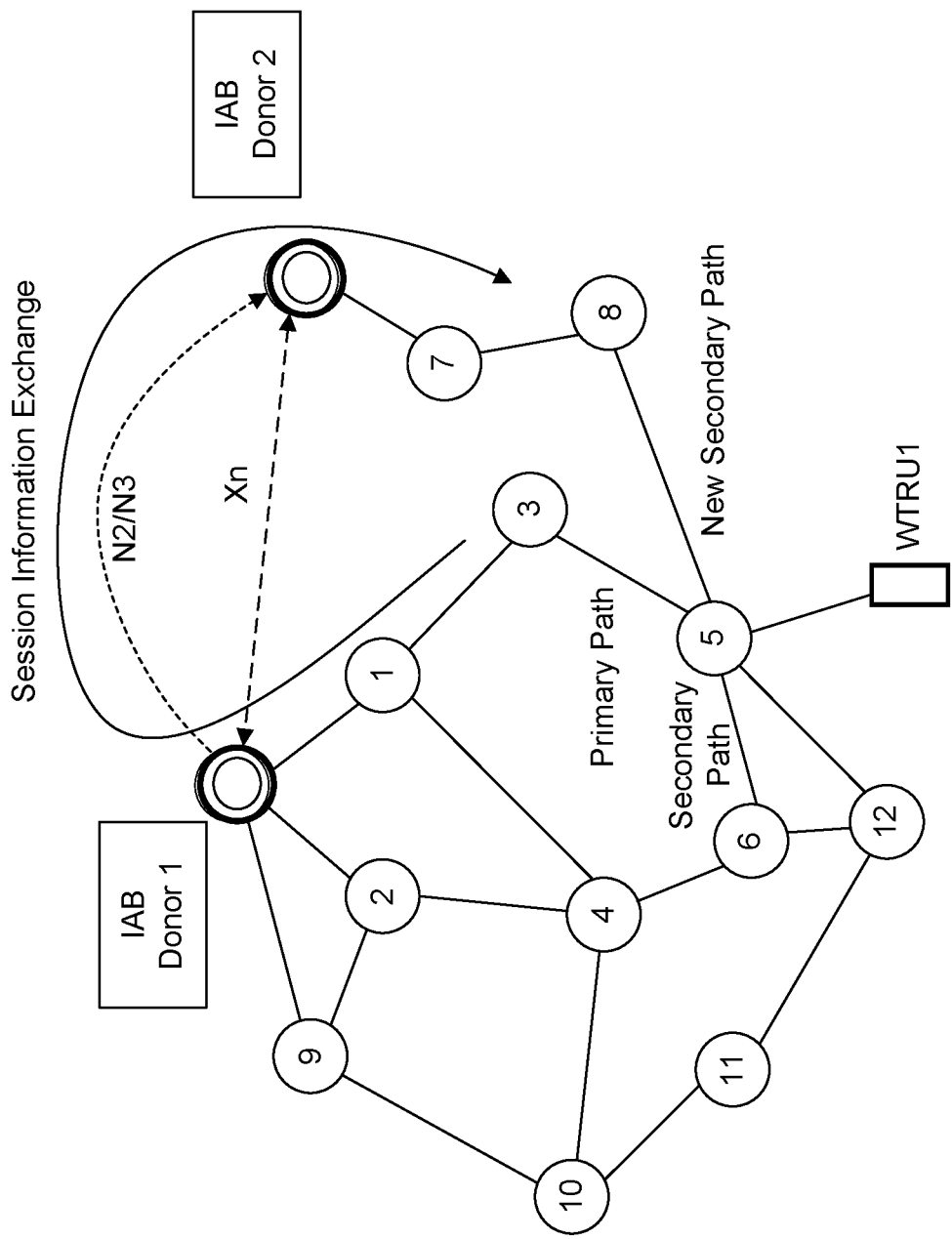
FIG. 2 illustrates an example mesh network including two IAB donor nodes according to an embodiment.

FIG. 2 illustrates an example mesh network including two IAB donor nodes, which will be used to illustrate various RLF mitigation techniques according to the present principles. FIG. 2 illustrates two IAB donor nodes, IAB donor 1 and IAB donor 2 connected by an Xn interface or an N2/N3 interface, a number of IAB nodes respectively identified by numbers 1-12. Each IAB node may be connected to one or more other IAB nodes and may also be connected to an IAB donor node. For example, IAB node 1 is connected to IAB nodes 3 and 4 and to IAB donor 1. Also illustrated is a WTRU, UE1, connected to IAB node 5.

The expression 'path' refers specifically to a multi-hop backhaul path from an IAB donor node to an IAB node serving a UE. An IAB donor node is typically connected to the core network by way of a fiber link. The IAB nodes are connected to a parent IAB donor node by way of wireless hop-by-hop backhaul links where the wireless bandwidth is shared between the backhaul and access links for UEs.

Service to UE1 may be achieved through a primary path that is a backhaul link path including IAB donor node 1, and IAB nodes 1, 3, and 5.

RLF mitigation techniques inherently depend on being able to work around an RLF. Alternative (i.e. secondary) paths may be partial work-arounds such as, for example, if there is an RLF on the link between IAB nodes 3 and 5 then a first secondary path is via IAB nodes 1, 4, 6, to 5.

Another secondary path to UE1, which is part of the IAB donor node 1 mesh network topology and independent of the path through IAB nodes 1 and 3 is from IAB donor node 1 through IAB nodes 2, 4, 6 and 5.

A further secondary path that is independent of both the path through IAB donor node 1 and IAB nodes 1 and 3 to 5 is via IAB donor node 2 to IAB node 7 and 8 to 5. This latter alternative path would require coordination of the mesh topologies and communications between various IAB nodes including IAB donor nodes 1 and 2. The Xn interface between these donor nodes may facilitate efficient communication and transfer of control signaling and session information when establishing paths and coordinating data communications.

The embodiments herein may be described with reference to the mesh topology illustrated in FIG. 2.

Mesh Network Measurements Processing

An IAB node providing backhaul services to at least one UE can determine the channel quality of a first hop in a multi-hop path to a destination node, receive, from the node on the first hop path, at least one parameter that may be used to determine the channel quality of the multi-hop path to the destination node, and determine the aggregate channel quality of the multi-hop path to the destination node based on the channel quality of the first hop path and the at least one parameter.

An IAB node comprises an MT and a DU where the MT provides connectivity for the IAB node to the DU of the parent node. The MT periodically performs measurements of its surrounding cells, during idle mode and connected mode, and reports these measurements to its parent IAB node, i.e. the IAB donor node, and the Radio Resource Management (RRM) entity in the network.

A new IAB node may wish to attach itself to a mesh network of an IAB donor node, either directly to the IAB donor node or indirectly via a 'child' IAB node of the mesh network. The attachment process is essentially the same as in a UE with a cell search followed by a random access procedure. Once the new IAB node is attached to the mesh network, the IAB donor node sends a configuration (e.g. Radio Resource Control, RRC, configuration) containing Backhaul Adaptive Protocol (BAP) configuration information, for example including:

- BAP address(es) and BAP path ID(s),
- at least one primary BAP routing ID,
- a default UL BAP routing ID and a default Backhaul (BH) Radio Link Control (RLC) channel, in order to configure UL mapping for F1-C traffic,
- a rank ordered preference list of neighbor node IDs that can be used to establish a route to a target IAB node serving an at least one UE or a route to an IAB donor node, and
- requirements for measurements to be performed and for measurement reports to be reported to the IAB donor node.

IAB donor nodes configure their child IAB nodes to provide measurement reports of their neighbor cells, indicated in a neighbor list provided by the IAB donor node, and their connected cell(s). The neighbor list may comprise intra-cell as well as inter-cell IAB donor nodes and their children IAB nodes, as determined during formation of the mesh topology by the IAB donor node. The neighbor list may include the cells that are part of the operator network as well as roaming partners with whom an inter-operator roaming arrangement exists. An IAB node performs measurements as per the configured measurements and reports back to the IAB donor node(s) in RRC measurements reports.

IAB node measurement information may include one or more of:

- Reference Signal Received Power (RSRP), Reference Signal Receive Quality (RSRQ), and Received Signal Strength Indication (RSSI) for each neighbor IAB node,
- RSRP, RSRQ, Signal-to-Interference-and-Noise Ratio (SINR), Received Signal Code Power (RSCP), based on Synchronization Signal Blocks (SSBs) or Channel-State Information Reference Signals (CSI-RS) for cell and beam channel measurements,
- Automatic Repeat reQuest (ARQ) request/response ACK/NACK and the timing of the received ACK/NACK over different paths,
- Buffer Status Reports (BSR) that help assess the backhaul load and traffic congestion,
- channel capacity metrics,
- Round Trip Time (RTT),
- latency, and
- number of hops to reach an end destination node.

These measurements may be aggregated in the DL for all of the hops from the IAB node to the destination IAB node and in the UL for all of the hops from the IAB node to the IAB donor node.

IAB nodes may transfer the measurements, in RRC measurement reports, directly to the IAB donor node using the F1 protocol or some other protocol that enables the individual nodes to directly send the information to their IAB donor node(s).

In an embodiment, IAB nodes may perform the measurements for itself and perform measurement processing to aggregate its children IAB nodes' measurements and then forward these measurements to their parent IAB node(s) and to the IAB donor node. IAB nodes may transmit the measurements to a parent IAB node by attaching a unique node ID for each measurement report.

Before reporting the measurements back to their parent nodes and eventually to the IAB donor node(s), IAB parent nodes may do one or more of the following:

- Append the measurements received from its children nodes with their own measurements, attach their BAP ID to the measurement report and send it to their parent IAB node. The individual IAB node to IAB node measurements may then be aggregated at the IAB donor node.
- Perform aggregated or cumulative measurements of different routes of their children IAB nodes and then add a route ID (or any other way of identifying the measurements of each route) to the cumulative measurements and then send the measurements to the IAB parent node.
- Measurements for each route or IAB node to IAB node may be sent in a Physical Uplink Control CHannel (PUCCH) or Physical Uplink Shared CHannel PUSCH back to the parent IAB donor node.

Based on the measurement reports, the IAB donor node may determine a mesh topology and the best backhaul route between the IAB donor node and each of its IAB nodes.

A pair of IAB nodes on either side of a hop may perform measurements of the quality of the backhaul radio link, in the UL and DL direction. The reported DL channel quality may be based on observing any combination of measurements including the cell measurements as well as measurements based on Demodulation Reference Signal (DM-RS) and CSI-RS. IAB nodes may also be configured to periodically report Cross Link Interference (CLI) RSSI to determine how much adjacent cell interference the nodes are experiencing. The UL channel quality measurements may be based on a Sounding Reference Signal (SRS) such as wideband Channel-Quality Indicator (CQI) or sub-band CQI. Sub-band CQI measurements may be important for IAB nodes to allocate fractional or BandWidth Part (BWP) resources.

For operations in mmWave spectrum, beam measurements may be required. For beam measurements, IAB nodes may monitor Synchronization Signal RSRP (SS-RSRP), SS-RSRQ and SS-SINR measurements to determine the beams to use for communications between an MT of an IAB node and the parent IAB node DU. Once an MT has determined a beam to use, it sends a Random Access CHannel (RACH) on that beam to the DU identifying to the DU the preferable beam it wishes to use for communications with the DU.

After the link is established, the MT continuously monitors the SSB or CSI-RS associated with an SSB to measure the SSB-RSRP, SSB-RSRQ or SSB-SINR.

Additional measurements of the quality of a link may supplement the physical layer measurements such as the status of the transmit packet buffer (BSR) or Round-Trip Time (RTT) measurements, such as the time to send and receive an echo request/response message between two nodes. Besides providing an indication of how heavily a node is loaded, the BSR report may also provide an indication of an impending problem if the buffer is not emptying due to excessive NACKs causing repeat transmissions. The round-trip time provides an indication of the quality of the channel, number of hops to reach the IAB donor node and receive a response, congestion in the network, and overall E2EMH path efficiency.

These measurements may also be monitored locally by IAB nodes and any deviations from an assessed average or norm may be used to trigger a request to the IAB donor node to perform a route update.

It is noted that the described reporting can use SINR as a measurement parameter. More sophisticated mechanisms may be used that combine the measurements of some or all of the described parameters with the objective of detecting a link degradation early and with a higher reliability.

End-to-End Multi-Hop Path Metrics

IAB donor nodes may collect measurement statistics for all of its IAB nodes and derive aggregated channel quality measurements for an E2E path. The single hop path enhanced metrics reported to an IAB donor node, from all hops of an E2EMH path, may be further processed to determine aggregate E2EMH path channel metrics. The aggregate metrics may be used to determine the E2EMH path channel quality and performance, in the form of, for example, QoS, throughput, latency, channel capacity, and channel usage efficiency, for a multi-hop communication.

The communications quality link of various E2EMH paths, between an IAB donor node and IAB nodes servicing UEs, may be assessed in a variety of ways. Additional parameters that may be considered include the total number of hops, lowest maximum capacity of each hop (considering for downlink and uplink), traffic loading (BSR), minimum RSRP of each hop, minimum SINR of each hop, number of IAB nodes and access UEs served by each IAB node, number of RLC channels and the multiplexing of UE traffic over these channels.

It may be that the channel quality of a hop with which an IAB node is attached to a neighbor IAB node may be good but a subsequent hop to a child IAB node may have bad channel quality. Hence, the aggregate channel quality of all hops of the IAB nodes to reach a destination IAB (donor) node may be a desirable channel quality to monitor.

After establishing optimum routes based on the measurement processing, an IAB donor node may generate unique route IDs with corresponding paths and a preferred neighbor nodes list for each IAB node.

As routes are assigned to service UEs, the IAB donor node may pass the routing information to their child IAB nodes.

An IAB donor node may utilize long term measurement statistics it is maintaining to make a decision on switching an IAB node from one parent IAB node to another IAB parent node based on overall channel quality or traffic loading involving multiple IAB nodes in an E2EMH path.

The derived metrics and the status of each hop of a link on an E2EMH path may also be used to detect link degradation and impact on an E2E link. An IAB donor node may use the measurement statistics to identify an alternate local secondary path for each IAB node that avoids a particular hop of an E2EMH path that may suffer RLF. The local topology information may be configured in the corresponding IAB node such that each node in an E2EMH path is provided with at least one alternate path that avoids RLF between itself and an adjacent neighbor IAB node.

An IAB donor node may also use the measurement statistics to identify an alternate global secondary path for each IAB node that avoids a particular hop of an E2EMH path. The secondary path may be used to re-route an IAB node suffering RLF. The path may also be used to re-route a path that may have been previously re-routed using the local secondary path information provided to each IAB node.

An IAB donor node may use the measurement reports to determine if a node should be switched to a different parent IAB node in the mesh network. Switching of the IAB node may be based on any one or any combination of a plurality of the following measurements:

Best SINR reported between the node and the potential parent node.

Best aggregated SINR reported for all the hops to reach the donor node.

Best RSRP, RSRQ, RSSI reported of the neighbor cell.

An alternate parent node whose BSR shows less congestion.

An alternate parent node whose aggregated BSR for all the hops to the donor node is lowest.

An alternate parent node whose channel capacity shows sufficient quality.

An alternate parent node whose aggregated channel capacity for all the hops to the donor node shows sufficient quality.

An alternate parent node offering a lower latency to reach the IAB donor node.

Alternatively, the secondary path may be established together with the primary path and used for traffic steering between the primary path and the secondary path.

Detection of Link Degradation and Link Management

In a first embodiment, an IAB node delivering communication services to an at least one UE can determine link degradation in a primary path corresponding to a Route ID when measurements processing indicates the link degradation, send a measurement report indicating link degradation for the Route ID, establish a secondary path with neighbor node wherein the secondary path avoids the hop suffering the link degradation, replicate downlink communications packets that are being transmitted on the primary path on the secondary path corresponding to the Route ID up to the new parent IAB node for the source node impacted by the link degradation, and, upon determination of link degradation, drop the primary path, attach to the new parent IAB node on the secondary path, and establish full service to the source node The link degradation can be on a hop that originates from the source node, and the IAB node can receive packets over the secondary path and handle of out-of-order packets and packet loss.

The measurement report that indicates link degradation can be broadcast or relayed to neighbor IAB nodes.

An IAB node utilizing an active antenna beam steering system can identify multiple viable communications beams that enable connection to more than one IAB node, and use a first beam for primary path communications and a second beam for secondary path communications In a second embodiment, an IAB node delivering communication services to an at least one UE can attach to an IAB donor node through a multi-hop primary path, receive at least one Route ID and a corresponding rank ordered preference list of neighbor Node IDs to reach a target end node, receive at least one of a maximum reservation latency per hop, maximum end-to-end latency, maximum number of hops, and QoS requirements, perform channel quality measurements for the at least one neighbor node with which a connection has been established to determine the channel quality (e.g. average CQI or CQI efficiency or channel capacity), perform measurements processing on the channel quality for each at least one best neighbor node according to the configured measurements processing, send a measurement report according to the measurements processing and reporting configuration, send a measurement report indicating a link degradation on an impacted path of a particular Route ID multi-hop path when the measurements processing indicates a link degradation, establish a secondary path with the IAB node from the rank ordered preference list of neighbor node IDs corresponding to the Route ID, and detach from the primary path and attach to the secondary path.

The IAB node can send a measurement report indicating an RLF on the impacted path when the measurements processing indicates an RLF.

The measurement report indicating link degradation can incorporate indications of a BH link.

The IAB node can receives an update configuration message including at least one Route ID and a corresponding rank ordered preference list of neighbor node IDs to reach a target end node In a third embodiment, an IAB donor node delivering communication services to an at least one UE can attach an IAB node through a primary path, send a measurements and reporting configuration message to the IAB node, receive at least one measurement report on the channel quality for the primary path and for each of at least one neighbor node according to the configured measurements processing from the IAB node, send a Route ID to the IAB node for a communication from the IAB donor node to a UE attached to the IAB node, receive a measurement report indicating a link degradation on a hop of the impacted multi-hop path associated with the Route ID, receive a measurement report for the neighbor nodes indicating a rank ordered list of nodes, send secondary path information associated with the Route ID that avoids the hop impacted by an RLF, receive a message indicating the secondary path has been configured.

The link degradation message may incorporate indications of a BH link.

The IAB donor node, from which the primary path originates, can be connected to a neighbor IAB donor node, the secondary path can originate from the neighbor IAB donor node and to a parent IAB node in the neighbor donor node network, the IAB donor node and neighbor IAB donor node can communicate user plane data, mesh measurements and coordination information across a direct interface, the IAB donor node can send data packets on the primary path and duplicate data packets on the secondary path up to a new parent IAB node in the neighbor IAB donor node network, and the secondary path can be designated as the new primary path after disconnection from the primary path.

Upon receiving the measurement report indicating a link degradation, the IAB donor node can send a request to a neighbor IAB donor node, the request including at least one of resource configuration information for one or more PDU Sessions and the associated one or more QoS flows, PDU session level TNL address information, IAB node capabilities, security information relating to the current IAB node setup, and a list of available DRB IDs.

Link Management when Facing a Link Degradation

Since IAB mesh networks may suffer from RLF, an IAB node may be configured to report an RLF. Processing of measurement parameters individually or collectively at an IAB node may trigger a measurement report indicating an RLF. For example, if the SINR drops below a pre-configured threshold then an RLF indication is noted and a timer is started which monitors the RLF indicators and if the SINR does not improve then an RLF is declared when the timer expires and an RLF report is transmitted. Once an RLF is declared, the IAB node can attempt to establish a connection with another nearby neighbor IAB node. Note that the children IAB nodes attached to this IAB node will also eventually declare RLF and have to attach to their alternate neighbor IAB node or re-attach to the IAB node after the IAB node attaches itself with another parent IAB node or IAB donor node and achieves connectivity. The impact of an RLF may be high due to this knock-on effect to children IAB nodes and the UEs they may be servicing.

In order to mitigate the effects of RLF, such as of loss or interruption of service, the present principles provide mechanisms to detect pre-emptively link degradation in order to establish an alternative path that avoids the path segment with the failing radio link. Link degradation may indicate the onset of an RLF.

To avoid an IAB node and all its children IAB nodes going through RLF recovery procedures, the IAB nodes may be configured to detect a link degradation in order to mitigate from a potential RLF and establish alternate communications before an RLF occurs. The mechanisms for detecting a link degradation may be along the same lines as detecting an RLF but with an SINR threshold "link degradation" that is higher than the threshold set for RLF indication. If nodes measure an SINR below the "link degradation" threshold, then the IAB nodes can start a timer and if the timer expires then an link degradation report may be sent to the parent IAB node and the IAB donor node so that a secondary path may be established to overcome a potential RLF.

The message may be opaque as it traverses the intermediate IAB nodes towards the IAB donor node and require the IAB donor node to disseminate the message to selected IAB nodes.

Alternatively, the message may be transparent as it propagates from IAB node to IAB node towards the IAB donor node. Intermediate nodes become informed of the link degradation and may take appropriate action to prepare for a potential RLF. The "link degradation" message may also be broadcast or relayed to neighbor IAB nodes for relaying to the IAB donor node and to inform other IAB nodes (e.g. children IAB nodes) of the channel conditions so that they may take appropriate action to mitigate a potential RLF that may occur due to the poor channel conditions.

Beam failure may also occur in the mmWave spectrum due to obstruction or interference, causing RLF since beam failure recovery procedures are not fast enough to avoid a breakage in communications connectivity. Beam failures may be handled in a manner similar to that described hereinbefore with reference to a channel quality that is deteriorating such that there is a high error rate and the packet re-transmission rate may increase relative to a desirable channel quality that results in more reliable communications. This condition is referred to as link degradation. To avoid beam failures causing RLF, an IAB node may monitor the quality of the SSB or the CSI-RS of the beam that is used for a communications link and if the quality remain below the onset of beam failure threshold for a certain amount of time then a measurement report may be sent indicating onset of beam failure and thus link degradation.

In an alternative approach, link degradation may be detected by measuring the SINR and determining that the SINR is degrading and the slope of the SINR measurements is negative and passing through an link degradation SINR threshold. This approach may also provide an early detection of a potential RLF.

Note that the before description uses SINR as a measurement parameter. More sophisticated mechanisms may be used that combine the measurements of some or all of the parameters described earlier with the objective of detecting a link degradation early and with a higher reliability.

In an alternative embodiment, IAB nodes may setup a mechanism in which, when a link degradation timer is started, then another timer monitoring an RLF is also started. If the link degradation timer crosses a set threshold then, before an RLF is declared, the IAB node begins attaching itself to a secondary neighbor IAB node.

A simple approach to RLF mitigation is the determination of a secondary path that may be established rapidly to mitigate an RLF, on detection of a link degradation condition, and that may be used for redundant path communications. A more complex approach determines a completely independent secondary path that may be established to mitigate an RLF. When redundant communications are established, techniques to handle packet replication on the DL up to a new parent node of the affected IAB node may be required, including:

- determination of packets successfully received over the secondary path up to the new parent IAB node,
- packet buffering and management to ensure immediate availability of packets upon attachment of the end IAB node to the new parent IAB node, and
- efficient control plane processing to propagate an acknowledgement following successful receipt of the first occurrence of a packet at the end IAB node.

BH Link Control Communications

Channel measurements are typically conducted and gathered as a continuous ongoing process. The measurements are reported upstream to the IAB donor node and the RRM entity in the network as measurement reports. A measurement report message may be transparent as it propagates from an IAB node to IAB node towards the IAB donor node and the RRM entity. Alternatively, the message may be opaque as it traverses intermediate IAB nodes towards the IAB donor node and require the IAB donor node to disseminate the message to other selected IAB nodes and the RRM entity as a second step.

Measurements are also processed locally at each IAB node for link communications and to detect a link degradation. Parameters may be sent to adjacent IAB nodes to assist in determining the multi-hop channel quality to a destination node.

An IAB node may suffer an RLF that may be handled in a graceful manner by progressing through various states from initial detection of the link degradation through to experiencing an RLF.

Messages may be sent over the BAP interface that provide for communications between IAB nodes to notify adjacent nodes of a BH link status and the channel quality for link level communications to a destination node.

As an illustrative example, the BAP Control PDU type comprises the format shown in Table 1. The 4-bit field in the PDU indicates the type of control information included in the corresponding BAP Control PDU as shown in Table 1.

TABLE 1

BAP Control PDU Type
PDU Data Types Bit Field Assignment

| 7 | 6 | 5 | 4 | 3 | 2 | 1 | 0 |
|---|---|---|---|---|---|---|---|
| D/C | PDU Data Type | | | Reserved Fields | | | |

As indicated in Table 2, in the case of BH RLF Indication, the PDU type is indicated as "0011". A PDU type to convey parameters to enable determination of a multi-hop channel quality may be indicated as "0100".

TABLE 2

BAP Control PDU Format for BH RLF Status Indication
PDU Data Type

| 4-Bit Value | Description |
|---|---|
| 0000 | Flow control feedback per BH RLC channel |
| 0001 | Flow control feedback per routing ID |
| 0010 | Flow control feedback polling |
| 0011 | BH RLF status indication |
| 0100 | Multi-hop channel quality metric(s) |
| 0101-1111 | Reserved |

The following sections provide illustrative examples for the use of these parameters in determining channel quality to a destination node and to relay granular information on RLF status.

BH Link Channel Quality Estimation

Continuing with the earlier illustrative example of measuring the SINR of a hop link as the channel quality of a multi-hop path to a destination node, an aggregate SINR may be determined through assisted information. A message indicating multi-hop channel quality metric(s) may be used to determine the quality of a multi-hop path to a destination node. For example, in UL communications to IAB donor node 1 from IAB node 5, IAB node 1 may assess the UL channel quality of its hop to IAB donor node 1. It may insert information on its channel quality to IAB donor node 1 in a channel quality message to IAB node 3 as illustrated in Table 3 with the information fields indicated in Table 4.

TABLE 3

BAP Control PDU Format for Multi-hop Channel Quality Metric
PDU Data Types Bit Field Assignment

| 7 | 6 | 5 | 4 | 3 | 2 | 1 | 0 |
|---|---|---|---|---|---|---|---|
| D/C | 0 | 0 | 1 | 1 | Multi-hop channel quality metric | | |

TABLE 4

BH Multi-hop Channel Quality Metric
Multi-hop Channel Quality Metric

| 3-Bit Value | Description |
|---|---|
| 000 | 0 dB |
| 001 | −1 dB |
| 010 | −3 dB |
| 011 | −5 dB |
| 100 | −7 dB |
| 101 | −10 dB |
| 110 | −14 dB |
| 111 | −20 dB |

So for example, if the SINR measurement of IAB node 1 to IAB donor node 1 is below a desired SINR operation level by 1 dB then the parameter relayed is "001" indicating −1 dB. When IAB node 3 then determines its SINR to IAB donor node 1, it uses the information provided to reduce its estimate of the SINR between itself and IAB node 1 by the amount indicated in the multi-hop channel quality metric. So IAB node 3 would reduce its measured estimate of the SINR between itself and IAB node 1 by 1 dB to determine an aggregate SINR estimate to destination IAB donor node 1. IAB node 3 may in turn determine that it's SINR is −3 dB below the desired operation level. So IAB node 3 would in turn relay a message to IAB node 5 indicating a (aggregate) channel quality metric adjustment factor of −5 dB. IAB node 3 would aggregate the −1 dB it received from IAB node 1 with its own −3 dB and communicate a −5 dB (nearest to the (−1)+(−3)=−4 dB aggregate degradation so far) to its neighbor IAB node 5.

Finally, IAB node 5 may estimate the SINR between itself and IAB node 3 and then adjust the estimate by −5 dB to determine an aggregate SINR to the end destination, IAB donor node 1.

Other variations of channel quality measurement processing, using the various communicated channel quality metrics described earlier, may be used to determine an aggregate channel quality over a multi-hop path to a destination node are possible.

BH RLF Link Status Communications

When a channel deteriorates between two intermediate IAB nodes, a measurement report indicating a link degradation is sent by the affected parent IAB node, of the affected hop, to the IAB donor node. An IAB node may also broadcast and inform children IAB nodes and other neighbor nodes regarding the link degradation and/or an RLF.

These notifications enable adjacent communicating nodes to pre-emptively address RLF and mitigate service interruption times recovering from an RLF. For example, when handling RLF-related messaging, the RLF status may be communicated in a PDU where the PDU may incorporate various indications of a BH link such as:

Link degradation: indicating that channel conditions have deteriorated and that an RLF may occur if the conditions persist.

Attempting to establish alternate path: indicating that an attempt is being made to identify and attach to an alternate path to mitigate a potential RLF.

Alternate path established: an alternate path has been established to overcome the current poor channel conditions.

Failure to establish alternate path: it has not been possible to establish an alternate path to overcome the current poor channel conditions.

RLF: an RLF has occurred.

Attempting to recover from RLF: an attempt is being to identify and attach to an alternate path.

Recovered from RLF: an alternate path has been established following an RLF.

Failure to recover from RLF: it has not been possible to establish an alternate path and recover from the RLF.

As an illustrative example of the BH RLF status indications, the BAP Control PDU reserved fields shown in Table 2 may be used to provide granular information on the state of the backhaul link, including the values indicated in Table 5 with the information fields indicated in Table 6.

TABLE 5

BAP Control PDU Format for BH RLF Status Indication
PDU Data Types Bit Field Assignment

| 7 | 6 | 5 | 4 | 3 | 2 | 1 | 0 |
|---|---|---|---|---|---|---|---|
| D/C | 0 | 0 | 1 | 1 | BH Link Indication | | |

TABLE 6

BH RLF Status Indication
BH Link Indication

| 3-Bit Value | Description |
|---|---|
| 000 | Link Degradation |
| 001 | Attempting to establish alternate path |
| 010 | Alternate path established |
| 011 | Failure to establish alternate path |
| 100 | RLF |
| 101 | Attempting to recover from RLF |
| 110 | Recovered from RLF |
| 111 | Failure to recover from RLF |

Traffic Path Handling with Link Degradation Detection

A secondary path can be identified upon link degradation. The secondary path is established upon detection of link degradation and avoids the particular hop of an E2EMH chain that is suffering link degradation.

Two options for configuring the secondary path routing are local re-routing or centralized re-routing.

Localized Re-Routing

The IAB donor node provides local mesh topology information to an IAB node so that it can determine locally an alternate route that avoids a particular hop within the same mesh network. The routing information is such that any one of the hops on the E2EMH path may be bypassed. Providing this information locally enables an IAB node quickly to establish a new path that avoids a potential RLF. When performing a re-routing, the IAB node notifies the IAB donor node of the re-routing and establishment of a secondary route.

The IAB nodes can perform the following method to re-route traffic in case link degradation is detected to mitigate the onset of an RLF.

The IAB node monitors the channel quality (e.g. SINR, RSSI, RSRP or traffic congestion such as BSR, latency in emptying the buffers for children and parent node) in the DL hops to its children nodes as well as UL hops to its parent nodes.

The IAB node also monitors the channel quality for its neighbor IAB nodes (e.g. SINR, RSSI, RSRP). Neighbor IAB nodes can be the intra-donor or preferred inter-donor IAB nodes list forming alternate routes that have been provided to the IAB node.

If the channel quality deteriorates on a channel being used by the IAB node then it starts to assess the preferred inter-donor and intra-donor neighbor IAB nodes list to determine the alternate path routes, e.g. those with the highest quality. Alternatively, as measurements are collected for the measurements reporting, the IAB node continually gathers channel statistics to provide a constant update of channel conditions for the inter-donor and intra-donor neighbor IAB nodes list in the alternate path routes.

The IAB node may send information about the channel conditions as status messages to the IAB donor node, for example, to inform when experiencing channel degradation, type of channel degradation, initiating an alternate path, failure to establish an alternate path or success in establishing an alternate path.

Upon link degradation, the IAB node may initiate opening another connection with a parent node in the intra-donor node list which offers the best channel quality, resulting in a dual connection from the IAB node.

After establishing the dual connection, the IAB node sends information about this change to the IAB donor node via the PUCCH/PUSCH channel and the BAP protocol over the F1 interface or using some other protocol.

The IAB donor node can register any re-routing update information from an IAB node and update the mesh topology information. Any updates are communicated to the IAB node as configuration updates; for example, the new route is registered as the new secondary route for the IAB node or the new secondary route is designated as a new primary route (and the previous primary route is dropped), or another secondary route is assigned to the IAB node based on the cumulative long term measurement statistics that are kept at the IAB donor node.

The IAB node may also switch its parent IAB node based on traffic congestion at the IAB parent node if the buffer state of the currently connected IAB parent node indicates that it is constantly full and the alternate parent node has a relatively less full buffer.

IAB nodes may transmit measurement reports and buffer status information to the IAB donor node via IAB nodes along the hops to the IAB donor node. The IAB nodes along the path to the IAB donor node may monitor and log this information for their own channel analysis and measurement gathering procedures. IAB nodes may also transmit this information to all neighboring nodes on its active links. Communications may occur over RLC channels or using broadcast channels or in some other form (e.g. discovery signal in unlicensed).

Centralized Re-Routing

In a controlled re-routing, the IAB donor node, upon detecting a link degradation, determines the alternate route that avoids a particular hop and re-routes the paths. It is possible to perform local re-routing followed by a seamless centralized re-routing that avoids breakage in communications. This way the speed of localized re-routing and RLF mitigation may be followed by a more permanent re-routing.

In the following illustrative example with reference to FIG. 2, the secondary path is independent from the E2E chain of backhaul links in the primary path and from a secondary IAB donor node that is not in the primary path. Session information is transferred over the Xn interface between the primary path IAB donor node and secondary path IAB donor node.

Alternate embodiments include IAB nodes common to the primary path and the secondary path as well as independent IAB nodes. For example, in one embodiment, the primary path and the secondary path may share the same IAB donor node and IAB end node but independent intermediate IAB nodes. In another embodiment, the paths may be the same for the primary path and secondary path, separating at an intermediate IAB node between the IAB donor node and end IAB node.

Figure 3A:
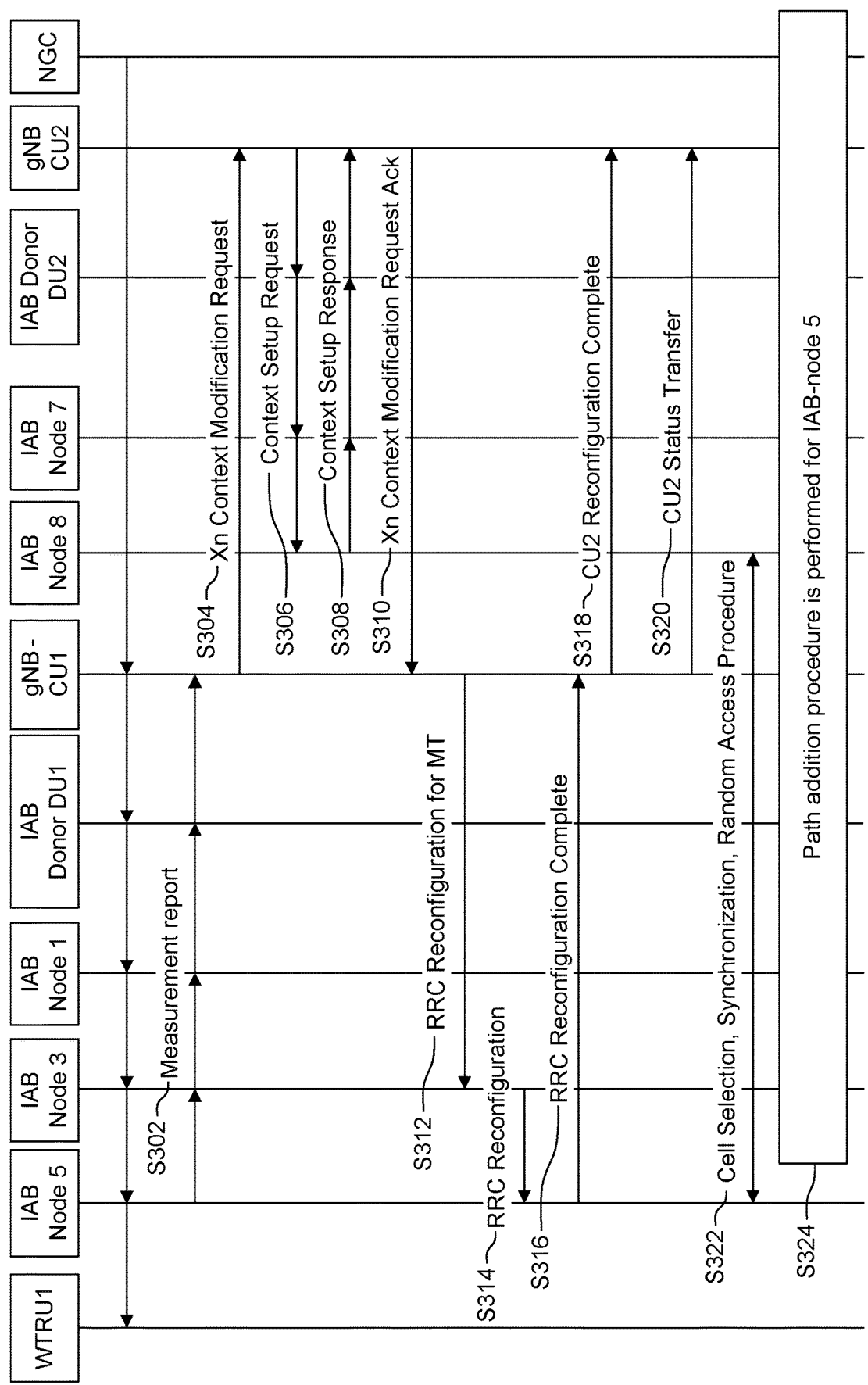
FIGS. 3A and 3B together illustrate a call flow diagram for a method for detecting and recovering from an RLF according to an embodiment of the present principles.
Figure 3B:
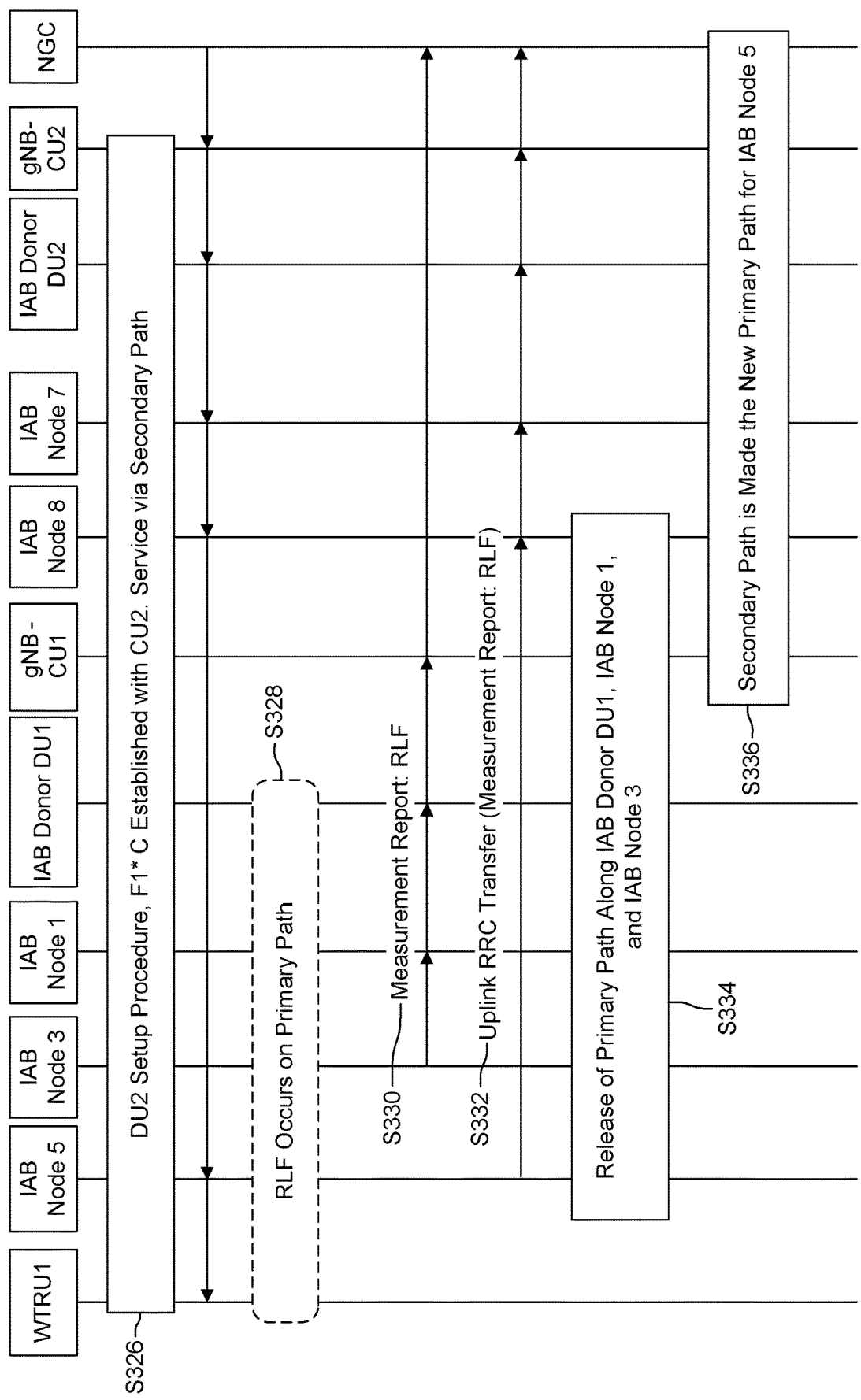

With reference to the mesh topology illustrated in FIG. 2, FIGS. 3A and 3B together illustrate a call flow diagram for a method for detecting and recovering from an RLF according to an embodiment of the present principles. The example method includes determination of link degradation, establishment of a secondary path that avoids the hop that is degrading, establishment of duplicate communications along the secondary path up to the parent IAB node 8 that is servicing IAB node 5, and dropping the primary path following attachment to the IAB node 8.

Communications have been established from IAB node 5 on the primary route over IAB node 3, IAB node 1, and DU1 and gNB CU1 (of IAB donor node 1). UE1 receives traffic (only illustrated for the DL) from the NGC in a hop-by-hop manner going from the NGC to gNB-CU1 to IAB donor DU1 to IAB node 1 to IAB node 3 to IAB node 5 and then to UE1. The UL traffic follows the same hop-by-hop manner in the opposite direction.

In step S302, IAB node 5 determines link degradation on the primary path based on channel quality measurements collected for the immediate link with its neighbor IAB node 3, and sends a measurement message indicating the link degradation to the controlling node CU1 (of IAB donor node 1).

The measurement message may be broadcast to all of the neighbor nodes of IAB node 5, who may then continue forwarding the message towards the CU1 of IAB donor node 1. The message may include a time-to-live counter or hop counter to prevent overflooding the mesh network with stale messages.

Based on its measurements processing, IAB node 5 may also be aware of inter-donor IAB node 8 as being the best node to transition to in the case of link degradation and may attempt to attach pre-emptively before an RLF occurs. The message from IAB node 5 via IAB donor node 1 to the IAB donor node 2 over the Xn interface may include information elements to help facilitate a subsequent fast attachment to IAB node 8 (e.g. RACH preamble, estimated power level, and action time for the RACH transmission that it intends to use).

In step S304, CU1 requests the target CU2 to allocate resources for one or more specific PDU Sessions/QoS Flows, indicating QoS Flow characteristics (QoS Flow Level QoS parameters, PDU session level TNL address information, and PDU session level Network Slice info). In addition, CU1 indicates the requested configuration information, including the entire IAB node 5 capabilities and the IAB node 5 capability coordination result. In this case, CU1 can also provide the latest measurement results for CU2 to choose and configure the CU2 mesh network cell(s). CU1 can provide the security information to CU2 to enable SRB3 to be setup based on CU2 decision.

CU1 can provide a list of available Dedicated Radio Bearers (DRB) IDs for CU2 to store information and use when establishing CU2 terminated bearers. CU1 can provide a list of QoS flows per PDU Session for which CU2 mesh network resources are requested to be setup upon which CU2 decides how to map QoS flows to DRB.

The CU2 mesh network resources requested may be of such an amount that the QoS for the respective QoS Flow is guaranteed by the exact sum of resources provided by CU1, or more. For a specific QoS flow, CU1 may request the direct establishment of CU2 mesh network bearers.

When adapting service to re-route paths from IAB Donor node CU1 to IAB Donor node CU2, the RRC anchor is changed and so the BAP configuration, including BAP address(es) and BAP path ID(s), should be re-configured by IAB donor CU1, including a default UL BAP routing ID and a default BH RLC channel, in order to configure UL mapping for F1-C traffic on the new target path, using new configured IP address(es) since the new path has a new IAB donor DU2. The BAP configuration information for the radio bearers should also be updated and communicated between CU1 and CU2 for re-configuration of the IAB node 5 target path.

CU1 may also forward the information provided by IAB node 5 to enable CU2 to inform the new target parent IAB node 8 with information on enabling a fast attachment of IAB node 5 to IAB node 8.

In step S306, CU2 sets up the target path and context for the new route—through IAB node 8, IAB node 7, IAB donor DU2 and gNB CU2—with a context setup request message. The information from IAB node 5 can also be provided to enable the IAB node 8 to listen for a RACH probe from IAB node 5 and perform a fast attachment.

In step S308, upon establishment of the resources, the end destination IAB node 8 responds with a context setup response message.

In case the RRM entity in the CU2 mesh network is able to admit the resource request, in step S310, it allocates respective radio resources, and dependent on the bearer type options, respective transport network resources. For bearers requiring CU2 mesh network radio resources, CU2 triggers the IAB node 5 MT Random Access so that synchronization of the CU2 radio resource configuration can be performed.

The CU2 mesh network decides for the PSCell and other SCells and provides the new CU2 mesh network radio resource configuration to CU1 within a CU2 RRC configuration message contained in the CU2 Context Modification Request Acknowledge message. The configuration information may include information elements (preamble, RNTI, confirmed action time, etc.) to enable IAB node 5 to attach to new parent IAB node 8.

In case of CU2 terminated bearers, data forwarding and the CU2 Status Transfer may take place after step S304.

In readiness for full service connection, duplicate data in the DL is transmitted to new parent IAB node 8 of IAB node 5 and buffered. Downstream data forwarding may be carried out by IAB donor node 1 to IAB node 8 and buffered so that the buffer pipeline is filled and service disruption time is minimized when IAB node 5 switches service from IAB node 3 to IAB node 8.

RRC re-configuration messages containing new BAP configuration information for IAB node 5 may be sent by IAB node CU2, via IAB node CU1, before transitioning and connecting from IAB donor node CU1 to IAB donor node CU2 or sent by IAB node CU2 to IAB node 5 after transition and connecting to IAB donor node CU2.

In step S312, CU1 sends the CU2 RRC reconfiguration message to the IAB node 3 MT including the CU1 RRC configuration message, without modification.

In step S314, IAB node 3 sends the message to IAB node 5.

In step S316, IAB node 5 MT applies the new configuration and replies to CU1 with CU1 RRC reconfiguration complete message, including a CU2 RRC response message for CU2, if needed. In case the IAB node 5 MT is unable to comply with (part of) the configuration included in the CU1 RRC reconfiguration message, it performs the reconfiguration failure procedure.

IAB node 5 manages the UL buffer to IAB donor node 1, until a full service connection is established with new parent IAB donor node 8, by maintaining a log of successfully transmitted packets along the existing route to IAB donor node 1 and buffering for IAB donor node 2. In addition, the children IAB nodes may also be requested to manage their packet buffering till the IAB node 5 migration is completed.

In step S318, CU1 informs CU2 that the IAB node 5 MT has completed the reconfiguration procedure successfully via the CU2 Reconfiguration Complete message, including the CU2 RRC response message, if received from IAB node 5.

In case the PDCP termination point is changed to CU2 for bearers using RLC AM, and when RRC full configuration is not used, CU1 sends the CU2 Status Transfer, in step S320.

If configured with bearers requiring CU2 mesh network radio resources, the IAB node 5 MT performs synchronization towards the PSCell configured by CU2, in step S322. IAB node 5 MT can send the CU1 RRC reconfiguration complete message and perform the Random Access procedure towards the CU2 mesh network in any order. A successful RA procedure towards the CU2 mesh network is not required for a successful completion of the RRC Connection Reconfiguration procedure.

In step S324, update of the UP path towards the 5GC is performed via a PDU Session Path Update procedure.

In step S326, IAB node 5 performs a setup procedure with DU2 via CU1 and to relay F1*C control messages with CU2 via the Xn interface. DU2 establishes service via the secondary path. For QoS flows duplicated from CU1, dependent on the characteristics of the respective bearer or QoS flow, CU1 may take actions to minimize service interruption due to activation of data forwarding. Communications have now also been established on the secondary path between IAB node 5, IAB node 8, IAB node 7 and DU2. UE1 can then exchange traffic with NGC over the secondary path (still only shown for the DL) along the path between the NGC to IAB donor gNB-CU2 to IAB donor DU2 to IAB node 7 to IAB node 8 to IAB node 5 to UE1.

It may be that an RLF occurs before IAB node 5 is able to connect to IAB node 8 in which case there may be a small service disruption, but since the data buffering has been duplicated along the new route via IAB donor node 2, at the earliest opportunity, it is expected that the service disruption is minimal. The following steps S328-S332 may result if an RLF does occur before the secondary path has been established.

In step S328, IAB node 5 determines an RLF has occurred on the primary path based on channel quality measurements it is collecting for the immediate link with its neighbor.

In step S330, a measurement report is sent, indicating an RLF, to CU1 by IAB node 3 via IAB node 1 and DU1 and optionally to NGC.

In step S332, a measurement report is also sent to CU2 (and optionally to NGC) via the secondary path by IAB node 5.

The measurement message may be broadcast to all of its neighbor nodes who may then continue forwarding the message towards the CU1 of IAB donor node 1. The message may include a time to live counter or hop counter to prevent over flooding the mesh network with stale messages.

In step S334, the primary path along IAB donor DU1, IAB node 1 and IAB node 3 is released, as will be described in more detail hereinafter.

In step S336, the routing tables are modified to classify the secondary path as the new primary path.

Figure 4:
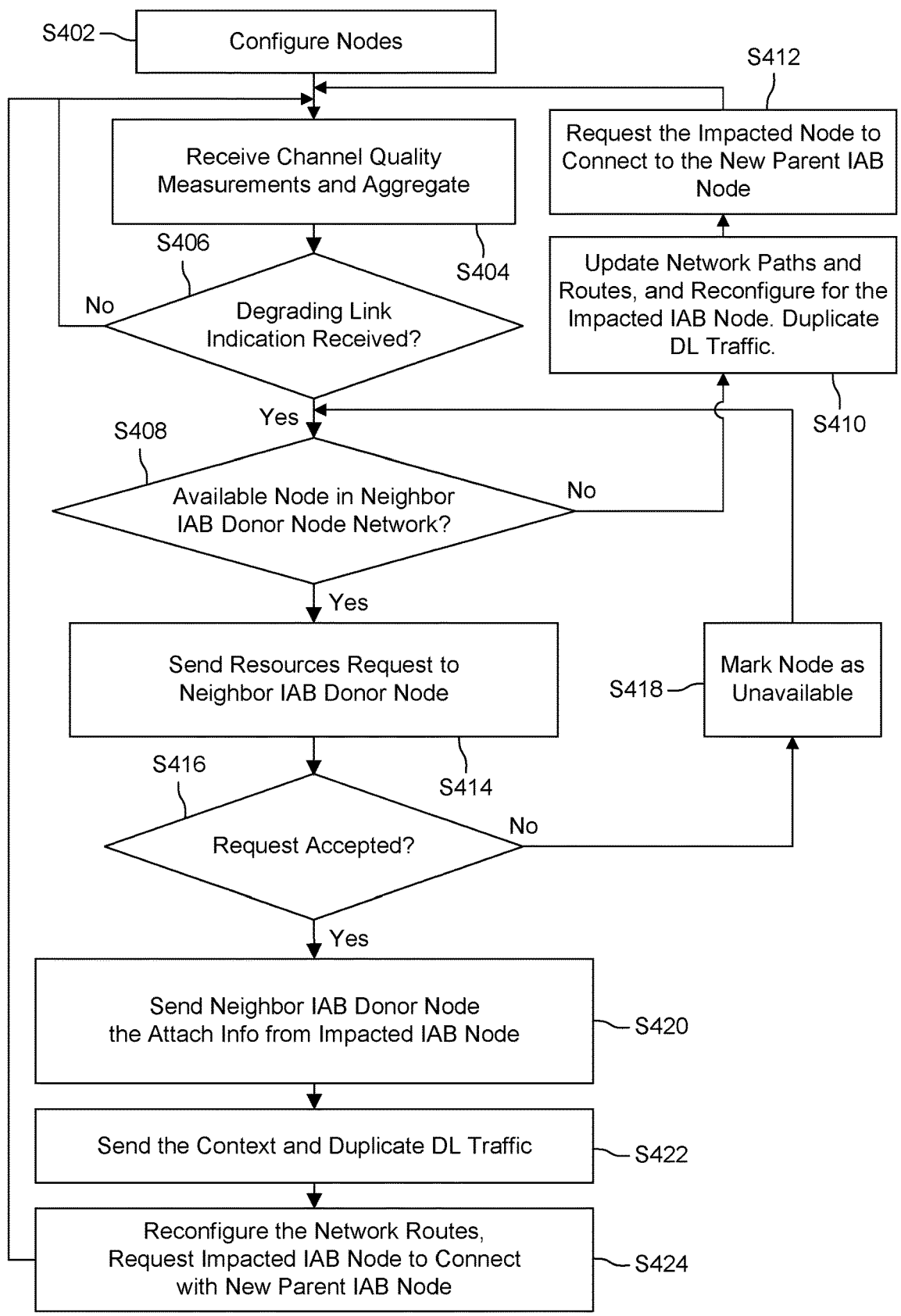
FIG. 4 illustrates the method described in FIG. 2 from the perspective of an IAB donor node.
Figure 5:
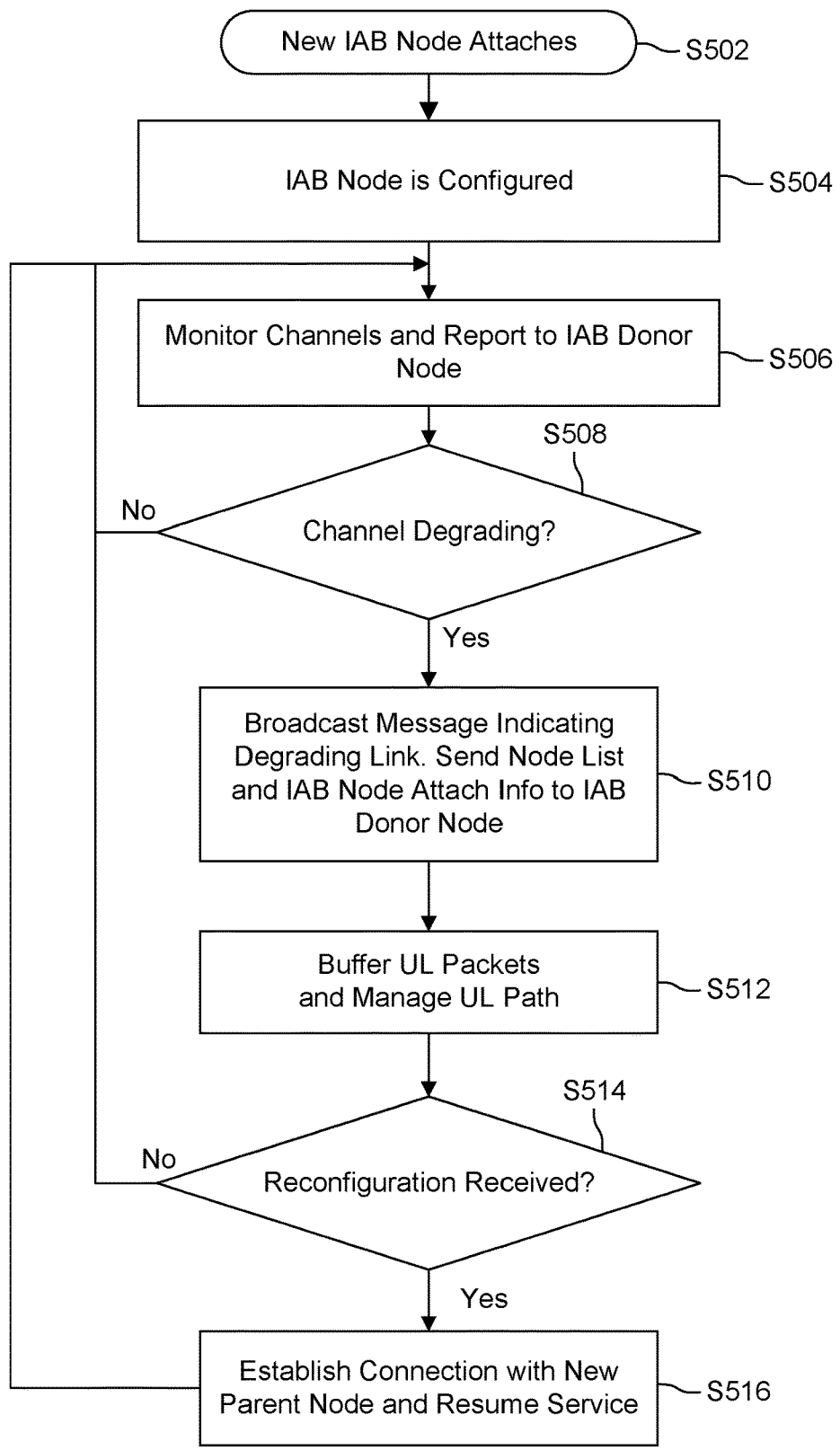
FIG. 5 illustrates the method described in FIG. 2 from the perspective of an IAB node.

FIG. 4 illustrates the method described in FIG. 2 from the perspective of IAB donor node 1 and FIG. 5 illustrates the method described in FIG. 2 from the perspective of IAB node 5.

In FIG. 4, the network has been established when the method starts.

In step S402, IAB donor node 1 configures nodes in the network, including configuration of for example one or more of a route ID list, a neighbor node ID list, measurements setup, parameters for RLF and link degradation detection.

In step S404, IAB donor node 1 receives channel quality measurements from IAB nodes and performs aggregation of measurements for the routes.

In step S406, it is determined whether IAB donor node 1 has received an indication of a degrading link from an IAB node. If this is not the case, the method returns to step S404.

However, in case IAB donor node 1 has received such an indication, in step S408, it determines whether the highest ranked (best CQI, e.g. highest channel quality, SINR, QoS) node in a rank-ordered preferred list is in a neighbor IAB donor node network.

If this is not the case, i.e. the highest ranked node is in its own network, then in step S410, IAB donor node 1 updates the network paths and routes, and reconfigures the paths for the impacted IAB node(s). IAB donor node 1 also duplicates DL traffic over the path to the new parent IAB node. In step S412, IAB donor node 1 also requests the impacted IAB node to connect to the new parent IAB node. The method then returns to step S404.

On the other hand, if this is the case, i.e. the highest ranked node is in a neighbor IAB donor node network 2, in step S414, IAB donor node 1 sends a resource request, e.g. via Xn or N2/N3, to the neighbor donor node 2 in question. In step S416, IAB donor node 1 determines whether the neighbor IAB donor node 2 accepted the request.

In case the neighbor IAB donor node 2 did not accept the request, in step S418, the IAB donor node 1 marks the highest ranked available node (selected in step S408) as unavailable in the rank-ordered preferred list. The method then returns to step S408.

In case the neighbor IAB donor node 2 did accept the request, in step S420, the IAB donor node 1 sends to the neighbor IAB donor node 2 attach information from the impacted IAB node to aid in establishing a connection with the new parent IAB node.

In step S422, the IAB donor node 1 sends the context and duplicate DL traffic for the impacted IAB node to the neighbor IAB donor node 2 and for forwarding to the new parent IAB node.

In step S424, the IAB donor node 1 reconfigures the network routes and requests the impacted IAB node to connect to the new parent IAB node. The method then returns to step S404.

In FIG. 5, the method starts when the new IAB node, i.e. IAB node 5, attaches to the network in step S502.

In step S504, the IAB node is configured including configuration of for example one or more of a route ID list, a neighbor node ID list, measurements setup, parameters for RLF and link degradation detection.

In step S506, the IAB node monitors channels, i.e. configured paths and identified neighbor IAB nodes, and reports measurements to the IAB donor node 1.

In step S508, the IAB node determines whether a channel is degrading (or degraded), for example by comparing a CQI with a threshold for RLF mitigation, $CQI_{RLFmitigation}$, and determining if the CQI is below the threshold In case no channel is degrading, the method returns to step S506.

In case a channel is degrading, in step S510, the IAB node broadcasts a message indicating the degrading link and sends a rank-ordered preferred node list, e.g. based on measurements, and IAB node attach information to the IAB donor node.

In step S512, the IAB node buffers UL packets and manages the UL path for an upcoming detach/attach procedure.

In step S514, the IAB node determines whether it has received a reconfiguration from an IAB donor node.

If no reconfiguration has been received, the method returns to step S504. In case a reconfiguration has been received, in step S516, the IAB node establishes a connection with the new parent IAB node and resumes service, after which the method returns to step S504.

The random access procedure of step S322 (of FIG. 3A) may be performed earlier than as illustrated in the call flow. For example, IAB node 5 may perform periodic measurements of neighbor cells. When a link degradation is detected, IAB node 5 may determine that it should connect to IAB node 8. IAB node 5 may then perform a RACH procedure with IAB node 8 prior to detachment from IAB node 3. The RACH procedure including random access probes and responses may be interleaved in the communications with IAB node 3 (e.g. during periods of discontinuous reception). Alternatively, the RACH response from IAB node 8 may be sent to IAB node 5 by way of the IAB donor nodes 2 and 1 and their Xn or N2/N3 interfaces. In addition, the RRC reconfiguration messages may also be exchanged during this time. Collectively, the RACH procedure may be carried out concurrently with normal communications and IAB node 5 prepared for an attachment complete with the transmit power, timing advance setting, RNTI, and other configuration parameters already established prior to a detach from IAB node 3 and attach to IAB node 8. The attach to IAB node 8 is therefore accelerated to minimize service disruption and provide a seamless service transition.

In an embodiment, the IAB nodes are attached to a single IAB donor node. In this embodiment, a number of steps may be simplified, collapsed, or superfluous (e.g. the resource allocation and RRC configuration steps across the Xn or N2/N3 interface). The new dual path may be established and advantage may be taken of the mesh network level IAB node synchronization and timing information to enable a fast attachment of the IAB node 5 to IAB node 8.

In another embodiment, an IAB node, for example IAB node 5, may have child IAB nodes and UEs. In this case the default BAP configuration including the UL mapping for F1-C traffic for the new target path may also need to be updated with a re-configuration from IAB donor CU1, using the new configured IP address(es) since the new path has a new IAB donor DU2.

The RRC reconfiguration for children nodes and UEs may be performed in different ways, as will now be described.

Prior to path re-assignment for IAB node 5 from source IAB donor node CU1 to the target IAB donor node CU2, RRC reconfiguration messages for the children IAB nodes and UEs of IAB node 5 are included in the Xn handover request ACK message to the source IAB donor node CU1 and then sent to the children IAB nodes and UEs via IAB node 5. The children IAB-nodes and UEs may store the reconfiguration information and execute the configuration after the IAB node has attached to IAB node 8 and to the target IAB donor node CU2.

After the IAB node 5 migrates its service to the target IAB donor CU1, RRC reconfiguration messages for the children IAB-nodes and UEs are included in a context modification request message from the target IAB donor CU2 to the migrating IAB node 5 and then sent to the children IAB nodes and UEs.

In step S334, the former primary path from IAB node 5, along IAB node 3, IAB node 1, and DU1 is released. Full service communications are established and continue along IAB node 5, IAB node 8, IAB node 7, and DU2. DL data is aligned with the last received DL packet over the primary path and the UL data delivery resumed from the last UL data packet confirmed as received by the IAB donor node 1. Even after the IAB node 5 has detached from IAB node 3, the IAB donor node 1 continues to receive the pipelined UL packets, at IAB node 3 and IAB node 1, and sends the packet received notifications to IAB node 8 via IAB donor node 2.

If there are child IAB nodes and UEs for IAB node 5 that is being re-routed then any upstream data from IAB nodes and UEs to IAB node 5 may be buffered when IAB node 5 detaches and then resumes after IAB node 5 attaches to the new IAB node under CU2.

After a local re-route has been determined and applied to mitigate an RLF, the IAB donor node can identify a different route, that avoids the particular hop suffering the RLF, and perform a subsequent re-route in a seamless manner and without disrupting services. This can for instance occur when local re-routing has been performed due to the link degradation and the current path is now non-optimal.

Active Dual Path Processing

In an embodiment of the present principles, an IAB donor node delivering communication services to an at least one UE can perform a method for dual path processing.

The IAB donor node connects to a secondary IAB donor node, wherein a primary path originates from the primary IAB donor node and a secondary path originates from the secondary IAB donor node. The IAB donor node and secondary IAB donor node communicate user plane data, mesh measurements and coordination information across a direct interface between the donor nodes The IAB donor node can send a measurements configuration and a primary Route ID including communications path information to an end IAB node delivering services to at least one UE, establish a primary path for the primary Route ID, establish a secondary path for the second route ID via the secondary IAB donor node, perform measurements on the primary path and the secondary path to determine the communications link quality of the primary path and the secondary path, receive a link degradation message, transmit a packet to the end IAB node wherein based on the communications link quality of the primary path and the secondary path, wherein the packet can be on the primary path, the secondary path or both the primary path and the secondary path A measurements configuration and a second Route ID including communications path information for the secondary path to the end IAB node delivering services to the at least one UE can be configured by the secondary IAB donor node The IAB donor node can further receive packets from the end IAB node over the primary path and the secondary path and handling of out-of-order packets, duplicate packets, and packet loss, and send measurements configuration information to enable the end IAB node to determine the communications link quality of the primary path and the secondary path for sending packets to the IAB donor node.

In case an IAB node utilizes an active antenna beam steering system, the IAB node can identify two adjacent viable communications beams that enable communication to an IAB node, and activate both beams to enable the IAB node to perform diversity combining.

The IAB node can identify multiple viable communications beams that enable connection to more than one IAB node, and use a first beam for the primary path communications and a second beam for the second path communications In an alternative embodiment, a source node delivers communication services to at least one UE. The source node comprises a user plane function in the network that is connected to a primary IAB donor node and a secondary IAB donor node, a primary path originates from the primary IAB donor node, a secondary path originates from the secondary IAB donor node, and the primary IAB donor node and secondary IAB donor node communicate mesh measurements and coordination information across a direct interface between the nodes.

The source node receives a measurements configuration and a primary Route ID including communications path information to an end IAB node delivering services to at least one UE, establishes a primary path for the primary Route ID, receives a measurements configuration and a second Route ID including communications path information to an end IAB node delivering services to at least one UE, establishing a secondary path for the second route ID, performs measurements on the primary path and secondary path to determine the communications link quality of the primary path and the secondary path, sends a link degradation message to the primary IAB donor node and the secondary IAB donor node, transmits a packet to the end IAB node wherein based on the communications link quality of the primary path and the secondary path, wherein the packet is sent on the primary path, the secondary path, or both the primary path and the secondary path.

The source node can further receive packets from the end IAB node over the primary path and the secondary path, handle of out-of-order packets, duplicate packets, and packet loss, and send measurements information to enable the end IAB node to determine the communications link quality of the primary path and the secondary path for sending packets to the source IAB node.

Active Link Management

Due to the hop-by-hop nature of communications over a backhaul, the likelihood of an RLF can be high in a mesh network, which can result in frequent loss or interruption of service. It can thus be desired to have mechanisms built into the mesh network to handle situations when an RLF occurs in order to improve service continuity for such services as real-time services and ultra-reliable services. Dual path link management techniques according to the present principles, where a primary path and secondary path are actively managed to provide diversity, can help overcome RLFs and maintain service continuity.

Channel measurements are conducted and gathered on a continuous ongoing process. The measurements are processed locally at each IAB node and communicated upstream to the node performing traffic steering. This node may be an IAB node, an IAB donor node, or the RRM entity in the network when traffic is being steered over two paths that originate from two different IAB donor nodes. The measurements are processed to dynamically steer traffic, on a packet-by-packet basis, to a primary path or secondary path or by duplicating traffic on both paths. When a channel deteriorates between two adjacent IAB nodes, a measurement message indicating a link degradation can be sent by the affected parent IAB node, of the affected hop, or other affected nodes to the IAB donor node and to the RRM entity in the network.

A simple approach to RLF mitigation is to determine a secondary path that may be established at the same time as the primary path and then actively steer traffic based on local channel conditions for each hop of the path to an end node. When a channel is acceptable, traffic is steered on the better of the primary or secondary path and when both channels deteriorate, traffic may be duplicated on both paths. The primary and secondary paths may be over different partial segments of the end-to-end path or over an entire E2EMH path. In the latter case, a completely independent secondary path may be used for redundant path communications. When redundant communications are carried out, techniques to handle packet replication and reconciliation include:
- determination of packets successfully received over the primary and secondary path and discarding of replicated packets,
- diversity combining of two packets, which have been received with errors that prevent recovery of the transmitted packet from each individual packet, to recover the transmitted packet,
- efficient control plane processing to propagate an acknowledgement following successful receipt of the first occurrence of a duplicated packet at the end IAB node, and
- timing measurements for time of arrival of packets received over the primary path vs the secondary path, determination of transmit time delay measurements for primary and secondary path, and adjustment of packet transmission timing alignment of the transmit packet streams at the transmitter to align receipt of packets at the receiver.

In an embodiment, traffic between an IAB donor node and an end IAB node may be separated into individual QoS flows. Packets for a QoS flow may be split between the primary path and secondary path depending on the QoS flow and Service Level Agreement (SLA) requirements taking advantage of the diversity and alternate paths. In the case where the primary path and secondary path are both acceptable, then the splitting of traffic may offer a means of load balancing the traffic or congestion relief for the mesh network. QoS flow assignment may be driven locally at the IAB node and/or by the IAB donor node.

Determination of Traffic Bifurcation Point

Depending upon the mesh topology and channel environment, the point where the traffic may be steered may be anywhere from within the network at the RRM entity, an IAB donor node or an IAB node. When an RLF occurs on one path, a route modification may be carried out for the path to bypass the RLF. Options for re-configuring the path routing include localized routing and centralized routing.

A secondary path may originate from a secondary IAB donor node that is independent from the E2E chain of backhaul links in the primary path and the primary IAB donor node. Inter-IAB donor nodes may cooperate to provide diversity and services to a UE from an IAB node that is able to provide a link back to the network via two IAB donor nodes.

The bifurcation point where a path is split into two paths may occur in the network with two paths from two IAB different donor nodes, at a IAB donor node or at an intermediate IAB node along the path from an IAB donor node to a UE. In the latter case, the path from an IAB donor node to the IAB node where a bifurcation may occur may be a reliable path not requiring diversity processing. Similarly, the paths may meet at the IAB node servicing a UE or at a point prior to reaching the IAB node servicing a UE.

When performing localized routes, an IAB node may use information provided by the IAB donor node to determine locally an alternate route that avoids a particular hop. The IAB node notifies the IAB donor node of the re-routing and modification to the secondary route.

When performing global routes, an IAB donor node may use information centrally available at the IAB donor node or the RRM entity in the network to determine the alternate route(s) that avoids a particular hop and then re-route the paths.

Active Path Steering

Given one or more paths over which traffic may be communicated to a destination node, packet-by-packet traffic for different types of QoS flows may be steered over two paths, a primary path and secondary path, based on channel conditions. A channel quality metric may be used to facilitate the steering or duplication of traffic over one or more connection oaths. The channel quality metric may include the quality of a path that includes the chain of multi-hop paths to a destination node.

Sophisticated mechanisms may be used that utilize or combine the measurements of some or all of the channel quality parameters described earlier into a channel quality metric, that would provide an aggregate measure of an entire chain of hops to reach a destination node.

Considering the various types of traffic that range from time and error-sensitive traffic to non-real-time traffic, these traffic classes can be classified into their respective QoS class. Different traffic steering thresholds may be defined for these QoS classes as illustrated in Table 7 that shows, to the left, a detailed description of a decision chain involving SINR for two different QoS flows, and, to the right, a simplified version. It is noted that the types of traffic QoS flows that may be considered sensitive, and thus require higher protection, may vary depending on specific use cases.

TABLE 7

QoS Flow Assignment to Primary and Secondary Paths

| Path SINR | | Type of Traffic | |
|---|---|---|---|
| 1 | 2 | VoIP | Other Traffic |
| SINR > $T_1$ | SINR > $T_1$ | Steer | Steer |
| $T_1$ > SINR > $T_2$ | $T_1$ > SINR > $T_2$ | Duplicate | Steer |
| $T_2$ > SINR > $T_3$ | $T_2$ > SINR > $T_3$ | Duplicate | Duplicate |
| SINR > $T_1$ | $T_1$ > SINR > $T_2$ | Path 1 | Steer |
| SINR > $T_1$ | $T_2$ > SINR > $T_3$ | Path 1 | Path 1 |
| $T_1$ > SINR > $T_2$ | $T_2$ > SINR > $T_3$ | Duplicate | Path 1 |
| $T_1$ > SINR > $T_2$ | SINR > $T_1$ | Path 2 | Steer |
| $T_2$ > SINR > $T_3$ | SINR > $T_1$ | Path 2 | Path 2 |
| $T_2$ > SINR > $T_3$ | $T_1$ > SINR > $T_2$ | Duplicate | Path 2 |
| SINR | | VoIP | Other Traffic |
| SINR > $T_1$ | | Steer | Steer |
| $T_1$ > SINR > $T_2$ | | Duplicate | Steer |
| $T_2$ > SINR > $T_3$ | | Duplicate | Duplicate |

By way of an example, a channel quality metric can be based on SINR as a measurement parameter. The SINR may be an effective SINR taking into consideration the quality of the channel across the hops in a multi-hop path from a source node to a destination node.

Consider IAB node 5 and the UL path to an end destination IAB donor node 1 of FIG. 2. IAB node 5 may make an SINR measurement of the link to its parent IAB node 3. IAB node 3 may communicate a channel quality parameter indicating how to allow for the channel quality of the multi-hop path from IAB node 3 to the IAB donor node 1. The channel quality for this path is not visible to IAB node 5 and so the information from IAB node 3 enables IAB node 5 to make an adjustment of the SINR measurement it has made to account for the remaining multi-hop path to IAB donor node 1. For example, IAB node 3 may have gathered the lowest SINR of all the multi-hops paths, between IAB node 3 and IAB donor node 1: between IAB node 3 and IAB node 1, and between IAB node 1 and IAB donor node 1. IAB node 3 may then communicate this effective SINR as the channel quality parameter to IAB node 5. IAB node 5 may subsequently determine the effective SINR for multi-hop IAB node 5 to IAB donor node 1 path, as the lowest SINR between the value communicated to it by IAB node 3 and its own measurement of the link between itself and IAB node 3.

A similar process may be carried out on a DL multi-hop path and for other nodes. Even UE's connected to an IAB node may carry out a similar process for their UL communications.

Consider the channel effective SINR and three thresholds $T_1$, $T_2$, and $T_3$, where $T_1 > T_2 > T_3$. With reference to Table 5, in a simple use case for two QoS service classes, real-time traffic such as VoIP and another such as non-real time traffic and streaming video with QoS flows not so stringent on latency and error are considered.

For VoIP, if both of the paths' SINR is above $T_1$, then traffic may be steered on a packet-by-packet basis on either of the paths, but the traffic may also be split so as to distribute, on average, the amount of traffic between the two paths as 50%/50% or 60%/40% etc. If only one path SINR is above $T_1$, then the traffic is exclusively sent on the one path where the SINR is above $T_1$. If both paths SINR is above $T_3$ and less than $T_1$ then the VoIP traffic is duplicated on both paths.

For other non-real time traffic, if both of the paths' SINR is above $T_2$, then the traffic may be steered on a packet-by-packet basis on either of the paths, but the traffic may also be split so as to distribute, on average, the amount of traffic between the two paths as 50%/50% or 60%/40% etc. If only one path SINR is above $T_2$, then the traffic is exclusively sent on the one path where the SINR is above $T_2$. If both paths SINR is above $T_3$ and less than $T_2$, then the other non-real time traffic is duplicated on both paths.

When both paths are suitable for steering traffic, in some embodiments it may be desirable to avoid switching paths on a per-packet basis. The SINR threshold may incorporate hysteresis to avoid switching a path back and forth on a per-packet basis or to ensure that a path is not switched unnecessarily often.

When any one path's SINR transitions so that it is below $T_3$, then a link degradation count down timer, $RT_1$, can be started for the path, a "link degradation" indication communicated to neighbor nodes and the IAB donor node, the QoS and priority of the RLC bearer for the path be moved up to the highest level, and procedures initiated to mitigate the poor link condition by re-routing the path to a path with better channel conditions.

Subsequently, if a secondary path's SINR transitions so that both paths have an SINR that is below $T_3$, then, the RLF countdown timer for the path that is already below $T_3$ can be set to a lower count $RT_2$, if the current count of the timer is above $RT_2$, to accelerate a potential "RLF" indication for the path, a link degradation count down timer, $RT_1$, started for the secondary path, a "link degradation" indication communicated to neighbor nodes and the IAB donor node for the second remaining path that has transitioned to an SINR below $T_3$, the QoS and priority of the RLC bearer for the second path moved up to the highest level, and procedures carried out to mitigate the poor link condition by re-routing the second path.

When the RLF count down timer expires for a path going through a recovery process, if a new path has not been assigned, then a "RLF" indication can be communicated to neighbor nodes and the IAB donor node.

If a new path is identified for a path going through a re-routing then a "alternate path established" indication can be communicated to neighbor nodes and the IAB donor node. If a re-routing attempt fails then a "failure to establish alternate path" indication can be communicated to neighbor nodes and the IAB donor node. This should typically not occur (or with a very low probability) or be circumvented, given the layered approach of steering QoS traffic flows over two concurrent and independent paths based on continuous channel quality assessment for both paths.

Alternate methods of achieving the objective of determining a channel quality of a multi-hop path to a destination node and transporting traffic over one or more multi-hop paths are also possible.

RLF Mitigation

Figure 6:
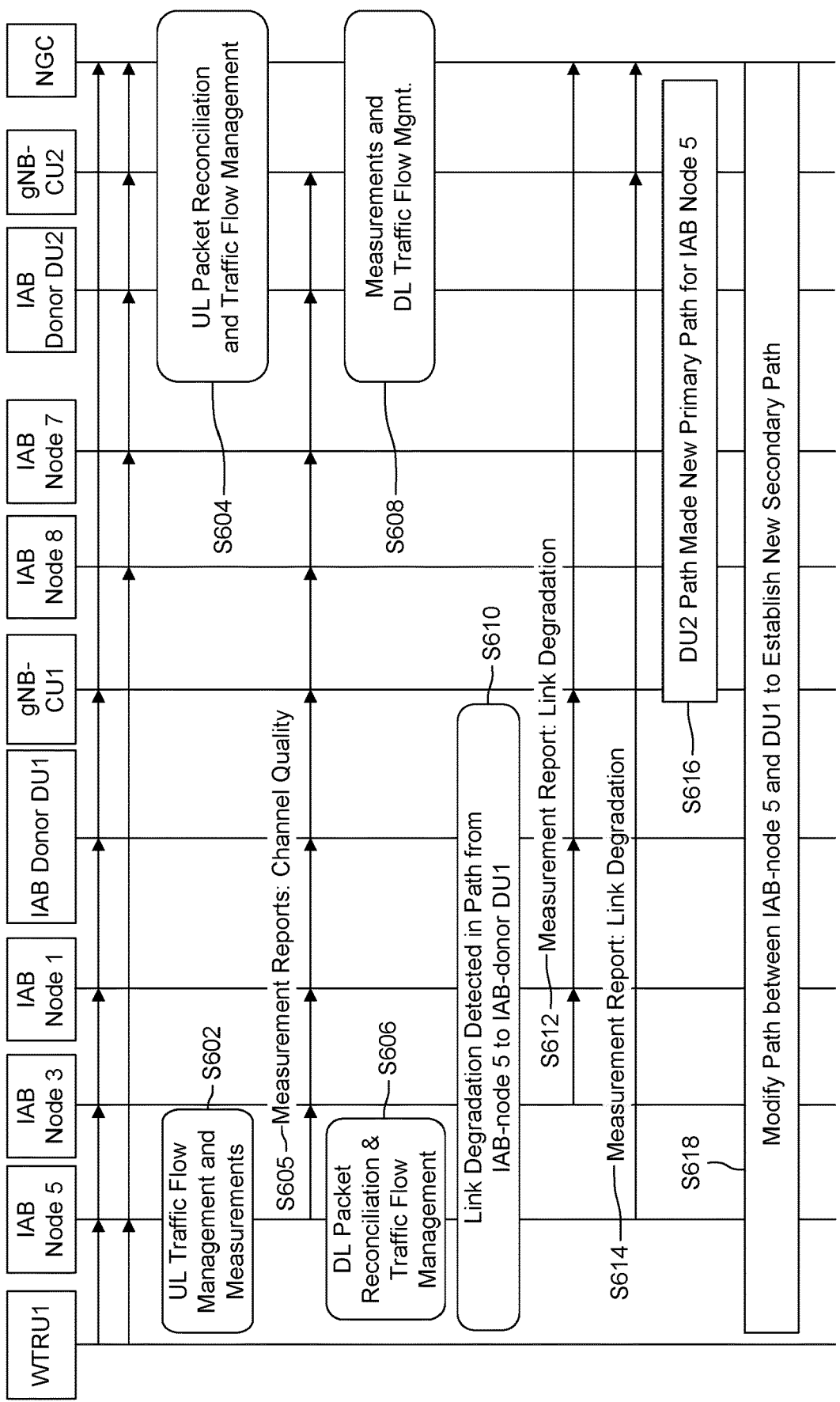
FIG. 6 illustrates a call flow diagram for transferring packets to and from an IAB Node over a primary path and secondary path according to an embodiment.

FIG. 6 illustrates a call flow diagram of a method for transferring packets to and from IAB Node 5 over a primary path and secondary path according to an embodiment. Based on measurements made for the two paths, packets are dynamically steered over the two connections to optimize resource usage and maintain service flow continuity. Traffic may be sent over the primary path and/or the secondary path for Congestion control and load balancing, to ensure Reliability, and to optimize Latency for time sensitive services (CRL). Upon determination of an RLF, a message is communicated to the source node to re-assign a primary path, if required, and to establish a new secondary path that avoids the hop that has suffered an RLF.

Communications have been established on the primary path between IAB node 5, IAB node 3, IAB node 1 and DU1 and on the secondary path between IAB node 5, IAB node 8, IAB node 7 and DU2, as indicated by the two lines at the top in which the hops are indicated. The primary and secondary routes are the same as in FIGS. 3A and 3B.

For IAB donor node 1 terminated bearer options that require Xn-U resources between IAB donor node 1 and IAB donor node 2, IAB donor node 1 provides Xn-U UL TNL address information. For IAB donor node 2 terminated bearers, IAB donor node 1 provides a list of available DRB IDs. IAB donor node 2 shall store this information and use it when establishing IAB donor node 2 terminated bearers. IAB donor node 2 may reject the request.

For IAB donor node 2 terminated bearer options that require Xn-U resources between IAB donor node 1 and IAB donor node 2, IAB donor node 1 provides a list of QoS flows per PDU Session for which IAB donor node 2 mesh network resources are requested to be setup upon which IAB donor node 2 decides how to map QoS flows to DRB.

For split bearers, the IAB donor node 1 and IAB donor node 2 mesh network resources requested may be of such an amount that the QoS for the respective QoS Flow is guaranteed by the exact sum of resources provided by IAB donor node 1 and IAB donor node 2 together, or even more. For IAB donor node 1 terminated split bearers, the IAB donor node 1 decision is reflected in the QoS Flow parameters signalled to IAB donor node 2, which may differ from QoS Flow parameters received over NG.

For a specific QoS flow, IAB donor node 1 may request the direct establishment of IAB donor node 2 mesh network and/or split bearers, i.e. without first having to establish IAB donor node 1 bearers. It is also allowed that all QoS flows can be mapped to the IAB donor node 2 terminated bearers, i.e. there is no QoS flow mapped to a IAB donor node 1 terminated bearer.

In step S602, measurements are collected and processed by IAB node 5 to determine the quality of the primary path and secondary path communication links. The measurements are collected from each node in an entire E2EMH path and the overall quality of the E2E path determined. IAB node 5 performs an assessment of the UL path for each of the primary and secondary paths in terms of capacity to handle the one or more traffic QoS flows. In step S604, the anchor IAB donor node 1 (for the case of bearers being terminated at IAB donor node 1), upon receiving UL traffic, performs packet reconciliation, ordering, and provides NACK/ACK feedback to IAB node 5.

In step 605, which occurs on a periodic basis, measurements are sent to the IAB donor nodes, hop-by-hop, over the primary path and the secondary path.

In step S606, measurements are collected and processed by the anchor IAB donor node 1 to determine the quality of the primary path and secondary path communication links. The measurements are collected from each node in an entire E2EMH path and the overall quality of the E2E path determined. The anchor IAB donor node 1 performs an assessment of the DL path for each of the primary and secondary paths in terms of capacity to handle the one or more traffic QoS flows; mechanisms described previously may be used to steer QoS flows over the two paths.

In step S608, upon receiving DL traffic, the IAB node 5 can perform packet reconciliation, ordering, and provide NACK/ACK feedback to the anchor IAB donor node 1 via the primary and secondary paths.

UL received packets may be forwarded to the NGC by the anchor IAB donor node 1 and DL packets from the NGC may be received by the anchor IAB donor node 1. In case of IAB donor node 2 terminated bearers or bearers split between IAB donor node 1 and IAB donor node 2, data forwarding and the CU Status Transfer may be handled over the Xn interface as appropriate during steps 602-608.

In step S610, an RLF is detected on the primary path between IAB node 5 and IAB donor DU1. The RLF may be detected by any of the end nodes or intermediate nodes in an UL or DL direction.

In step S612, upon detection of an RLF in the UL direction, a measurement report indicating an RLF is sent to CU1 in the UL direction by IAB nodes 3, IAB node 1 and DU1, depending on which hop of the primary path the RLF has occurred. The measurement report is further transported to the NGC.

In step S614, upon detection of an RLF in the DL direction, a measurement report indicating an RLF is sent to CU2 via the secondary path by IAB node 5. The measurement report is further transported to the NGC.

The measurement message may be broadcast to the neighbor nodes who may then continue forwarding the message towards the CU1 of IAB donor node 1 and CU2 of donor node 2. The message may include a time-to-live counter or hop counter to prevent over flooding the mesh network with stale messages.

In step S616, the secondary path is made the new primary path. If the secondary path was impacted by an RLF then no change is required to the primary path designation.

In step S618, the former primary path from IAB node 5, along IAB node 3, IAB node 1, and DU1 is re-routed to avoid the hop with the RLF. This may be a single step to re-route by the IAB donor node CU1. This may also be a two-step process: an initial process to mitigate the RLF by a local re-routing around the RLF followed by a re-routing by the IAB donor node CU1.

In an alternative embodiment, the IAB nodes may be attached to a single IAB donor node. In this case, a number of call flow steps may be simplified, collapsed, or superfluous (e.g. the resource allocation and RRC configuration steps across the Xn or N2/N3 interface). The new dual path may be established and advantage may be taken of the mesh network level IAB node synchronization and timing information.

Figure 7:
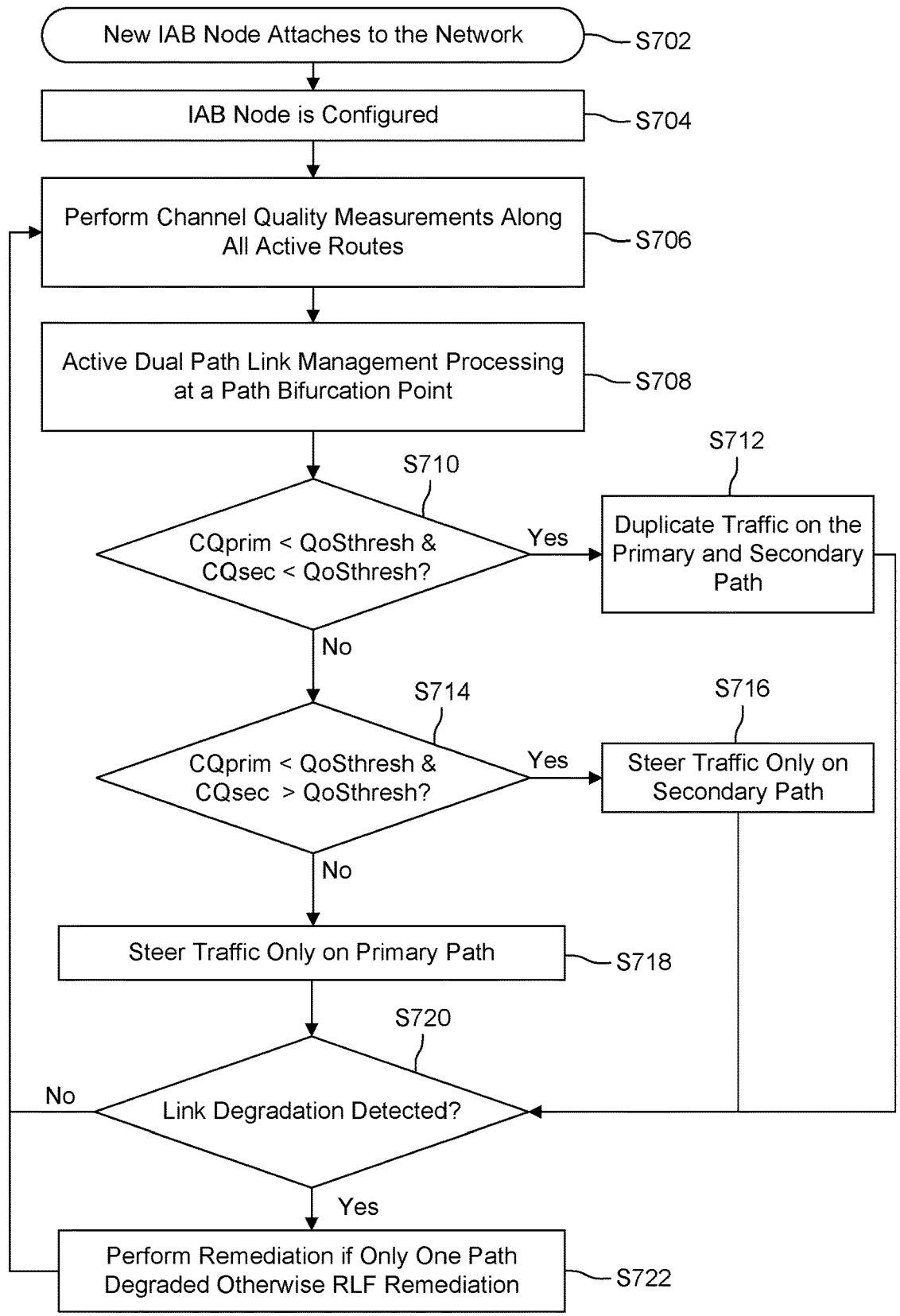
FIG. 7 illustrates the method of FIG. 6 from the perspective of an IAB donor node.

After a local re-route has been determined and applied to mitigate an RLF, a different re-route that avoids the particular hop suffering an RLF may be identified and used. This may be the case if the latter re-route is better, e.g. has better quality than the former. For example, a local re-routing may have occurred due to an RLF and a new path may be assigned in a seamless manner and without impacting service continuity FIG. 7 illustrates the method of FIG. 6 from the perspective of IAB donor node 1.

In step S702, a new IAB node attaches to the network.

In step S704, IAB donor node 1 configures the new IAB node including configuration of for example one or more of a route ID list, a neighbor node ID list, measurements setup, parameters for RLF and link degradation detection.

In step S706, IAB donor node 1 performs channel quality measurements along active routes.

In step S708, IAB donor node 1 performs active dual path link management processing on a per QoS path basis for an IAB node (donor or not) at a path bifurcation point In step S710, IAB donor node 1 determines whether the channel quality (referred to in previous descriptions as CQI)

of both the primary path, CQprim, and the quality of the secondary path, CQsec, is below a threshold, QoSthresh.

If this is the case, then, in step S712, IAB donor node 1 duplicates traffic on the primary path and the secondary path, after which the method continues in step S720, which will be described hereinafter.

However, if this is not the case, then, in step S714, IAB donor node 1 determines whether the channel quality of the primary path is below the threshold and the channel quality of the secondary path is above the threshold.

In this case, in step S716, IAB donor node 1 steers traffic only on the secondary path (whose channel quality is above the threshold), after which the method continues in step S720.

If this is not the case, in step S718, IAB donor node 1 steers traffic only on the primary path (whose channel quality is above the threshold).

Then, in step S720, IAB donor node 1 determines whether link degradation has been detected. If this is not the case, the method returns to step S706.

If link degradation has been detected, in step 722, then IAB donor node 1 performs remediation if only one of the first or the secondary path has been degraded and if both paths are degraded then IAB donor node 1 performs RLF remediation.

In a network, a handoff may comprise or include a node detaching from a (e.g., first) path and attaching to another (e.g., second) path. A handoff may occur, for example, upon detaching from an existing path and attaching to a new path and/or concurrently attaching to a new path whilst maintaining an existing path (e.g., prior to dropping the existing path), which may be referred to as a soft handoff.

5G systems may support an increased number of devices connected to a network, e.g., with higher data rates, and/or use of time and/or error sensitive applications, such as robotic control and gaming. 5G systems may include a micro-cellular network with much closer spacing than prior (e.g., traditional) spacing (e.g., several km) for macro basestations. A 5G system may include micro-basestations. A microbase-station may be implemented, for example, by laying out cabling from the micro-basestation to a radio head and from the micro-basestation to a control unit (e.g., a macro-basestation).

The inflexibility and cost of laying down cables (e.g., for micro-basestations) may be avoided, for example, by an integrated access and backhaul (IAB) micro-basestation node, which may connect or couple to other IAB nodes and/or to an IAB donor node (e.g., a macro-basestation), e.g., in a mesh structure. IAB nodes may utilize one or more wireless access frequency bands (e.g., in a shared manner) for access links from WTRUs to IAB nodes and/or for backhaul links between IAB nodes. IAB networks and mesh networks may be used interchangeably.

A gNB (e.g., in a 5G network) may be, for example, a (e.g., one single) logical node or may include multiple nodes, such as a central unit (CU) and/or one or more distributed unit(s) (DU(s)). A CU may be a logical node hosting, for example, a radio resource control (RRC), a service data adaptation protocol (SDAP), and/or a packet data convergence protocol (PDCP) of a gNB that controls the operation of one or more DUs. A DU may be a logical node hosting, for example, radio link control (RLC), medium access control (MAC), and/or physical (PHY) layers of the gNB. A CU and one or more DUs that may be controlled by the CU may be connected, for example, via an F1 interface. An F1 application protocol (F1-AP) may be used to convey lower-layer configuration information of radio bearers between a CU and a DU, and/or to set up a general packet radio service (GPRS) tunneling protocol (GTP) tunnel between a DU and a CU (e.g., for each radio bearer).

IAB networks may be based on (e.g., build on) a gNB CU/DU split architecture, for example, by enabling a (e.g., much) denser deployment of DUs in a micro-cellular network architecture of IAB nodes. An IAB donor node may comprise (e.g., include) a CU and one or more DUs (e.g., similar to a gNB). An IAB node may include, for example, DU functionality on one side and mobile termination (MT) functionality (e.g., similar to a WTRU function) on the other side. An IAB node may terminate DU functionality. An IAB donor node may terminate CU functionality. Multiple IAB nodes may be used, for example, in a hop-by-hop manner in a tree structure terminating at an IAB donor node. Hop-by-hop wireless backhaul connections may be used, for example, between IAB nodes and/or between a DU of a parent node and an MT of a child IAB node. The MT part is used to communicate with a parent node and the DU part is used to communicate with children IAB nodes or WTRUs. Hop-by-hop wireless backhaul links between IAB nodes may provide a backhaul connection to a parent IAB donor node.

A high data rate transfer between a WTRU and a serving micro-basestation (e.g., in a micro-cellular infrastructure) may be supported (e.g., enabled), for example, by use of massive multiple-input multiple output (MIMO) and/or active beam-steering. Radio link failures (RLF) may occur, for example, due to obstructions or interference, which may result in loss of connectivity.

Communications in an IAB mesh network for URLLC may be robust, reliable, and/or resilient, for example, as disclosed herein. Dual path communications may be established for traffic steering and/or duplication over one or multiple (e.g., two) paths. Resiliency from RLF may be provided, for example, by detecting a link degradation and the potential onset of an RLF on one path and mitigating the potential failure by establishing a new secondary communications path around the potentially affected hop. A secondary path may be identified, for example, by performing enhanced neighbor node measurements, which may include determining timing and power levels for attachment and/or reserving resources at a target node (e.g., in preparation for a potential handoff). An affected path may be (e.g., quickly or seamlessly) replaced (e.g., if/when link degradation is detected), for example, with a (e.g., the best or most suitable) neighbor node path, e.g., using the pre-determined information and pre-assigned resources. Traffic steering or duplication on the primary and/or (e.g., new or replacement) secondary path may resume, for example, in a seamless manner.

Figure 8:
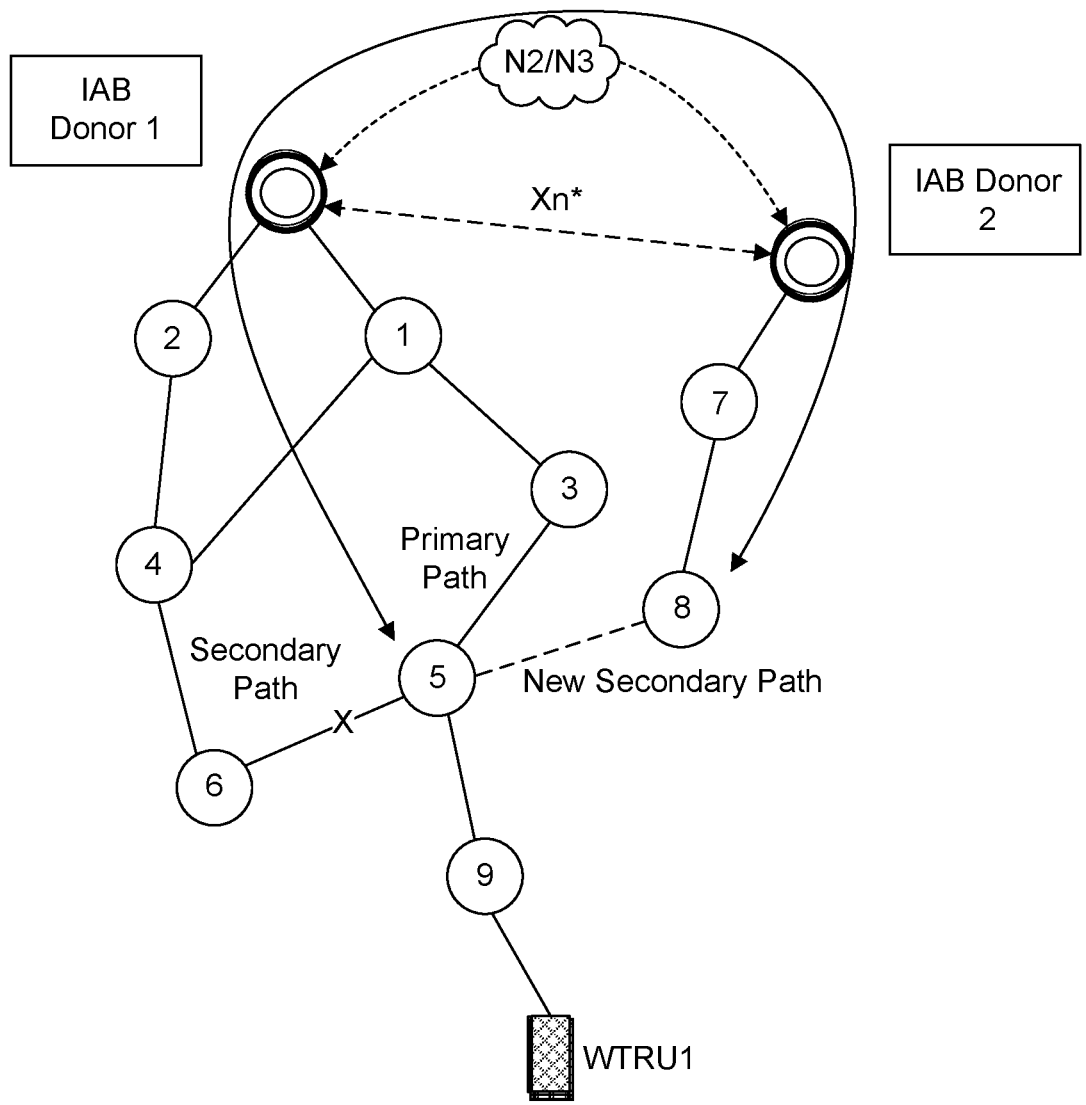
FIG. 8 illustrates an example of an IAB network comprising multiple IAB donor nodes.

An IAB network may be formed, for example, by connecting IAB nodes (e.g., in a tree structure and/or in a hop-by-hop manner), which may lead to an IAB donor node, for example, as illustrated in FIG. 8.

FIG. 8, similar to FIG. 2, illustrates an example of an IAB network comprising multiple (e.g., two) IAB donor nodes. IAB nodes may connect, for example (e.g., as shown by example in FIG. 2), by way of one or more wireless links to each other. IAB donor nodes may connect with the core network (CN), for example, over a wired connection.

A WTRU may communicate with a network, for example, via the nearest IAB node, which may (e.g., then) form a multi-hop backhaul path to an IAB donor node. One or more (e.g., any) of the hops along the end-to-end (E2E) multihop (MH) path (E2EMH path) may suffer an RLF, for example, due to a degradation of link quality (e.g., from interference or loss of coverage from obstructions). A single RLF (e.g., given the nature of the multi-hop connectivity) may impact the communications to/from child nodes and multiple (e.g., many) WTRUs. The impact of an RLF may be mitigated, for example, by detecting the onset of an RLF and (e.g., pre-emptively) activating an alternate path to a WTRU and/or by having access to an alternative path (e.g., at all times).

Operations may be (e.g., additionally and/or alternatively) impacted over a shared spectrum. Redundant paths may be utilized to overcome latency problems, which may be caused, for example, by a lack of channel availability at intermediate nodes. A lack of channel availability at intermediate nodes may be caused, for example, by co-channel interference from in-network or out-of-network transmitters or by a temporary link degradation due to blockages, which may involve directional transmissions at higher frequencies. Local re-routing around degraded hop links may be supported (e.g., enabled).

A URLLC service may be provided (e.g., where the URLLC service may be robust and/or reliable). In some examples, communications in IAB may be based on a multi-hop architecture. There may be a (e.g., very high) likelihood of link degradation or an RLF on a (e.g., any one) hop, which may disrupt service to the WTRUs being served by the IAB nodes downstream from a hop suffering the RLF (e.g., especially for a URLLC). Alleviating an IAB system from performing a handoff due to a degrading link or an RLF may help mitigate a service disruption.

An IAB link management procedure may (e.g., be enhanced to) maintain or confirm availability of an alternate path (e.g., at all times), for example, to alleviate service impact due to a link degradation or an RLF. An IAB node may perform measurements and/or may establish an alternate control path, which may be (e.g., quickly or seamlessly) activated, for example, if/when an RLF occurs on a current path.

Systems, methods, and instrumentalities are disclosed herein for Robust URLLC Communications. Measurements (e.g., enhanced measurements) may be processed together, for example, with a local decision at an integrated access and backhaul (IAB) node. Alternate paths may be measured, identified, and/or used, for example, to mitigate a degrading link and/or a potential radio link failure (RLF). An alternate control link may be established over an (e.g., a best) alternate path that may be used, for example, if/when a link degrades. Pre-emptive notification may be provided for user plane resources, e.g., if/when a path migration or addition may be implemented. A link degradation on a current path may be identified and/or indicated. Activation of user plane resources on an alternate control path may be fast or accelerated (e.g., seamlessly and/or with little to no disruption in communication). Transfer of service from a degrading path to an alternate path may be fast or accelerated.

An IAB link management procedure may (e.g., actively) manage primary and secondary inter-IAB donor node end-to-end (E2E) paths (e.g., multihop (MH) or (E2EMH) paths), for example, using measurement(s) information and/or topology information. An IAB link management procedure may (e.g., continually) measure and/or maintain a list of one or more of the following: (i) one or more alternate paths that may be switched to an impacted node (e.g., seamlessly and/or with little to no interrupted communications), and/or (ii) children node(s) and/or WTRUs that may be associated with the one or more alternate paths.

Measurements (e.g., enhanced measurements) may be processed together, for example, with a local decision at an IAB node. Alternative candidate neighbor node paths may be measured and/or (e.g., actively) managed. Alternate paths that may mitigate a degrading link and/or a potential RLF may be identified. One or more (e.g., all) viable neighbor node paths may be identified, for example, based on one or more measurements. Measurements may be carried out, for example, based on a coordination of time periods. A timing advance (TA), transmit power requirements, beam direction, and/or backhaul channel quality information to a destination IAB donor node may be determined (e.g., based on active coordination), for example, ahead of an attachment procedure, e.g., for fast or seamless attachment on alternate path neighbor node. Resources may be pre-allocated at a potential target neighbor IAB node (e.g., based on coordination), for example, ahead of an attachment procedure, e.g., to enable a fast or seamless switch. Switching to a new path (e.g., if/when a link degrades) may be based on a local decision.

Transmit/receive (Tx/Rx) buffer management may be provided. Communications over the backhaul may be temporarily interrupted, for example, if/when an IAB node determines to attach to a new parent node. The impact to children IAB nodes and WTRUs may cause further/additional service impact. A lag in recovering may, for example, disrupt URLLC communications and/or introduce a latency in communications. Children nodes and/or packet buffers may be managed, for example, to (e.g., seamlessly) reconfigure children nodes without service disruption.

Support (e.g., enhanced support) may be provided for children node reconfiguration, for example, if/when a parent IAB node detaches from one (e.g., a first) parent IAB node and attaches to another (e.g., a second) parent IAB node in an inter-IAB donor node network. Children IAB nodes and WTRUs may not be impacted, for example, if/when an IAB node attaches to a new parent IAB node. Routing configuration information for a new parent node may be provided to (e.g., set up at) children nodes, for example, to perform fast and/or seamless reconfiguration, e.g., if/when a parent IAB node attaches to a new parent node.

Communications for URLLC traffic in an IAB network comprising one or more IAB donor nodes and one or more IAB nodes servicing WTRUs may be robust and/or reliable. FIG. 8 illustrates an example IAB network comprising two IAB donor nodes. A variety of mitigation techniques may (e.g., be used to) channel degradation conditions. A "path" may refer to a multi-hop backhaul path from an IAB donor node to an IAB node serving a WTRU. An IAB donor node may be connected to the core network, for example, by a fiber link. IAB nodes may be connected to a parent IAB donor node, for example, by wireless hop by hop backhaul links. Wireless bandwidth may be shared between the backhaul and access links for WTRUs.

Service to a WTRU (e.g., WTRU1 in FIG. 8) may be achieved, for example, through a backhaul link path, such as IAB donor node 1, and IAB nodes 1, 3, 5, and 9.

RLF mitigation techniques may (e.g., inherently) depend on overcoming (e.g., working around) an RLF. Alternative paths may provide partial work arounds. For example, there may be an RLF on the link between IAB nodes 3 and 5. An alternative path may be via IAB nodes 1, 4, 6, 5.

An alternate path to WTRU1 may be part of the IAB donor node 1 mesh network topology. An alternate path may be independent of the path through IAB nodes 1 and 3. An alternate path to WTRU1 may be, for example, from IAB donor node 1 through IAB nodes 2, 4, 6, 5, 9.

An alternative path may be independent of the path through IAB donor node 1 and IAB nodes 1 and 3 to 5. An alternative path may be, for example, via IAB donor node 2 to IAB node 7, 8, and 5. An alternative path (e.g., via IAB donor node 2) may be based on coordination of the mesh topologies and communications between various IAB nodes, e.g., including IAB donor nodes 1 and 2. A logical interface, which may be referred to as Xn* (e.g., as shown in FIG. 8), between donor nodes may facilitate efficient communications between IAB donor nodes (e.g., to transfer control signaling and session information), for example, if/when establishing paths and/or coordinating/relaying data communications. A logical interface (e.g., the Xn* interface) may be realized, for example, as direct point-to-point communications between IAB donor nodes, via the N2/N3 interface to the core network (e.g., which may facilitate communications via the core network) and/or in other additional and/or alternative manners. References to a logical interface (e.g., the Xn* interface) may refer to a logical interface between multiple (e.g., two) IAB donor nodes.

Reliable and low latency communications (e.g., URLLC) may be implemented in IAB networks. Communications and reliable service delivery may be impacted by the (e.g., high) likelihood of an RLF along a (e.g., any one) hop of a communications path. RLF may occur in high band mmWave communications. A (e.g., mmWave) beam used for communications may (e.g., easily) be impacted with an RLF, for example, by an object appearing in the communications path, which may cause beam failure. Reliability and/or latency may be (e.g., significantly) improved (e.g., over a single path in an IAB network), for example, by performing communications over multiple (e.g., dual) paths and/or by (e.g., actively) steering, switching, splitting, or duplicating traffic over the multiple paths. Rapid recovery from a link degradation or an RLF, such as on a (e.g., one) path of a multi (e.g., dual) path communications, and/or re-establishment of dual path communications may be supported (e.g., enabled), for example, by measurements processing of neighbor nodes and/or by pre-emptive attachment to a target preferred neighbor IAB node (e.g., upon determination of link degradation).

One or more examples herein may reference IAB topology to describe various example implementations. One or more examples may be described by discussing various aspects of example implementations followed by one or more example call flows for one or more example implementations.

Measurements may be selected, taken and/or analyzed based on a configuration (e.g., configuration information). An IAB node may include a mobile terminal (MT) and/or a DU. MT may be used interchangeable with WTRU. An MT may include a WTRU and/or may include the same or similar functionality as a WTRU. An MT may (e.g., periodically) perform one or more measurements of surrounding cells. Measurement(s) may be taken, for example, during idle mode and/or connected mode. An MT may report measurements, for example, to the MT's parent IAB node, an IAB donor node, and/or a radio resource management (RRM) entity in a network. An IAB node may (e.g., also) performs measurements on the current active cell.

An IAB node may (e.g., determine to) attach to an IAB donor node mesh network. An IAB node may attach directly to an IAB donor node or indirectly, e.g., via a child IAB node of a mesh network. The attachment process may be the same as or similar to an attachment process in a WTRU cell search. The IAB donor node may (e.g., after the node attaches to the mesh network) send a configuration (e.g., via an RRC configuration message). A configuration may include, for example, a backhaul adaptation protocol (BAP) and/or measurements reporting information. Measurements reporting information may include, for example, one or more of the following: one or more BAP addresses and/or BAP path identifiers (ID); at least one primary BAP routing ID; a (e.g., default) UL BAP routing ID and/or a (e.g., default) BH RLC channel (e.g., to configure UL mapping for F1-C traffic); a neighbor nodes list (e.g., to monitor and coordinate periodic measurements); a measurement configuration and/or a measurement reporting configuration; one or more candidate neighbor attach nodes that may be good candidates for a handoff (e.g., candidate nodes may be in the neighbor node list, such as a subset of the neighbor nodes); and/or multi-hop channel quality metrics information from a neighbor node to an end destination node.

A neighbor node list may include intra-cell nodes and/or inter-cell nodes. An IAB node may perform (e.g., periodic) neighbor node measurements, for example, based on (e.g., as per) configured measurements parameters. An IAB node may (e.g., also) perform measurements on connected cell(s). An IAB node may (e.g., periodically) report (e.g., in RRC measurement reports) measurements to one or more IAB donor nodes.

IAB node measurements information may include, for example, one or more of the following: a reference signal received power (RSRP), a reference signal received quality (RSRQ), and/or a received signal strength indicator (RSSI) for a (e.g., each) neighbor IAB node; RSRP, RSRQ, signal-to-interference-plus-noise ratio (SINR), received signal code power (RSCP), received energy per chip divided by the power density in the band (EcNo) based on synchronization signal blocks (SSBs) and/or channel state information-reference signal (CSI-RS) for cell and beam channel measurements; automatic repeat request (ARQ) request/response (acknowledged/not acknowledged (ACK/NACK) and/or the timing of received ACK/NACK over different paths; one or more buffer status reports (BSRs); channel capacity metrics; end-to-end (E2E) round trip time (RTT); end-to-end Latency; a number of hops to reach an end destination node; a number of IAB-nodes and access WTRUs served by a (e.g., each) IAB node; a number of RLC channels and/or the multiplexing of WTRU traffic over the channels; and/or the like. A BSR may help assess a backhaul load and/or traffic congestion. A report (e.g., a buffer status report) may include a statistic of the quantity, such as one or more of the mean over the configured time period, the maximum or the minimum value over a configured time period, and/or the value of the metric at a time instant. Channel capacity metrics may include, for example, the mean, minimum, and/or maximum value computed over a configured time period, and/or the value of the metric at a time instant.

IAB nodes may be configured (e.g., as part of the measurements configuration) to trigger a handoff, for example, based on one or more assessed channel conditions. Trigger conditions may be pre-configured by the parent IAB donor node, for example, to be autonomously triggered (e.g., without the IAB node reaching out to the IAB donor node for handoff). For example, a trigger condition may be a degrading link based on a (e.g., an immediate) radio link channel to a parent IAB node and/or a trigger condition may include one or more E2E channel conditions to a destination node, which may include one or more measurement metrics (e.g., as disclosed herein).

IAB nodes may (e.g., also) be configured with trigger conditions to perform a reconfiguration, for example, if (e.g., in the event that) a parent IAB node suffers a link degradation (e.g., a link degradation that results in an attachment to a new parent IAB node). For example, the trigger condition may be an RLF to a parent node.

Multi-hop channel quality may be measured. An IAB node may perform measurements of the quality of a backhaul radio link, for example, for a (e.g., an immediate) hop in the upstream direction. A channel quality in the upstream direction may be to a parent IAB donor node. A channel quality in the downstream direction may be to an IAB node serving WTRUs.

A reported upstream channel quality may be based on observing one or more (e.g., any combination of) measurements, which may include cell measurements and/or measurements based on one or more of SSB, demodulation reference signal (DMRS), and/or CSI-RS. IAB nodes may (e.g., also) be configured to (e.g., periodically) report a cross link interference (CLI) received signal strength indicator (RSSI), for example, to determine how much adjacent cell interference nodes may be experiencing. Upstream direction channel quality measurements may be based on, for example, a sounding reference signal (SRS), such as a wideband channel quality indicator (CQI) and/or a sub-band CQI. Sub-band CQI measurements may be used (e.g., important), for example, for IAB nodes to allocate fractional or bandwidth part (BWP) resources.

Measurements (e.g., additional measurements) on the quality of a link may supplement physical layer measurements, such as the status of the transmit packet buffer (e.g., indicated in a BSR), number of hops, and/or round trip time (RTT) measurements, such as the time to send and receive an echo request/response message between multiple (e.g., two) nodes. A BSR report may provide an indication of how heavy a node is loaded and/or provide an indication of an impending problem, such as if the buffer is not emptying (e.g., due to excessive NACKs causing repeat transmissions). A reported BSR value may be a cumulative value or may include individual values for a (e.g., each) neighbor node and/or a (e.g., each) final destination. The number of hops may be an (e.g., indirect) indication of the latency time to a destination node. An RTT may provide an indication of one or more of the quality of a channel, an (e.g., indirect) indication of the number of hops to reach a destination node and receive a response, congestion in a network, overall E2EMH path efficiency, and/or the like.

A backhaul link may comprise (e.g., include) multiple radio link hops to a destination node. Measuring (e.g., only) the (e.g., immediate) hop radio link quality may not (e.g., alone) support assessing the channel quality of a multi-hop backhaul path to a destination node. Channel quality may vary between hops. For example, the channel quality may be good for a (e.g., an immediate) hop to a neighbor IAB node with which an IAB node is attached while the channel quality may be bad for a subsequent hop to a destination IAB node. A channel quality measurement may include a multi-hop channel quality. For example, a multi-hop channel quality may include an aggregate channel quality information of a path (e.g., an overall path) to a destination node, which may include multiple (e.g., all) hops from an adjacent node to reach a destination IAB node. Multi-hop aggregate channel quality information may (e.g., also) be configured for a (e.g., each) neighbor node in a neighbor node list. Multi-hop channel quality may be (e.g., periodically) updated by the IAB donor node, for example, based on gathering and/or processing of measurements reports.

Neighbor nodes may broadcast aggregate channel quality information, for example, in system information messages. One or more multi-hop channel quality metrics may be determined or broadcast by an (e.g., each) IAB node, for example, for multiple supported QoS flows. A multi-hop channel quality metric may reach a pre-configured threshold, which may indicate poor end-to-end link quality. An IAB node may indicate one or more thresholds have been reached and/or poor E2E link quality, for example, by a flag in a transmitted system information message and/or by suspending SSB transmissions (e.g., at least in directions without active connections), which may render the IAB node undiscoverable by (e.g., new) nodes.

Neighbor candidate nodes may be configured. The likelihood of an RLF may be high in an IAB network. Examples of mechanisms and procedures are described herein to support (e.g., enable) an attachment (e.g., a fast attachment) to a new node to provide seamless service (e.g., without incurring service outage due to the time it may take to perform an attach procedure). An IAB node may be provided with (e.g., additional) configuration information for a (e.g., small) set of candidate neighbor nodes in an neighbor node list. An IAB node may perform (e.g., additional) measurements on candidate neighbor nodes, for example, to prepare for an attachment (e.g., a fast attachment) at a later time (e.g., to provide seamless service).

An IAB donor node may (e.g., also) inform one or more neighbor IAB nodes (e.g., via, the IAB nodes' IAB donor nodes) of the configuration of an IAB node with candidate neighbor IAB nodes. A candidate IAB neighbor node may be aware of a potential IAB node and the IAB node's relationship with an IAB donor node, for example, if/when (e.g., in the future) the IAB node attempts to attach to the candidate neighbor IAB node. A candidate neighbor IAB node may become aware (e.g., in advance) of a need for resources, such as control channel and/or a user plane data channel configuration, e.g., to support an attachment request and/or for services via the neighbor IAB donor node network. An IAB donor node may (e.g., also) become aware of resources that may be used (e.g., needed) for a backhaul channel.

An IAB donor node may (e.g., based on one or more measurements reports) coordinate with a neighbor IAB donor node network, for example, to enable the IAB node to (e.g., quickly) attach to the neighbor node network. The IAB donor node may send a handoff configuration request message via the logical (e.g., Xn*) interface. A handoff configuration request message may include, for example, one or more of the following: a requesting IAB node identifier; resource(s) that may be used/needed; a time lapse parameter; and/or measurements information. Resources to be used may include, for example, control channel and/or QoS flows. Resources may be used/needed, for example, if/when the requesting IAB node sends an attach request to the candidate IAB donor node network. A time lapse parameter may be suggested. A time lapse parameter may be, for example, a minimum time lapse between sending a probe request message with an attach request and initiation of communications with the IAB donor node network. Measurements information may comprise, for example, information about received signal strength, candidate node received beam direction information, etc.

Resource information may precede potential handoff related signaling from IAB nodes of an IAB donor node network. Candidate IAB donor nodes may evaluate requested resources that may be used/needed (e.g., resource requirements). A candidate IAB donor node may allocate resources (e.g., in response to a request), for example, based on (e.g., in view of) availability and network load. A resource request may be on a per quality of service (QoS) flow basis. A corresponding resource allocation response may be on a per QoS basis.

Beam based resources may be allocated for communications in the mmWave band. Resources may be established for a beam that may service an IAB node, for example, based on the beam direction information received by a neighbor IAB donor node network. A requesting IAB donor node may indicate to a target IAB donor node the received beam(s) from the IAB node in the target donor node's network. Resources may be reserved for potential uplink transmission for (e.g., only) the beam(s) in the direction received by the requesting IAB node (e.g., and not for all beam directions).

A neighbor IAB donor node may respond with a handoff accept message, which may include, for example, one or more of the following: an IAB node identifier (e.g., assigned cell radio network temporary identifier (C-RNTI)) and/or a random access preamble (e.g., to be used by the IAB node if/when attaching to a neighbor IAB node network); E2E channel quality metrics for the IAB nodes in the neighbor IAB donor node network; system information (e.g., a master information block (MIB) and/or a system information block (SIB)) for the IAB nodes in the neighbor IAB donor node network (e.g., to enable determination of, for example, random access channel (RACH) occasion timing and/or corresponding resources; confirmation of a resource request, whether the resources have been allocated, and/or if the resources will be allocated upon an attach request from the IAB donor node (e.g., on a per QoS flow basis, as described below); confirmation of a minimum time lapse value and/or an alternate time lapse value (e.g., for sending a probe request with an attach request and the subsequent initiation of communications with the IAB donor node network); and/or the like.

A candidate IAB donor node may respond with one or more resource allocation indicators for a control channel (e.g., on a per QoS flow basis) for one or more data channels, e.g., as shown by example in Table 8 that shows an example of resource allocation indications from a candidate neighbor node.

TABLE 8

Example of Resource Allocation Indications from a Candidate Neighbor Node

| Resource Indicator | Control Channel Reservation | User Data Channel Reservation (per QoS Flow) |
| --- | --- | --- |
| Level 1 | Dedicated | Dedicated |
| Level 2 | Dedicated | Shared |
| Level 3 | Dedicated | Standby |
| Level 4 | Shared | Shared |
| Level 5 | Shared | Standby |
| Level 6 | Standby | Standby |

Dedicated (e.g., with reference to the example shown in Table 8) may indicate that a resource has been reserved. Shared may indicate that resources may be available for multiple candidate nodes. For example, shared resources may have been reserved in a general shared pool. Shared resources may be used by one or more candidate nodes. Shared resources may be allocated to the first node requesting an attach. Standby may indicate resources that may be (e.g., quickly) reserved upon receiving a notification for attach (e.g., without exchanging information, such as the nature of resources requested, which may include, for example, QoS flows, etc.).

Handoff negotiation and configuration may be completed and an IAB donor node may send configuration updates to the neighbor candidate donor node network, for example, from time to time (e.g., periodically and/or aperiodically), e.g., as measurement reports are received from IAB node(s) and/or as the services consumed by an IAB node are adapted and/or if handoff negotiation and/or configuration is completed. Sending/receiving configuration updates may result in updates to the configured information at the IAB nodes and/or at the neighbor IAB donor node network. For example, the resources that may be needed may change as various QoS service flows are adapted, added, or removed.

An IAB donor node may (e.g., also) configure/reconfigure (e.g., from time to time) the IAB node for handoff, e.g., to update various parameters. Parameters may include, for example, one or more of the following: the minimum time lapse value (e.g., between sending a probe request with an attach request and initiation of communications with the IAB donor node network); an expected probe response (e.g., response time window parameters relative to a probe request); a probe request cycle; an IAB node identifier (e.g., assigned C-RNTI) and/or the random access preamble to be used by the IAB node if/when attaching to the neighbor IAB node network; E2E channel quality metrics for the IAB nodes in the IAB donor node network; system information (e.g., MIB and/or SIB) for the IAB nodes in the neighbor IAB donor node network (e.g., to enable determination of, for example, RACH occasion timing); an indication of the attach procedure to use if/when attempting to attach to the IAB donor node network (e.g., probe request/response or immediate attach message, and/or the like). A probe request cycle may indicate, for example, power level settings for the probe requests (e.g., starting power level, maximum power level to reach for a consecutive sequence of probe requests, and/or a power increase step value), a time interval between successive probe requests, and/or the like.

A measurements configuration may be provided (e.g., for unlicensed bands). Additional configuration may be implemented, for example, for a neighbor node network operating in an unlicensed band. Measurements configuration information may (e.g., further) include one or more of the following measurements configuration information for neighbor IAB nodes: channel occupancy measurements on the random access channel; channel occupancy measurements on control and data channels; channel occupancy measurements on BWP and/or information on the BWP channels; and/or the like.

A configuration for a (e.g., each) IAB node (e.g., based on communications and/or negotiation with a neighbor node network) may include a configuration for one or more of the following: an acceptable BWP for a channel that may be used for a probe request and/or one or more response messages; and/or an authorization to use one or multiple channels for concurrent attach requests (e.g., multiple beams, FR1/FR2 channels, alternate RAT such as LTE, multiple candidate neighbor nodes, and/or the like).

Measurements may be processed. IAB donor nodes may collect measurement statistics for multiple (e.g., all) IAB nodes and/or may derive aggregated channel quality measurements for an E2E path. Single hop path (e.g., enhanced) channel quality metrics reported to an IAB donor node (e.g., from multiple (all) hops of an E2EMH path) may be (e.g., further) processed, for example, to determine aggregate backhaul channel metrics upstream and/or downstream from an IAB node to a destination node. The aggregate backhaul channel quality metrics may be used to determine the channel quality and performance for a multi-hop communication to the destination node. Performance may be determined, for example, in the form of one or more of the following: QoS, throughput, latency, channel capacity, and/or channel usage efficiency. A destination node (e.g., in the upstream) may be an IAB donor node. A destination node (e.g., in the downstream) may be an IAB node serving a WTRU.

Beam measurements may be implemented for operations in the mmWave spectrum. IAB nodes may (e.g., for beam measurements) monitor synchronization signal (SS)-RSRP, SS-RSRQ, and/or SS-SINR measurements, for example, to decide on one or more (e.g., the best) beams to use for communications between an MT of an IAB node and/or the parent IAB node DU. An MT may select or determine a (e.g., the best) beam. The MT may send a RACH on the selected/determined beam to the DU, which may identify to the DU the preferred beam to use for communications with the parent IAB node DU. A link may be established with a parent IAB node. The MT may (e.g., continuously) monitor an SSB or CSI-RS, which may be associated with an SSB, for example, to measure the SSB-RSRP, SSB-RSRQ, and/or SSB-SINR.

E2EMH path communications may have various quality among various links, e.g., between an IAB donor node and IAB nodes providing backhaul services and/or servicing WTRUs. E2EMH path communications may be assessed in a variety of ways. A channel quality assessment may use measurement parameters (e.g., as described herein), which may be collected and/or reported (e.g., in measurement reports from IAB nodes). A channel quality assessment may use zero or more (e.g., additional or other) parameters (e.g., as described herein), such as one or more of the following: total number of hops, lowest of each hop's maximum capacity (e.g., considering both downlink and/or uplink), traffic loading (e.g., BSR), a minimum of a (e.g., each) hop's RSRP, a minimum of a (e.g., each) hop's SINR, a number of IAB-nodes and/or access WTRUs served by a (e.g., each) IAB node, a number of RLC channels and/or the multiplexing of WTRU traffic over these channels, and/or the like.

An IAB donor node may utilize long term measurement statistics (e.g., maintained by the IAB donor node), for example, to determine (e.g., overall) channel quality and/or traffic loading involving multiple IAB nodes in an E2EMH path. An IAB donor node may provide adjacent node backhaul channel quality metrics for a (e.g., each) node in a neighbor node list in the measurement configuration information for a (e.g., each) IAB node.

A (e.g., each) neighbor IAB node may (e.g., additionally and/or alternatively) broadcast the backhaul channel quality metrics, for example, in system information to an IAB donor node and/or in broadcast channels in SIB messages. An IAB node may ascertain a backhaul channel quality from a neighbor IAB node to a destination IAB donor node, for example, if/when an IAB node performs a synchronization, synchronizes, and/or extracts system information from the neighbor IAB node. An IAB node may determine an overall E2E channel quality to a destination node, for example, based on backhaul channel quality information and/or measurement(s) on the neighbor IAB node channel quality.

One, some, or all measurement(s) (e.g., as discussed herein) may be monitored by an IAB donor node and/or locally by IAB nodes. A (e.g., any) deviation(s) or excursion(s) from determined value(s) (e.g., an assessed average or norm) may (e.g., be used to) trigger a handoff. A trigger for handoff may be based on one or more configured triggers. One or more triggers may be created and/or maintained for channel quality measurements to (e.g., immediate) neighbor nodes and/or the E2E path to a destination node. A determination/decision about which candidate neighbor IAB node to handoff to may be based on, for example, the local (e.g., immediate) hop channel quality and/or the multi-hop backhaul channel quality. A request may be made to the IAB donor node to perform a handoff (e.g., or route update). An IAB node may (e.g., additionally and/or alternatively) determine/decide (e.g., unilaterally or autonomously) to establish a secondary path for reliable communications. The IAB node may notify the IAB donor node, the target candidate neighbor IAB node and/or the IAB node's IAB donor node (e.g., about the determined secondary path).

Synchronization probes may be used. There may be a time lag in coordinating and performing an attach procedure, for example, if/when an IAB node determines to attach to a new parent IAB node. A procedure may implement one or more of the following actions: synchronize with a target IAB node (e.g., in terms of determination of timing, transmit power level, and/or beam direction); request allocation of resources to transmit a message (e.g., an L2/L3 message) to request establishment of services; and/or send a request to allocate resources for services.

RACH probes may be communicated to a target IAB node, for example, to determine synchronization timing, determine a transmit power level, and/or (e.g., subsequently) reconfigure the paths. A lag may disrupt (e.g., URLLC) communications and/or may introduce latency in communications.

In some examples, multiple RACH probes may be transmitted to an IAB node with progressive power levels until a RACH response is received. For example an initial power level may be determined for a first RACH probe. A subsequent RACH probe may be sent with an increased (e.g., a slightly increased) power level, for example, if a RACH response is not received after monitoring for a period of time, e.g., after sending the RACH probe. A transmit power level and timing advance may be established for subsequent communications, for example, based on the power level used for the transmission leading to a successful receipt of the RACH probe by the IAB node and subsequently receiving a confirmatory RACH response. One or more (e.g., multiple) RACH probes may be sent to acquire the appropriate power level and timing advance settings.

Beam direction information may be utilized for operations in the mmWave spectrum. An IAB node may provide beam direction information to a neighbor IAB donor node, for example, as part of the measurements processing communicated to an IAB donor node. Beam direction information may be provided, for example, so that the neighbor IAB donor node and an associated IAB node may become aware of the beam direction to use to establish communications with the IAB node.

An attach may be implemented with little to no active coordination of synchronization and attach procedures preceding a time of an attach. An attach procedure may be accelerated (e.g., at the time of attach), for example, by coordinating procedures to attach. For example, one or more (e.g., many) of the parameters and/or resources used to attach may be pre-emptively established. In some examples, one or more of the following may be (e.g., pre-emptively) determined: a timing advance, a transmit power level, and/or a beam direction for reconfiguration of the IAB node and allocation of resources in the neighbor network.

Broadcast information (e.g., previously collected from the neighbor IAB node) may (e.g., during a RACH process) enable determination of (e.g., required) transmit timing for a physical RACH (PRACH) preamble. A gNB may respond with a random access response (RAR), for example, within a (e.g., specified) time after transmission of a PRACH preamble. In some examples, there may be a window of approximately 10 ms (e.g., which may follow an approximately 3 ms gap after transmission of the PRACH preamble) during which a PRACH response may be expected.

A two-step RACH process may include the multi-step process of a RACH cycle into two steps. For example, the two-step RACH process may include the subsequent two steps of a full RACH cycle, which may lead to a successful connection. Communications may be integrated into the first two steps of the PRACH and RAR described above.

IAB networks may suffer periods of service interruption, for example, if/when a link suffers an RLF. A service interruption may be avoided, for example, by facilitating a fast handoff (e.g., for URLLC traffic). A handoff mechanism/procedure may be extensible, for example, to handoff or to establish dual connectivity, e.g., for inter-IAB donor node networks. IAB nodes may not (e.g., be expected to) be moving. Measurements (e.g., enhanced measurements) information gathered during periodic measurements processing may enable efficient and/or fast (e.g., seamless) handoff procedures to a target destination IAB node. An attach process (e.g., if/when attempting to attach to a neighbor node, for example, due to a link degradation or an RLF) may be accelerated, for example, by knowing the transmit power, timing advance, and beam direction. A probe request/response mechanism (e.g., similar to RACH probes) may be used during periodic measurements processing, for example, to determine a (e.g., required) transmit power level, timing advance, and/or beam direction settings that may be used during future/subsequent attach procedures if/when a link degrades. A probe request/response mechanism (e.g., similar to RACH probes) used during periodic measurements processing may be referred to as (e.g., enhanced) periodic measurements processing. The probe request/response mechanism may be used to ascertain attach related measurements and avoid the allocation of resources that are associated with the RACH procedures described earlier.

An IAB node may send a probe request (e.g., over a PRACH), for example, to synchronize with a target neighbor IAB node. The IAB node may receive a probe response from the target neighbor IAB node. The timing framework of the probe request message may be similar to a PRACH preamble. The timing framework of the probe response message may be similar to a PRACH Response. Probe request/response processing may enable an IAB node to determine, for example, a timing advance, a transmit power level, and/or a beam direction, e.g., if/when attaching to a neighbor IAB node. In some example, a simplified form of a probe request/response message may be implemented (e.g., in contrast to a PRACH preamble). A probe request may omit an indication of an L2/L3 message resource access grant request. A probe response may omit allocation of an RNTI identifier and the access grant (e.g., in contrast to a PRACH response). A probe request/response may gather (e.g., enhanced) measurements for candidate neighbor IAB nodes for potential handoff in the future, which may include TA, transmit power, beam direction, and/or backhaul channel quality information to a destination IAB donor node.

Measurement gaps may be used for neighbor cell measurements. An IAB node may perform neighbor IAB node measurements, for example, based on connected mode discontinuous reception (CDRX). An IAB node may perform neighbor IAB node measurements (e.g., in a CDRX mode), for example, using (e.g., by creating) time periods when measurements may be carried out without service disruption. Probe requests may be sent and probe responses may be monitored, for example, using a CDRX mode based time period allocation. An expected timing window for a probe response may be (e.g., more tightly) coordinated to coincide with receive time window opportunities available at an IAB node (e.g., for CDRX cycles), for example, by coordinating timing information between the IAB node and the target neighbor IAB node.

Synchronization may be established with a candidate neighbor IAB node (e.g., while continuing with communications), for example, by efficient coordination of timing for a probe request/response between the source IAB donor network and target neighbor IAB donor network IAB nodes. One or more of the following examples may be used, e.g., to coordinate the timing for the probe response message.

In some examples, a probe response may be received over a logical interface (e.g., the Xn* interface). A probe request message may include (e.g., additional) information elements, such as an identifier for the IAB node, and/or a unique probe identifier value (UPIV) (e.g., a probe count value). An identifier may be a RNTI or a C-RNTI. A target neighbor IAB node may communicate probe response information, for example, by way of a backhaul communications link between the target IAB node and the IAB node, such as via respective IAB donor nodes and a mutual Xn* interface (e.g., or N2/N3 interface). An identifier may enable the neighbor target IAB node to identify the IAB donor node and the IAB node and/or to determine the path to the IAB node for delivering the probe response message. A UPIV may enable the IAB node to align a received probe response message with a (e.g., an earlier) transmitted probe request message. A neighbor target IAB node may include an identifier and/or a UPIV in the probe response message.

Receipt of a probe response over the Xn* interface may be used, for example, during periodic measurements processing by the IAB node and/or if/when the target neighbor IAB node is unable to respond within a (e.g., suggested) response time window, such as if/when the (e.g., suggested) time window (e.g., as described in examples herein) is not achievable and/or if/when communications are over NR-U and/or LBT tests fail to provide a response opportunity. Excessive power ramp up may be avoided and/or a probe request/response time cycle may be controlled, for example, based on a determination of timing for successive probe requests. Timing for successive probe requests may be determined, for example, based on the configured measurement information for the multi-hop path latency in the neighbor node network, by the latency through the IAB node's network (e.g., E2E latency), and/or based on (e.g., by way of gathered) system information.

In some examples, a burst of probe requests (e.g., each with increasing power) may be sent to the target neighbor IAB node. The neighbor target IAB node may (e.g., based on the first successful reception of a probe request) respond over the Xn* interface with a probe response message for the first and/or subsequent successfully received probe request(s). The IAB node may not wait for a response from the IAB node, for example, when the IAB node sends the burst of probe requests. The probe request timing may be in compliance with the timing windows, etc., which may have been agreed upon between the IAB node and target neighbor IAB node. Parameters for power levels (e.g., min, max, step size) for the target neighbor IAB node may be (e.g., may have been) negotiated (e.g., via the respective IAB donor nodes), for example, during a configurations process and/or may be determined from system information.

A timing window may be coordinated via system information. Probe request/response timing may be established by the IAB node, for example, based on the timing information received in broadcast system information from the target neighbor IAB node, which may be similar to RACH/RAR timing. A requesting IAB node may send a probe request message to a target neighbor IAB node. The probe request message may include (e.g., suggested) timing information for reception of a probe response message from the target neighbor IAB node. The target neighbor IAB node may be requested to respond within a time window or indicate (e.g., suggest) a suitable time window in a response. A (e.g., compact) time window may be negotiated to be tighter than a common/typical RACH response time window (e.g., a period less than 10 ms within a common/typical 10 ms time window). An IAB node may (e.g., more efficiently) manage and multiplex measurement gap periods with probe request/response timing, for example, by negotiating a smaller response time window. An IAB node may use (e.g., begin using) updated timing information, for example, on the next probe request/response following receipt of the timing information over the broadcast system information. In some examples, negotiation may occur on a first probe request/response cycle and negotiated timing may be utilized thereafter on subsequent cycles.

Timing may be coordinated during probe request/response cycles. A probe response time window for a target neighbor IAB node may be aligned with the probe request timing for an IAB node and a common overlapping response opportunity time window may be negotiated with the target neighbor IAB node. The time window may be tightened (e.g., relative to a common/typical RACH/RAR time window), for example, to minimize the response monitor time by the IAB node. The probe request message may include information to enable determination of a desired probe response time window. The target neighbor IAB node may be requested to indicate (e.g., suggest) a suitable time window in a response. A time window may be negotiated that is different from a common/typical RACH response time window. An IAB node may (e.g., by negotiating a response time window) more efficiently manage and multiplex measurement gap periods and the probe request/response time cycle. In some examples, negotiation may occur on the first successful probe request/response cycle and negotiated timing may be utilized thereafter on subsequent cycles.

Timing may be coordinated during measurements configuration. A probe response time window may be agreed upon between an IAB node and a target neighbor IAB node, for example, by coordinating timing information between the IAB node and the target neighbor IAB node (e.g., via their respective IAB donor nodes). Communications may be carried out between an IAB node and a parent IAB donor node, neighbor IAB node, and/or associated/respective IAB donor nodes, for example, to coordinate and (e.g., mutually) agree on the time window. Communications may be carried out, for example, during establishment of a measurements configuration for the IAB node and/or during one or more (e.g., subsequent) reconfigurations.

A negotiation may (e.g., additionally and/or alternatively) be carried out over common, mutually reachable backhaul nodes that may communicate with each other. For example, a negotiation may be implemented by parent IAB nodes that have a (e.g., direct) communications link between each other.

In some examples, a probe request message may include a request to handoff to a target IAB node. For example, a IAB node may detect link degradation. The IAB node may identify a target IAB node as a (e.g., the best) candidate to handoff to. The IAB node may (e.g., determine to) attach to the identified target IAB node. The IAB node may send a measurements report to an IAB donor node. The report may indicate the IAB node may initiate, is initiating, or initiated a handoff to the target neighbor IAB node. The IAB node may (e.g., also) send an (e.g., immediate) attach request trigger to the candidate neighbor IAB node (e.g., via the probe request message). The candidate neighbor IAB node may respond with an acknowledge (e.g., via the physical downlink control channel (PDCCH)). The IAB node may monitor the PDCCH for an attach request acknowledge indication and/or (e.g., further) information, for example, on communications over the physical uplink control channel (PUCCH) and/or physical uplink shared channel (PUSCH). IAB node (e.g., after receiving an acknowledge) may resume service, e.g., via the (e.g., newly) attached neighbor IAB node. The acknowledge may be explicit or implicit, for example, by detecting the RNTI of the IAB node on the PDCCH indicating allocation of resources for a subsequent UL message.

The candidate neighbor IAB node may (e.g., additionally and/or alternatively) respond with an acknowledge, e.g., via a probe response message.

In some examples (e.g., example implementations), a probe request/response may include an RNTI identifier (e.g., C-RNTI) and/or an L2/L3 message resource access request/grant (e.g., similar to a RACH probe request/response). An RNTI may have been agreed upon or provided by a target IAB donor node to the IAB donor node, e.g., during a configuration process. An RNTI may be communicated to the IAB node during a configuration process. The RNTI may (e.g., subsequently) be used by the IAB node for probe request/response processing.

A PRACH may include, for example, one or more of the following fields: a preamble, node identifier information, a C-RNTI, and/or a UPIV. A PRACH response may include, for example, one or more of the following fields: an RA preamble identifier, timing alignment information, a temporary C-RNTI, and/or an initial uplink grant.

A probe request may be preceded with a listen before talk (LBT) test, for example, for access to unlicensed bands. Random access channel occupancy measurements information (e.g., including sub-bands and/or BWP) may be collected during periodic measurements. Random access channel occupancy measurements information may enable an IAB node to determine a (e.g., best) candidate neighbor node to attach to, for example, based on measurements information that may be used in licensed bands and/or channel occupancy information (e.g., including sub-bands and/or BWP). An LBT process may include, for example, determining the (e.g., best) candidate IAB neighbor node and/or sending a request for configuration information (e.g., via the IAB donor node(s)) to the candidate IAB neighbor node. The candidate IAB donor node(s) may negotiate, for example, one or more of the following parameters: time instances when the IAB node may attempt/try to send a probe request and/or an (e.g., immediate) attach message (e.g., after a successful LBT); RACH/probe request information (e.g., for use to access the IAB node); one or more subbands, and/or one or more BWP sufficient to fit the requested resources; an LBT power threshold (e.g., properly) scaled to compensate for the power in the wider bandwidth (e.g., to avoid creating undue interference for a wideband user); a maximum transmit power limit (e.g., to avoid causing interference); the (e.g., best) beam indicated by the requesting node to the candidate node (e.g., for the candidate node to listen to the probe/RACH/fast attach message); and/or the like.

Mechanisms described herein may be used to coordinate or negotiate parameters (e.g., described herein).

A probe request may be sent (e.g., following an LBT test), for example, over a single or multiple sub-bands or BWPs or over the full channel bandwidth (e.g., based on channel availability). A probe request procedure may enable IAB nodes to send one or more probe requests in an indicated subband of the bandwidth with (e.g., proper) transmit power, for example, if the subband is available and (e.g., hence) offering more opportunity for the node to transmit in the unlicensed band. In an (e.g., additional and/or alternative) example, the IAB node may attempt to attach over another (e.g., a next best) candidate neighbor IAB node, for example, if the LBT test indicates unavailability of the channel during one or more consecutive Rach Occasions (ROs).

A probe request message may be sent on a lower frequency (e.g., an FR1 band), for example, if/when communications are over FR2 (e.g., in NR). An adjustment may be carried out to determine the transmit power and timing advance for in-band (e.g., FR2, mmWave bands) communications, for example, based on the received power and timing (e.g., in the FR1 band).

A probe response message may be sent on a lower frequency (e.g., an FR1 band), for example, if/when communications are over FR2 (e.g., in NR) or over an alternate RAT (e.g., LTE). A probe response message may be sent on a lower frequency, for example, to reduce the latency and increase reliability in unlicensed bands.

In an (e.g., additional and/or alternative) example, a probe response message may be broadcast to neighbor nodes that may have reachability to forward the message to the IAB node.

In an (e.g., additional and/or alternative) example (e.g., for FR2), different beams may be identified that may be used to communicate with an (e.g., a particular) IAB node and/or LBT may be performed (e.g., concurrently) across multiple (e.g., all) beams. Based on the channel availability, the first available or the best candidate beam will be utilized to communicate with the target node.

Reconfiguration may be performed. A parent IAB donor node of the IAB node's network may be aware of the surrounding cells (e.g., as a result of the measurements reporting and subsequent processing). A parent IAB donor node may reconfigure the neighbor node list with candidate neighbor nodes. The parent IAB donor node may (e.g., also) inform the candidate neighbor IAB donor nodes of the IAB node and possibility that there may be an attempt to attach to the candidate neighbor node network, e.g., in the future.

Candidate neighbor IAB donor nodes may provide configuration information (e.g., IAB node identity) to their IAB nodes so that they may recognize an attach request coming from an IAB node and facilitate an attachment. Candidate neighbor IAB nodes may (e.g., thus) have advance notice that an IAB node may attempt to attach in the future and/or that stored information may be used to configure resources for the IAB node.

A link degradation may be determined, for example, based on (e.g., periodic) neighbor node measurements processing at an IAB node. The IAB node may (e.g., be able/configured to), e.g., based on various criteria, establish a (e.g., the best) candidate neighbor node to attach to, which may be referred to as the target neighbor IAB node. An IAB node may send a request for an uplink grant, for example, to request (e.g., by sending an L2/L3 message) establishment of a connection to the target neighbor IAB node. The IAB node may (e.g., quickly) attach and request the UL grant, for example, since the timing advance and transmit power may be known from the probe request/response in the enhanced periodic measurement processing. An IAB node identifier (e.g., similar to an RNTI) may (e.g., also) be sent to the IAB node. An IAB node identifier may be used by the IAB node in further/subsequent communications. The target neighbor IAB node may grant an uplink resource request, for example, based on configured information and/or may reach out to an IAB donor node to authorize and confirm the grant request (e.g., prior to accepting an incoming request). Resources may (e.g., subsequently) be granted. A response may be sent back to the IAB node for the uplink grant. The IAB node (e.g., upon receiving the uplink grant) may send a connection setup request to establish communications with the target neighbor IAB node. The target neighbor IAB node may (e.g., then) configure resources and return a reconfiguration request message to the IAB node. The IAB node may perform the reconfiguration and may respond with a reconfiguration complete message. Communications may (e.g., now) be established with the target parent IAB node.

In some examples, a request for L2/L3 resources and/or an uplink grant may be forwarded by an IAB donor node to a neighbor IAB donor node, for example, based on link degradation, which may be indicated by an IAB node in a measurement report. A request for an uplink grant may be explicit or implicit in the measurement report. An IAB donor node may communicate a handoff request to an IAB donor node of the target parent IAB node (e.g., via an Xn* interface). An IAB node may monitor for an uplink grant (e.g., directly) from the target neighbor IAB node, which may be indicated by signaling over the PDCCH or in a response (e.g., sent via the respective IAB donor nodes and the Xn* interface).

In some examples, a reconfiguration (e.g., procedure) may be handled between the IAB donor nodes and the IAB node re-configured (e.g., upon notification of the link degradation), for example, via a control message to the IAB donor nodes of the source and/or target IAB networks. The IAB node may attach to the target parent IAB node and (e.g., immediately) establish communications.

In an (e.g., additional and/or alternative) example, an IAB node may attempt to attach to a target parent IAB node. The IAB node may (e.g., during the attempt to attach) inform the target parent IAB node of the resources that may be utilized (e.g., QoS flow requirements) and/or communications resources desired from the target parent IAB node. Information provided by the IAB node may be transmitted in a variety of ways. Information may be included in the synchronization probes to identify the type of traffic resources that may be utilized (e.g., QoS flow requirements. For example, information may be included in a probe request or a message may be appended to the probe request informing the target neighbor IAB node of resources. For example, an identifier may be sent to the target neighbor IAB node. The identifier may enable determination of the resources and/or QoS requirements for establishing a connection. The identifier may be used to extract previously configured information, for example, to determine resources that may be needed (e.g., resource requirements). The configuration may have been implemented (e.g., carried out), for example, during the measurements or handoff configuration by the parent IAB donor node of the IAB node (e.g., via communications with the neighbor IAB donor node, such as via an Xn* interface or N2/N3 interface from the core network to the neighbor IAB donor node).

An IAB node may (e.g., based on resource requirements, such as QoS flows) approve a connection from a requesting IAB node, for example, (e.g., immediately) upon receipt of a probe request with an attach request indication. The IAB neighbor node may have reserved one or more resources beforehand and/or may establish one or more resources upon (e.g., on a condition of) receipt of the probe request.

In an (e.g., alternative and/or additional) example, information may be provided by the IAB donor node to the candidate neighbor node network, for example, with regard to the resources (e.g., QoS flows) that may be needed (e.g., required resources) by the IAB node. The candidate neighbor IAB donor node may configure the resources, radio access bearers (RAB) and/or may have provided information on the configured resources to the IAB donor node. The IAB node may be configured with information to establish the RRC reconfiguration by the IAB donor node. The probe request may be (e.g., completely) omitted during a handoff. The IAB node may send an (e.g., immediate) attach message to establish communications with the target neighbor IAB node. The (e.g., immediate) attach message may have fields that indicate an attach request (e.g., similar to information elements in a probe request message with an attach request indication).

The neighbor IAB node may respond to an (e.g., immediate) attach message, for example, via a response over the PDCCH with an acknowledge. The IAB node may (e.g., then) establish service over the neighbor IAB node network.

An IAB donor node network may be on standby and prepared for a (e.g., fast) reconfiguration of the resources in preparation/readiness for an attach request from the IAB node.

It may become known that resources have been pre-assigned in the IAB donor node network. An RRC connection reconfiguration complete message may be sent, for example, following detection of resources for the IAB node on the PDCCH channel. An RRC connection reconfiguration complete message may indicate to the candidate neighbor IAB node that the IAB node has reconfigured itself and is ready to resume communications via the neighbor IAB node.

Buffer management and/or children node reconfiguration may be performed. An IAB node may detach from a parent IAB node and may attach to a candidate neighbor IAB node. Configuration information for each child IAB node may (e.g., need to) be updated, for example, based on new paths established through the new parent IAB node. Configuration updates may include, for example, updates to one or more of the following: IP address(es); a (e.g., default) BAP configuration, such as an updated/new BAP address; a (e.g., default) BH RLC channel; a (e.g., default) UL BAP routing ID; one or more configured RLC channel(s); routing table information (e.g., entries for route ID, next hop node, destination node); and/or the like for existing communications. Application and activation of reconfigurations may be implemented with coordination, for example, to avoid loss of data packets and/or in support of in-transit data packets reaching an end destination node.

Configuration information for WTRUs served by children IAB nodes may include the neighbor IAB node's new IP address(es), for example, if/when there is a change of DU and/or CU. Security context may (e.g., also) be updated.

Children nodes of an IAB node may be pre-configured with updates, for example, via (e.g., by way of) a configuration request message. The children nodes of the IAB node may switch or begin using the pre-configuration updates, for example, if/when a trigger event is activated. A trigger event may occur after a successful handoff, attachment, or migration of the parent IAB node. A trigger event may be based on a reconfiguration request message, which may be received (e.g., from a parent IAB node) or implicit (e.g., if/when a child IAB node experiences an RLF).

An IAB node may (e.g., upon/on a condition of receiving a reconfiguration message) buffer (e.g., begin buffering) UL data and/or manage children nodes, for example, to suspend or slow down UL data transmission to the IAB node. An IAB node may (e.g., in the DL) notify a parent IAB donor node, which may suspend transmitting DL data via the path suffering a link degradation and send (e.g., begin sending) the data (e.g., via an Xn* interface) over a neighbor IAB donor node to a target candidate neighbor IAB node. A target candidate neighbor IAB node may buffer DL data, for example, until a link is established with the IAB node suffering a link degradation.

In an (e.g., additional and/or alternative example), an IAB donor node may continue to (e.g., also) transmit DL data (e.g., in a best efforts basis) and the IAB node may continue to send UL data (e.g., on a best efforts basis). Traffic may be steered over one or more good paths and one or more degrading paths, for example, based on assessed channel conditions for each path. The traffic steering may be on a packet by packet basis. More traffic may be steered over the good path. Traffic steering analyses and/or determinations may be based on, for example, QoS flow. Traffic may (e.g., also) be duplicated over multiple (e.g., both) paths, for example, for high priority and/or high reliability traffic.

An IAB node may attach to a target candidate neighbor IAB node. The IAB node and target candidate neighbor IAB node may synchronize the data delivery streams, for example, by determining the DL packets already received, discarding the DL packets already received, and resuming DL data delivery. UL data delivery may resume (e.g., via the new path). The IAB donor node may reconcile the received UL packets, synchronizing with the target candidate neighbor IAB node to discard UL packets already received by the IAB donor node.

A child IAB node may apply the pre-configuration information, for example, following a trigger event (e.g., as described herein). A child IAB node (e.g., once reconfigured) may use (e.g., begin using) the (e.g., new) reconfiguration, for example, by routing UL packets via the new/reconfigured path through the new parent IAB node.

UL and DL data packets may (e.g., also) be communicated over a path that is not suffering a link degradation. A decision about buffering versus transmitting over an alternate path may be based on, for example, channel conditions and/or the nature of the traffic (e.g., QoS flow characteristics).

In an (e.g., additional and/or alternate example), an IAB node may re-map and/or re-route UL packets via one or more paths through the new parent IAB node. Re-routing may be transparent to children nodes. An IAB node may receive notification that its children IAB nodes have reconfigured themselves, for example, based on receipt of a reconfiguration request message. Re-mapping and re-routing may be dropped. Packets received from the children IAB nodes may be routed, for example, based on the embedded routing information in the received packets.

Figure 9:
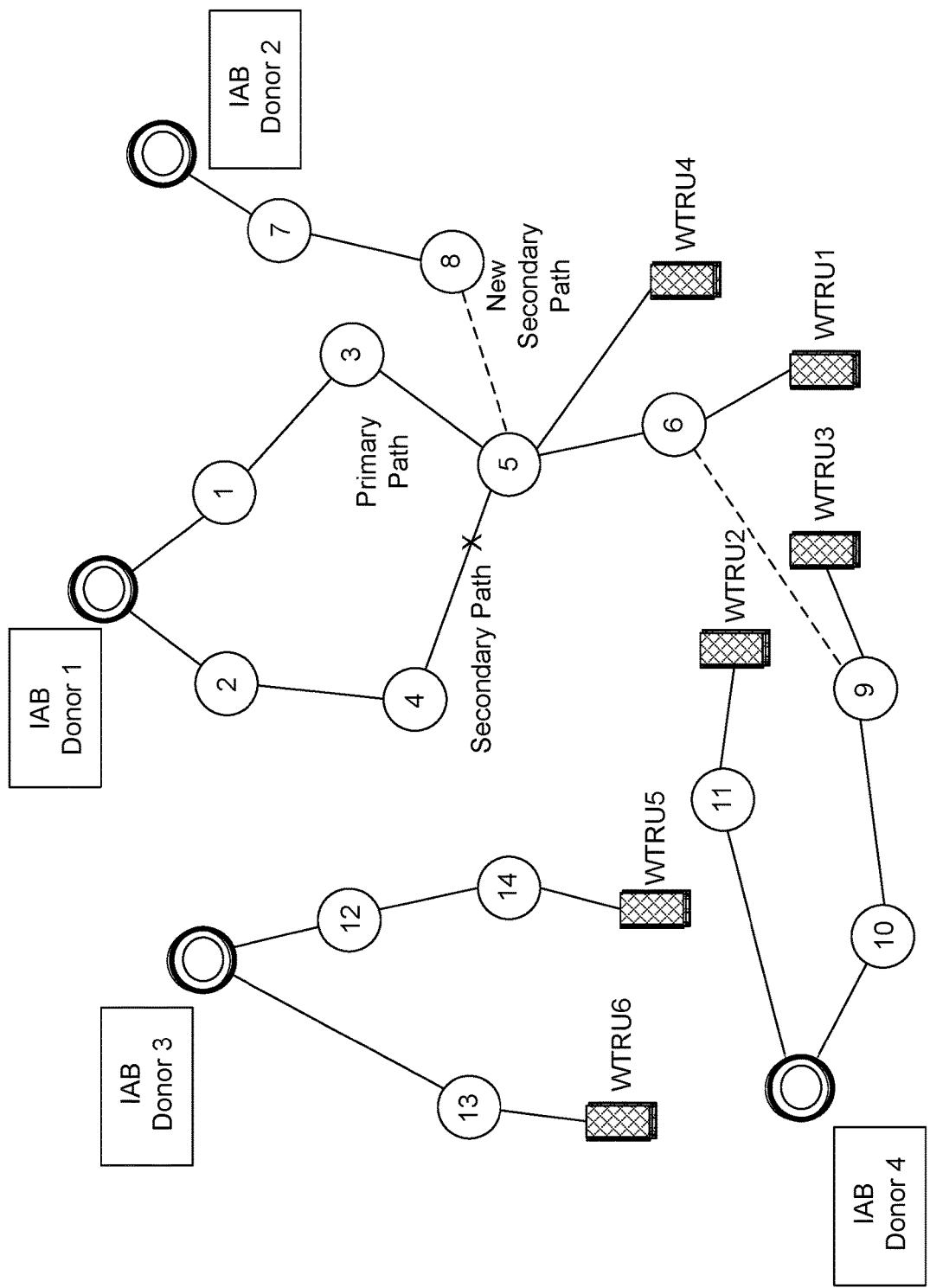
FIG. 9 illustrates an example of children node migration when a parent IAB node reconfigures a backhaul path.

FIG. 9 illustrates an example of children node migration when a parent IAB node reconfigures a backhaul path. Network topology may change, for example, if/when an IAB node detaches and attaches to a new neighbor IAB donor node network. Children IAB nodes and WTRUs may be further impacted due to new backhaul link channel conditions, for example, as illustrated by example in FIGS. 10A-10C. For example, a new route may increase a delay. The children IAB nodes and WTRUs may (e.g., also) receive measurements information and/or reports from a parent IAB node, which may reflect the backhaul channel conditions for the parent IAB node's new path via the target neighbor IAB node. The measurement reports may be provided, for example, as part of a configuration request message, separately, and/or based on a request by a children node.

Channel conditions may be assessed by the children IAB nodes and the WTRUs they support. Children IAB nodes may be pre-configured with additional trigger conditions that initiate a reconfiguration. A trigger event may be based on (e.g., due to) the change in backhaul channel conditions, for example, if/when a parent IAB node attaches to a new parent IAB node. Trigger conditions may be configured at the time of the configuration request message (e.g., as described herein) and/or as part of a measurements configuration.

Children IAB nodes and/or WTRUs may decide to migrate backhaul communications, for example, to another more balanced and/or more favorable backhaul link, e.g., in response to a change in backhaul channel conditions. A child IAB node and/or WTRU may migrate to a new IAB node and backhaul path (e.g., in a seamless manner), for example, using the same or similar technique(s) for a parent IAB node (e.g., as described herein). A child IAB node and/or WTRU may migrate, for example, as part of a reconfiguration due to a parent IAB node reconfiguration and/or as a secondary follow-on procedure.

A parent IAB donor node may decide to move children IAB nodes and/or WTRUs, for example, as a result of load balancing and/or fairness handling.

Migration of a parent IAB node may result in, for example, one or more of the following IAB children node reconfigurations. A child IAB node of a parent IAB node may, for example (e.g., after migration of a parent IAB node), receive services from a parent IAB node, which may (e.g., now) have multiple (e.g., two) inter-IAB donor node paths. A child IAB node of a parent IAB node may, for example (e.g., after migration of a parent IAB node), reconfigure to receive services from a new parent IAB node, which may have services from the same IAB donor node (e.g., the same source IAB donor node or the new IAB donor node). A child node may, for example (e.g., after migration of a parent IAB node), remove itself from the IAB parent node branch that is supported via the newly established inter-IAB donor node traffic and re-attach itself under a different parent IAB node, which may be part of another IAB donor node different from the source IAB donor node and/or the new IAB donor node.

New children nodes (e.g., IAB and/or WTRU that are not part of a source parent node tree) may attach to new parent or children IAB nodes, for example, to receive improved (e.g., overall) service.

A call flow may be multi-path (e.g., dual path URLLC call flow). FIG. 8 shows an IAB network comprising an IAB node 5 with two paths to IAB donor node 1. IAB node 5 may have duplexing and/or spatial division multiplexing (SDM) capability. IAB node 5 may perform one or more of traffic steering, switching, splitting, and/or duplication, for example, to support resilient URLLC communications and/ or to (e.g., seamlessly) handle an RLF (e.g., without service disruption). An IAB node may operate in redundancy mode (e.g., by duplicating traffic on primary and secondary links) or traffic may be (e.g., dynamically) steered, split, and/or switched over the primary and secondary paths (e.g., based on the channel quality for each path).

A primary path in a call flow may experience a link degradation. A primary path may pre-emptively attempt to find an alternate path. An alternate path (e.g., a best alternate path) may be via a new IAB parent node through a new IAB donor node, which may result in an inter-IAB node configuration. An IAB node may establish a new path that avoids a degrading E2EMH path. An IAB node may establish a new primary path via inter-donor node communications. An IAB node (e.g., with duplexing, SDM, and/or multi-RAT capability may handle multiple (e.g., two) connection paths. An IAB node may drop the old primary path before an RLF occurs.

Figure 10A:
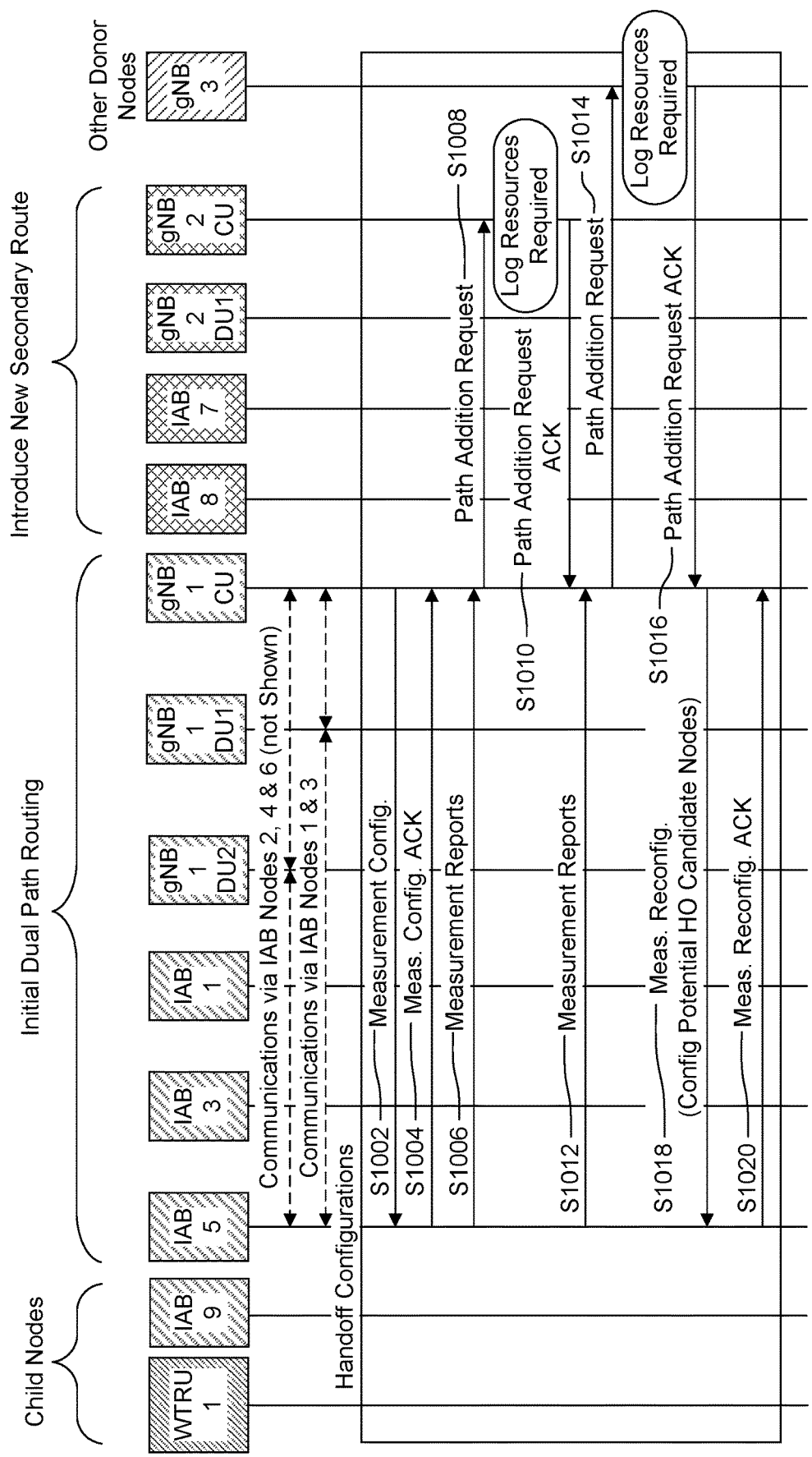
FIGS. 10A-10C together illustrate an example of procedures for establishing dual path inter-IAB node communications.
Figure 10B:
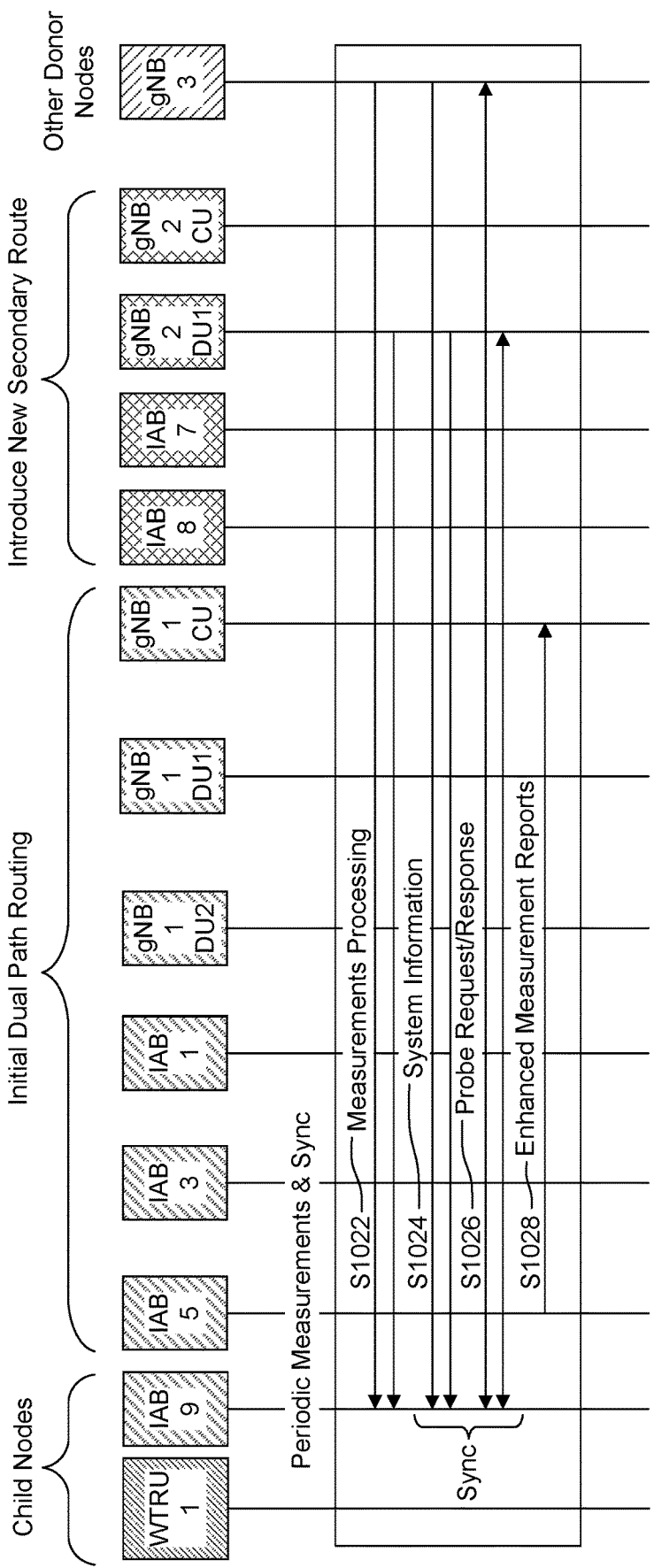
Figure 10C:
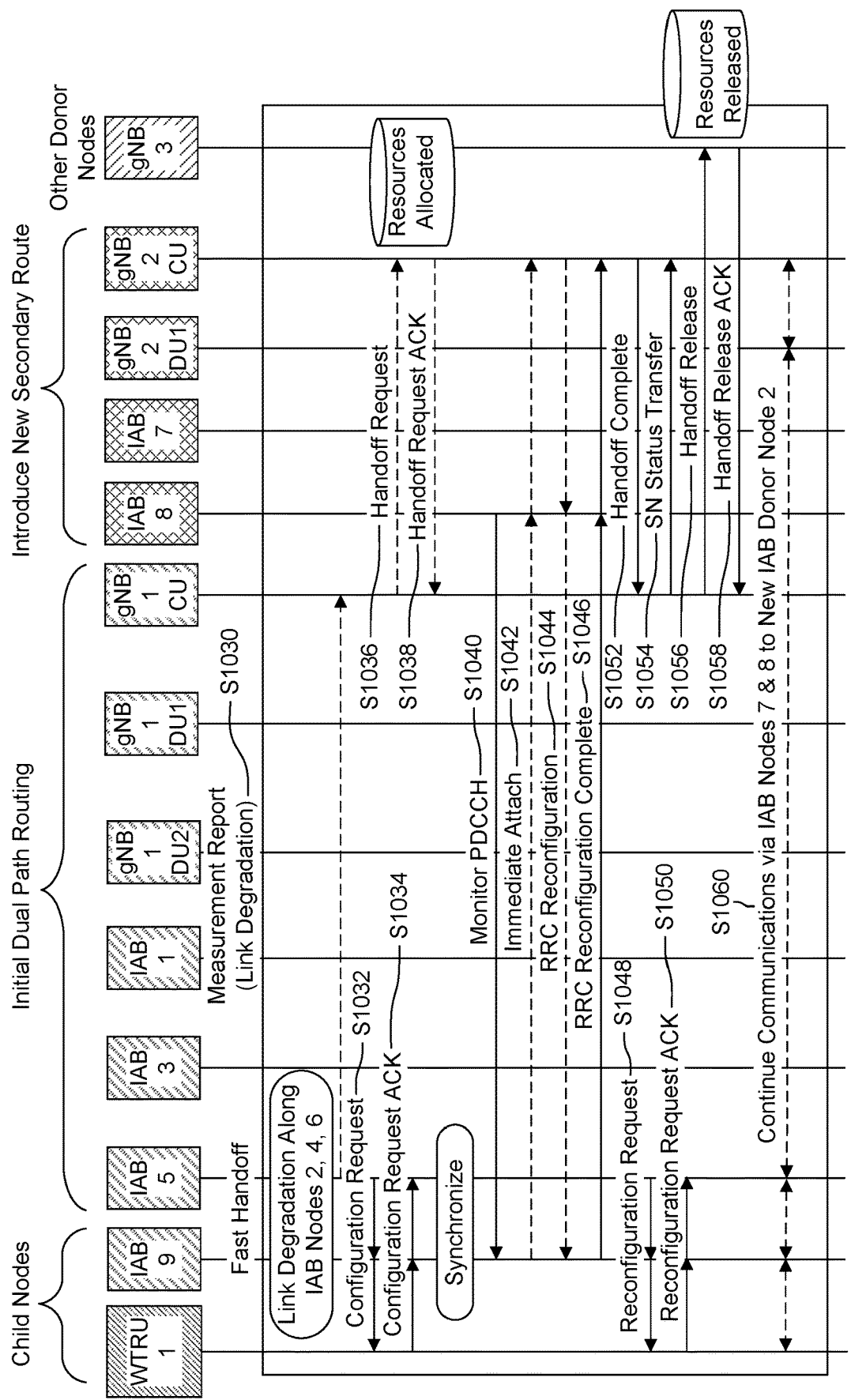

FIGS. 10A-10C together illustrate an example of procedures for establishing dual path inter-IAB node communications. In an example (e.g., as shown in FIGS. 10A-10C with reference to FIG. 8), intra-IAB donor node communications may be established on a primary path (e.g., between IAB node 5, IAB node 3, IAB node 1 and distributed unit (DU) 1 (DU1) and on a secondary path (e.g., between IAB node 6, IAB node 4, IAB node 2 and DU1). IAB node 5 may experience a link degradation on the path through IAB nodes 6, 4, and 2. IAB node 5 may identify IAB node 8 as a (e.g., best) alternate path to attach to and continue delivering services (e.g., in a seamless manner). The path through IAB node 8 may be via IAB node 7 to IAB donor node 2, which may use an inter-IAB donor node configuration. FIGS. 10A-10C show an example call flow diagram with example processing/handling of the link degradation and migration to an inter-IAB donor node setup for the foregoing example scenario.

Handoff configurations may be provided, where for example one or more of the following may be performed.

At S1002, IAB donor node 1 may send a measurements configuration message to IAB node 5.

At S1004, IAB node 5 may establish the measurements configuration. IAB node 5 may send a measurements configuration acknowledge message back to IAB donor node 1.

At 1006, IAB node 5 may perform measurements on neighbor cells. IAB node 5 may report the measurement results to IAB donor node 1. IAB donor node 1 may (e.g., upon processing the measurements reports) determine a set of candidate neighbor nodes that may be (e.g., good) candidates for a handoff, e.g., in the eventuality that IAB node 5 may suffer a link degradation. The candidate neighbor nodes may include IAB node 8 and IAB nodes of IAB donor node 3.

At S1008, IAB donor node 1 may request neighboring candidate IAB donor node 2 to prepare to add a path, for example, by sending a path addition request to candidate IAB donor node 2. The path addition request may include, for example, the IAB node(s) of the IAB donor node 1 network that may attach to the candidate IAB donor node 2 network and the corresponding IAB node in the IAB donor node 2 network (e.g., IAB node 8 in IAB donor node 2's network).

At S1010, candidate IAB donor node 2 may evaluate the requested resource requirements. Candidate IAB donor node 2 may allocate resources, for example, based on availability and/or network load. Candidate IAB donor node 2 may respond (e.g., to IAB donor node 1) with a path addition request acknowledge (ACK) and configuration information for IAB node 8 in IAB donor node 2's network. Resources may be allocated/noted for a control channel and/or on a per QoS basis for the user data (e.g., with the indication as shown in Table 8).

At S1012, IAB donor node 1 may receive one or more measurement reports from IAB node 5, e.g., based on measurements processing by IAB node 5.

At S1014, IAB donor node 1 may request IAB donor node 3 to prepare to add a path, for example, by sending a path addition request to candidate IAB donor node 3. The path addition request may include the IAB node(s) of the IAB donor node 1 network that may attach to the IAB donor node 3 network and the corresponding IAB node in the IAB donor node 3 network. There may be (e.g., as illustrated by example) other candidate IAB donor nodes. There may be additional candidate neighbor nodes. Similar requests may be sent to other/remaining candidate nodes.

At S1016, candidate IAB donor node 3 may respond with a path addition request acknowledge, configuration information for the IAB node 8, and/or an indication of the resource allocation (e.g., similar to example description at S1010).

The granularity of actions for requesting and/or reserving resources may be modulated between the source IAB donor node 1 and candidate IAB donor nodes. For example, the resources may be requested on a per QoS call flow (e.g., or Radio Access Bearer) of the IAB node traffic. The (e.g., best) candidate node may reserve dedicated resources, the other candidate nodes may reserve shared resources, and/or potential resources (e.g., resource requirements) may be noted and on standby, for example, based on the measurements collected at the IAB donor node 1.

IAB donor node 1 may update the candidate neighbor node list (e.g., from time to time), for example, based on the reservation responses from the neighbor IAB donor nodes.

There may be updates (e.g., from time to time) to the configurations that may be communicated amongst the donor nodes and IAB nodes, for example, as conditions change due to measurement reports processing, load balancing, and/or fairness handling. Resource requirements may change, for example, due to addition, deletion, and/or change to one or more of QoS flows, IAB nodes, and/or the like.

At S1018, IAB donor node 1 may send a measurements reconfiguration message to IAB node 5. The message may include, for example, the configuration information from the candidate IAB donor nodes 2 and 3 and/or the conditions to trigger execution of a handoff. Configuration information may (e.g., also) include, for example, trigger conditions to determine which of the candidate neighbor nodes' system information (MIB/SIB) may be monitored. Configuration information may (e.g., also) include, for example, a probe request/response that may be carried out to determine information, such as one or more of the following: a preamble, a transmit power level, a timing advance in case of a handoff, and/or the like.

At S1020, IAB node 5 may respond with a measurements reconfiguration acknowledge message to IAB donor node 1.

Measurements may be performed and/or used.

One or more measurements or related procedures may be carried out (e.g., periodically), for example, to assess channel conditions, e.g., to detect link degradation, whether a trigger condition has been met, and/or to determine attach timing and power requirements in readiness for an attach. One or more measurements or related procedures may be carried out, for example, independently or in a coordinated manner.

At S1022, IAB node 5 may maintain connection with parent IAB node 3 and IAB donor node 1. IAB node 5 may carry out measurements processing. IAB node 5 may evaluate (e.g., start evaluating) handoff trigger conditions for the candidate cell(s).

At S1024, IAB node 5 may acquire system information for at least one of the candidate neighbor nodes, for example, to determine system timing and RACH transmit preamble information. IAB node 5 may perform measurements on one (e.g., only the best) candidate neighbor node or multiple candidate neighbor nodes, for example, based on locally assessed channel conditions and/or configuration by the IAB donor node 1. In an (e.g., additional and/or alternative) example, system information for a candidate neighbor node may be sent by the neighbor IAB donor node (e.g., via IAB donor node 1).

At S1026, IAB node 5 may send a probe request to at least one of the candidate neighbor nodes. IAB node 5 may listen for a corresponding probe response during a subsequent listening window time period. IAB node 5 may increase the transmit power on the next probe request time occasion, for example, if no response is received. System timing and RACH transmit preamble information may be determined and stored, for example, if a probe response is received. The IAB node may (e.g., periodically, such as at a lower frequency), for example, conduct further checks of the acquired information (e.g., in case there may be updates).

In an (e.g., additional and/or alternative) example, candidate neighbor IAB donor node 2 may receive a request by IAB node 8 to forward the probe response message to IAB node 5 via the Xn* interface to IAB donor node 1 and then to IAB node 5.

Broadcast beam sensing may be carried out, for example, for mmWave bands with beam steering. A probe request may indicate the beam direction to IAB node 8. IAB node 8 may reserve resources on the beam that is aligned with the IAB node 5 for later attach (e.g., at S1042 and S1046). IAB node 5 and IAB node 8 may (e.g., then be able to) configure beams for subsequent signaling and/or user data exchange.

At S1028, (e.g., enhanced) measurements reports may be sent (e.g., periodically) to IAB donor node 1. Measurements reports may include information on one or more candidate nodes and/or the state of probe request/response message processing, preamble, transmit power level, and/or timing advance.

A (e.g., fast) handoff may support seamless service. One or more of the following may apply.

At S1030, IAB node 5 may perform measurements processing, for example, if the handoff trigger condition is met and if at least one candidate neighbor node satisfies the corresponding handoff execution condition. IAB node 5 may identify a (e.g., the best) candidate IAB node to attach to, for example, based on collected measurements, which may include the channel quality of the (e.g., immediate) radio link hop and/or the remaining backhaul connections to a destination IAB donor node. In examples, IAB node 8 may offer the best route. IAB node 5 may send a measurement report to IAB donor node 1. The measurement report may indicate a link degradation condition and the preferred IAB node 8 for attachment. The measurement report may be sent to IAB donor node 1, for example, over the primary route (e.g., via IAB nodes 3 and 1) and over the secondary route (e.g., via IAB nodes 6, 4, and 2).

IAB node 5 may redirect UL traffic over a primary path and a secondary path, for example, to compensate for link degradation. UL data may be suspended over the degrading link or may continue to be transmitted (e.g., on a best efforts basis) or steered (e.g., based on assessed channel conditions over both paths).

IAB node 5 may (e.g., also) request the WTRUs being served to suspend or slow down UL data transmission (e.g., on a per QoS basis).

At 1032, IAB node 5 may send a configuration request message to children nodes and WTRUs attached to the children nodes (e.g., IAB node 9 and WTRU1). The configuration request may include information on the neighbor IAB donor node 2 network to be used after a successful attach to IAB node 8 has been completed by IAB node 5. The configuration information for a (e.g., each) child node may include, for example, new IP address(es) and/or a new default BAP configuration, such as a new BAP address, a new default BH RLC channel, and/or a new default UL BAP routing ID, e.g., for the path that is undergoing modification. The configuration information may (e.g., also) include updated routing table information for existing backhaul traffic (e.g., if any). Routing table information may include, for example, one or more occurrences of a BAP address of a next hop node in UL/DL, a BAP address of the destination node in UL/DL, route ID, etc. The configuration information for a (e.g., each) WTRU may include new IP address(es), for example, if/when there is a change of DU. In an example, routing may be changed to a new IAB donor node 2, e.g., if/when attaching to the neighbor IAB node 8.

Children IAB nodes may manage (e.g., begin managing) UL packets, for example, by slowing down and requesting the WTRUs the children IAB nodes may be serving to suspend or slow down UL data transmission (e.g., on a per QoS basis).

At S1034, children IAB nodes and WTRUs may respond with a configuration request acknowledge.

At S1036, IAB donor node 1 may (e.g., upon receiving the measurement report) send a handoff request message to the neighbor IAB donor node 2. The handoff request message may indicate a handoff request to IAB node 8. The handoff request may include, for example, the IAB node 8 identifier and/or an indication of the resources that may be needed (e.g., required resources) for IAB node 5 (e.g., QoS flows).

In an (e.g., additional and/or alternative) example, the IAB donor node may (e.g., based on the measurements received from IAB nodes) preemptively send a handoff request message to a neighbor IAB donor node to allocate resources with a high priority, for example, if resources have not already been allocated by the neighbor IAB donor node.

At S1038, IAB donor node 2 may evaluate the requested resource requirements, assign the resources, and/or respond with a confirmation that the resources have been reserved. The IAB donor node may (e.g., subsequently) slow down or suspend sending DL packets over the degrading link and duplicate (e.g., begin duplicating) DL packets over the IAB donor node 2.

In an (e.g., additional and/or alternative example), the control channel and/or user data resources may be reserved (e.g., during the initial handoff request at S1010). Configuration updates may be provided by IAB donor node 1, for example, if there are changes to the QoS flows, etc. Assignment of resources may be skipped, for example, if/when they have already been reserved. An explicit or implicit confirmation may be provided (e.g., as described at S1040).

In an additional and/or alternative example, actions/operations at S1030, S1036, and S1038 may be omitted and/or an (e.g., immediate) attach message may be sent to attach to IAB node 8, for example, if/when it is known that the control channel resources (e.g., a UL grant) have been reserved, e.g., with an appropriate indication at S1016 or a later update.

At S1040, IAB node 5 may monitor the PDCCH channel for an assigned UL resource grant, for example, by listening for RNTI and channel allocation information.

At S1042, IAB node 5 may detach from parent IAB node 3, apply the stored configuration and synchronization information (e.g., for the selected target candidate IAB node 8) to synchronize and/or send an (e.g., immediate) attach message to IAB node 8. The message may indicate to IAB node 8 to establish resources that may be needed (e.g., required resources) for IAB node 5, for example, based on a prior indication of resources that may be needed (e.g., resource requirements), e.g., indicated during the handoff configurations.

In some examples, an (e.g., immediate) attach message may be sent as a contention free random access (CFRA) message with a previously provided preamble and RNTI (e.g., C-RNTI), for example, to avoid handling contention and determine transmit power level and/or timing advance, e.g., if/when pre-determined.

At S1044, IAB node 8 may establish resources. IAB node 8 may send an RRC reconfiguration message to IAB node 5.

In an (e.g., additional and/or alternative) example, actions/operations at S1042 and/or S1044 may be omitted, for example, if/when the IAB donor node 2 has reserved resources and provided (e.g., all) connection setup information for commencement of communications with IAB node 8. At S1040, IAB node 5 may monitor for a UL resource grant, which may (e.g., implicitly) indicate allocation of resources.

In an (e.g., additional and/or alternative example), actions/operations at S1030, S1036, S1038, S1042, and/or S1044 may be omitted and a (e.g., an immediate) commencement and resumption of communications may be initiated over IAB node 8, for example, if it is known that the resources have been reserved (e.g., with an appropriate indication at s1016 or a later update).

At S1046, IAB node 5 may apply the stored configuration and synchronization information for the selected target candidate IAB node 8 to synchronize to IAB node 8. IAB node 5 may send an RRC reconfiguration complete message to IAB node 8, e.g., to complete the handoff. IAB node 5 may delete the stored handoff configuration information related to IAB node 8, for example, after successful completion of the handoff procedure.

At S1048, IAB node 5 may send a reconfiguration request to children nodes and WTRUs. The reconfiguration request may indicate a successful handoff and attachment to IAB node 8. The child IAB node may apply the pre-configured new IP address(es) and a new default BAP configuration information, for example, for the backhaul links that may be serviced by a child IAB node serving one or more WTRUs. WTRUs being serviced by the child IAB nodes may apply the pre-configured new IP address(es).

At S1050, the children nodes and WTRUs may respond with a reconfiguration request acknowledge message. An IAB node (e.g., that may be serving as a backhaul hop for children IAB nodes) may wait for a reconfiguration acknowledge message from a child IAB node, for example, before applying the pre-configured new IP address(es), new default BAP configuration information, routing table updates, and/or the like.

At S1052, IAB donor node 2 may send a handoff complete message to IAB donor node 1, e.g., to indicate that IAB node 5 successfully accessed the neighbor donor node 2 network via IAB node 8.

At S1054, IAB donor node 1 may send a sequence number (SN) status transfer message to IAB donor node 2.

Buffered data packets and packet reconciliation may be carried out, for example, to avoid data retransmission and reduce latency.

At S1056, IAB donor node 1 may send a handoff release message to candidate neighbor donor nodes, for example, to release the handoff configuration information and the resources reserved for IAB node 5.

At S1058, the candidate neighbor IAB donor nodes may respond with a handoff release acknowledge message, which may indicate successful release of resources.

At S1060, communications may continue over the new connection, e.g., via IAB node 8 and via IAB donor node 2.

Alternate paths may be pre-established. A detach and attach procedure may be avoided if/when facing a link degradation, for example, by identifying one or more alternate backhaul paths beforehand and establishing and maintaining control path communications (e.g., on standby) over the alternate paths. A pre-establishment or standby mode of operation may enable an IAB node to maintain synchronization and connection status with one or more candidate neighbor IAB nodes for fast activation of a full communications link.

A pre-establishment or standby mode of operation may be useful and resource efficient for IAB nodes, for example, if they are static (e.g., in the same location). Maintaining link connection and synchronization for a static node may be easier than in a high mobility scenario. An IAB node may seamlessly handle handoff (e.g., from the perspective of link degradation and RLF), for example, in an optimized manner and/or without loss of service if/when an RLF occurs.

With reference to the example call flow illustrated in FIGS. 10A-10C, a connection may be made with a candidate neighbor node or nodes. A control path (e.g., F1-C) may be established and maintained on standby. Resources may be requested and reserved, for example, so that resources may be (e.g., already) allocated for establishing a control channel when a RACH process is carried out. A control path may be maintained with (e.g., full) context and synchronization information (e.g., including timing advance, transmit power level, beam direction, and/or radio channel conditions) pre-established and maintained for activation. A pre-establishment or standby mode may be similar to RRC inactive mode (e.g., as defined for 5G) together with additional synchronization (e.g., as described herein). In an example, link degradation may occur on a path. User plane communications for the candidate neighbor node with the best path may be activated. The IAB node may detach from the degrading path and user plane communications may be resumed (e.g., seamlessly) over the new path. Actions/operation at S1040-S1046 and S1052, S1054 may be replaced, for example, with an RRC reconfiguration message exchange with IAB node 8 in the IAB donor node 2 network.

Figure 11A:
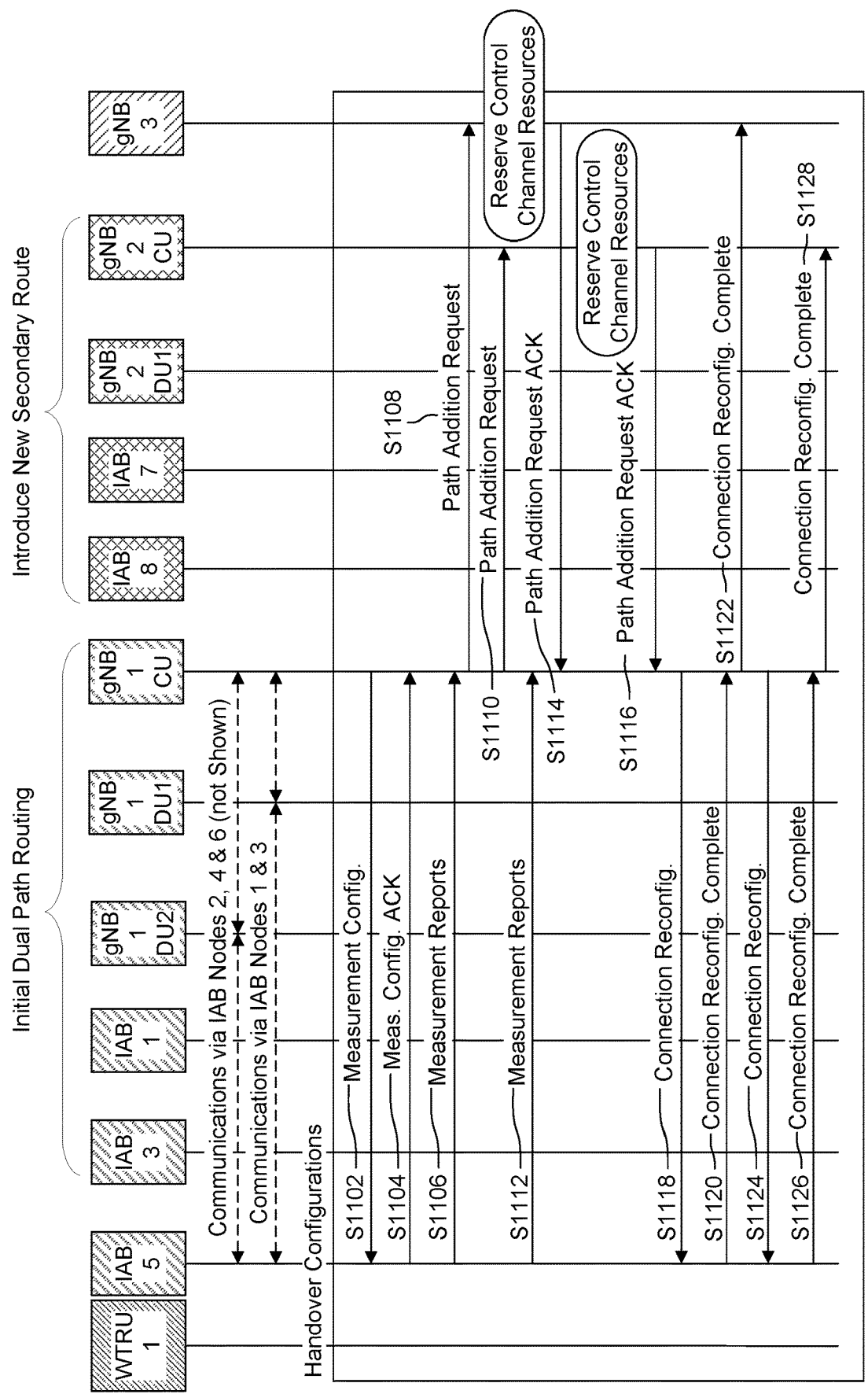
FIGS. 11A-11C together illustrate an example of a call flow for establishing standby control path communications.
Figure 11B:
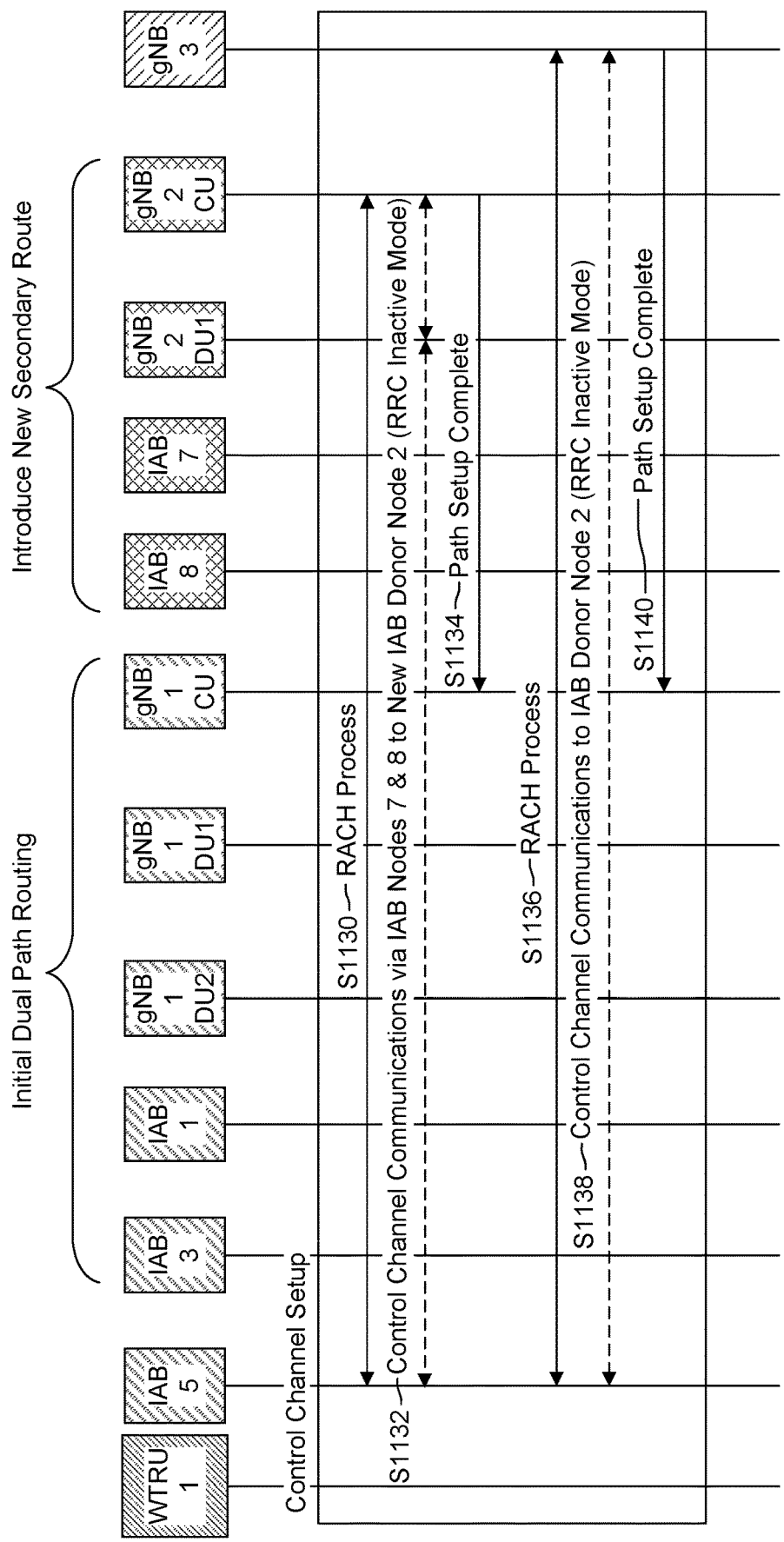
Figure 11C:
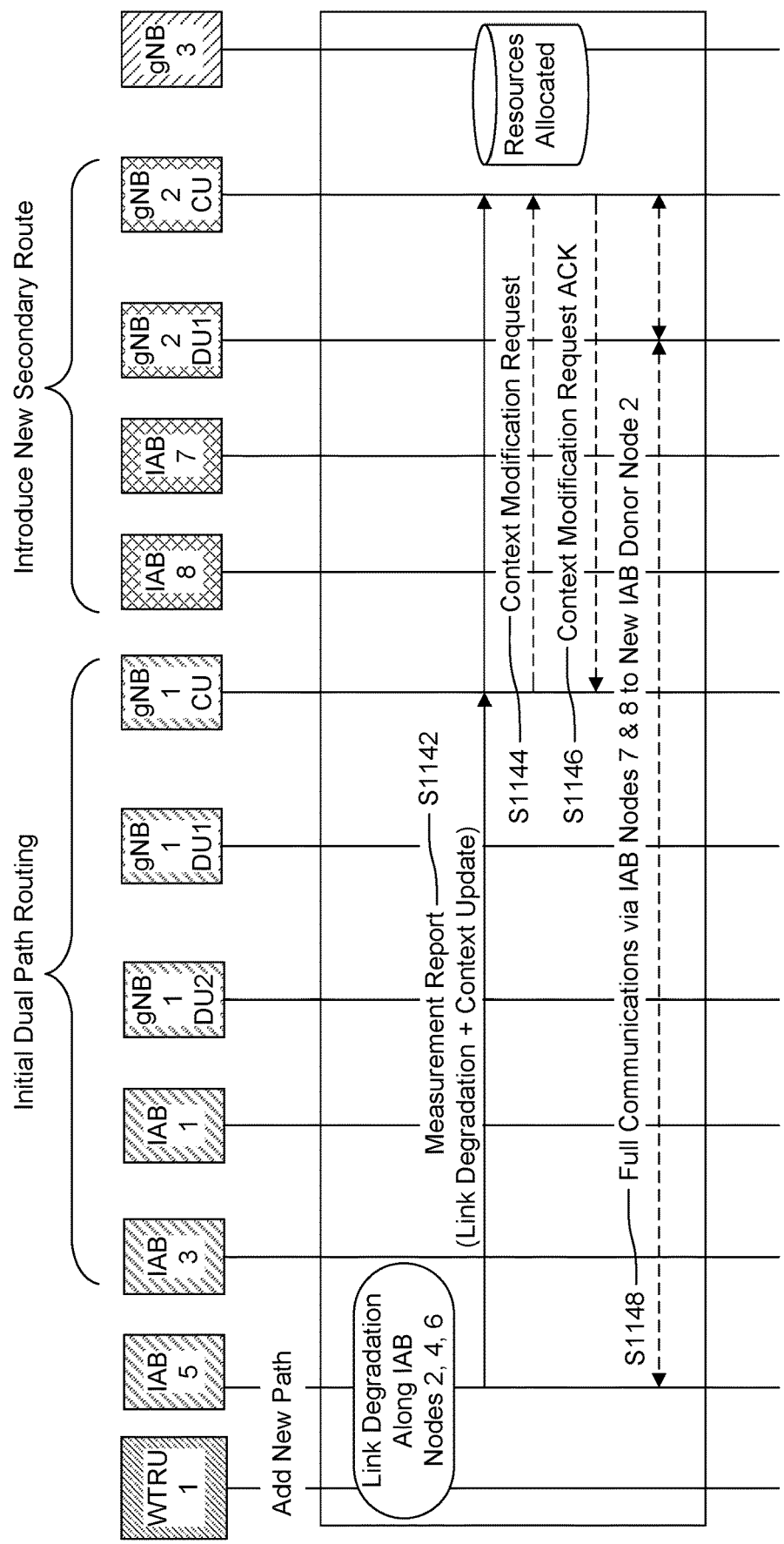

FIGS. 11A-11C illustrate an example of a call flow procedure for establishing standby control path communications, for example, as discussed herein. In an example scenario (e.g., as shown in FIGS. 11A-11C, with reference to FIG. 9), intra-IAB donor node communications may be established on a primary path (e.g., between IAB node 5, IAB node 3, IAB node 1 and DU1) and a secondary path (e.g., between IAB node 6, IAB node 4, IAB node 2 and DU1). IAB node 5 may experience a link degradation on the path through IAB nodes 6, 4, and 2. IAB node 5 may have a control path already established with IAB node 8 as an (e.g., a best) alternate path to utilize to continue delivering services (e.g., in a seamless manner). The path through IAB node 8 may be via IAB node 7 to IAB donor node 2, which may be implemented with an inter-IAB donor node configuration. FIGS. 11A-11C show an example call flow diagram for the example scenario shown in FIG. 9. FIGS. 11A-11C show handling of the link degradation and migration to an inter-IAB donor node setup. One or more of the following may apply.

At S1102 (e.g., as shown in FIG. 11A), IAB donor node 1 may send a measurements configuration message to IAB node 5.

At S1104, IAB node 5 may establish the measurements configuration. IAB node 5 may send a measurements configuration acknowledge message to IAB donor node 1.

At S1106, IAB node 5 may perform measurements on neighbor cells. IAB node 5 may report the measurement results to IAB donor node 1.

IAB donor node 1 may (e.g., upon processing the measurements reports) determine a set of candidate neighbor nodes that may be good candidates with which to establish a control path for a later path activation (e.g., in the eventuality that IAB node 5 may suffer a link degradation). The candidate neighbor nodes may include IAB node 8 and IAB nodes of IAB donor node 3. The candidate node information and/or conditions that may trigger an event to activate a user plane path over a control plane path, maintained on standby, may be provided to IAB node 5, for example, via (e.g., by way of) a measurements configuration update message.

At S1108, IAB donor node 1 may request neighboring candidate IAB donor node 2 to prepare to add a path, for example, by sending a path addition request to candidate IAB donor node 2. The path addition request may include, for example, the IAB node(s) of the IAB donor node 1 network that may attach to the candidate IAB donor node 2 network and/or the corresponding IAB node in the IAB donor node 2 network (e.g., IAB node 8 in IAB donor node 2's network).

At S1110, IAB donor node 1 may request IAB donor node 3 to prepare for to add a path, for example, by sending a path addition request to candidate IAB donor node 3. The path addition request may include the IAB node(s) of the IAB donor node 1 network that may attach to the IAB donor node 3 network and/or the corresponding IAB node in the IAB donor node 3 network. In an example (e.g., as shown in FIGS. 9 and 11A-11C), one other candidate IAB donor node is illustrated, but there may be zero or more additional candidate neighbor nodes in various examples. Similar requests may be sent to zero or more (e.g., remaining) candidate nodes.

Resources may be allocated for a control channel. Allocated resources may be allocated and/or noted, for example, on a per QoS basis for the user data.

At S1112, IAB donor node 1 may receive one or more measurement reports from IAB node 5 (e.g., based on IAB node 5 measurements processing).

At S1114, candidate IAB donor node 2 may evaluate the requested resource requirements. IAB donor node 2 may allocate control plane resources and/or may note the user plane resources. Candidate IAB donor node 2 may respond with a path addition request acknowledge and configuration information for IAB node 8 in IAB donor node 2's network. Candidate IAB donor node 2 may trigger a random access procedure, for example, so that synchronization may be performed. Candidate IAB donor node 2 may provide the new radio resource configuration to the IAB donor node 1, for example, in a connection configuration message that may be included in the path addition request acknowledge message.

At S1116, candidate IAB donor node 3 may respond with a control path addition request acknowledge and configuration information for the IAB node 8. IAB donor node 3 may make a note of the user plane resources. IAB donor node 3 may trigger a random access procedure, for example, so that synchronization may be performed (e.g., similar to action/operation at S1114).

IAB donor node 1 may update the candidate neighbor node list (e.g., from time to time), for example, based on the reservation responses from the neighbor IAB donor nodes.

There may be updates (e.g., from time to time) to the configurations. Updates may be communicated amongst the donor nodes and IAB nodes as conditions change, for example, due to measurement reports processing, load balancing, fairness handling, and/or the like. For example, a resource requirements notification may change, e.g., due to addition or deletion of QoS flows, IAB nodes, etc.

At S1118, IAB donor node 1 may send to IAB node 5 a connection reconfiguration message from IAB donor node 2.

At S1120, IAB node 5 may apply the new configuration. IAB node 5 may reply to IAB donor node 1, for example, with a connection reconfiguration complete message. IAB node 5 may perform the reconfiguration failure procedure, for example, if IAB node 5 is unable to comply with (e.g., part of) the configuration included in the connection reconfiguration message.

At S1122, IAB donor node 1 may inform IAB donor node 2 that IAB node 5 has completed the reconfiguration procedure successfully, for example, via the connection reconfiguration complete message received from IAB node 5.

At S1124, IAB donor node 1 may send to IAB node 5 the connection reconfiguration message from IAB donor node 3.

At S1126, IAB node 5 may apply the new configuration. AIB node 5 may reply to IAB donor node 1 with a connection reconfiguration complete message. IAB node 5 may perform the reconfiguration failure procedure, for example, if case IAB node 5 is unable to comply with (e.g., part of) the configuration included in the connection reconfiguration message.

At S1128, IAB donor node 1 may inform IAB donor node 3 that IAB node 5 has completed the reconfiguration procedure successfully, for example, via the connection reconfiguration complete message received from IAB node 5.

At S1130, IAB node 5 may perform a RACH process to synchronize with IAB node 8.

At S1132, control plane communications may be established between IAB node 5 and IAB donor node 2, e.g., via IAB nodes 7 and 8. The transmit power, timing advance, beam direction (e.g., for FR2) results of the RACH process, and/or the like may be noted. The control plane context may be maintained. The control plane may be maintained in a standby or dormant mode, for example, so that it can be activated (e.g., immediately) should a user plane path activation be required, e.g., due to a degrading link on an active path.

At S1134, IAB donor node 2 may respond to IAB donor node 1 that IAB node 5 has completed establishment of a control plane path with IAB node 8 and IAB donor node 2.

At S1136, IAB node 5 may perform a RACH process to synchronize with a neighbor IAB node belonging to the IAB donor node 3 network.

At S1138, control plane communications may be established between IAB node 5 and IAB donor node 3. The transmit power, timing advance, beam direction (e.g., for FR2) results of the RACH process, and/or the like may be noted. The control plane context may be maintained. The control plane may be maintained in a standby or dormant mode, for example, so that it can be activated (e.g., immediately) should a user plane path activation be required, e.g., due to a degrading link on an active path.

The control plane synchronization parameters for the backhaul paths to IAB donor nodes 2 and 3 may be reconfirmed (e.g., from time to time), for example, through a process that may be similar to a process described herein for a probe request/response.

At S1140, IAB donor node 3 may respond to IAB donor node 1 that IAB node 5 has completed establishment of a control plane path with the IAB donor node 3 network (e.g., either an IAB node of the IAB donor node 3 network or IAB donor node 3 itself).

At S1142, IAB node 5 may maintain a connection with parent IAB donor node 1. IAB node 5 may carry out measurements processing. IAB node 5 may evaluate the paths back to IAB donor node 1, for example, to detect link degradation conditions on a (e.g., any) backhaul path to IAB donor node 1. IAB node 5 may perform measurements processing. A candidate cell(s) path may be activated with (e.g., full) user plane communications, for example, if at least one candidate neighbor node satisfies a corresponding path activation execution condition. IAB node 5 may identify a (e.g., the best) candidate IAB node path to activate, for example, based on collected measurements that include the channel quality of the (e.g., immediate) radio link hop and/or the remaining backhaul connections to a destination IAB donor node. IAB node 5 may send a measurement report to IAB donor node 1 indicating, for example, a link degradation condition and the preferred IAB node 8 for attachment, e.g., if IAB node 8 offers a (e.g., the best) route. The measurement report may be sent to IAB donor node 1 over the primary route (e.g., via IAB nodes 3 and 1) and the secondary route (e.g., via IAB nodes 6, 4, and 2).

At S1144, IAB donor node 1 may (e.g., upon receiving the measurement report) send a context modification request message to the neighbor IAB donor node 2 indicating, for example, a (e.g., full) control and user plane path activation request to IAB node 8. The context modification request may include, for example, the IAB node 8 identifier and an indication of the resources that may be needed (e.g., required resources) for IAB node 5 (e.g., QoS flows).

At S1146, IAB donor node 2 may evaluate the requested resource requirements, assign the resources, and respond with a confirmation that the resources have been reserved, e.g., via a context modification request ACK message.

Path and UL/DL buffer management procedures (e.g., similar to procedures described herein) may be carried out, for example, to minimize packet loss, latency, and/or to perform a seamless transition from a degrading path to the newly activated path via IAB node 8.

At S1148, communications may continue over the new connection, e.g., via IAB node 8 and via IAB donor node 2.

Dual anchor node handling may be performed. Reliable and/or low latency communications (e.g., URLLC communications) for an IAB node may occur over multiple (e.g., two) paths that originate from an IAB donor node. The IAB donor node may be an anchor for traffic steering, switching, splitting, and duplication over both paths. The IAB donor node may (e.g., also) be an anchor for RRC control for both paths.

Figure 12:
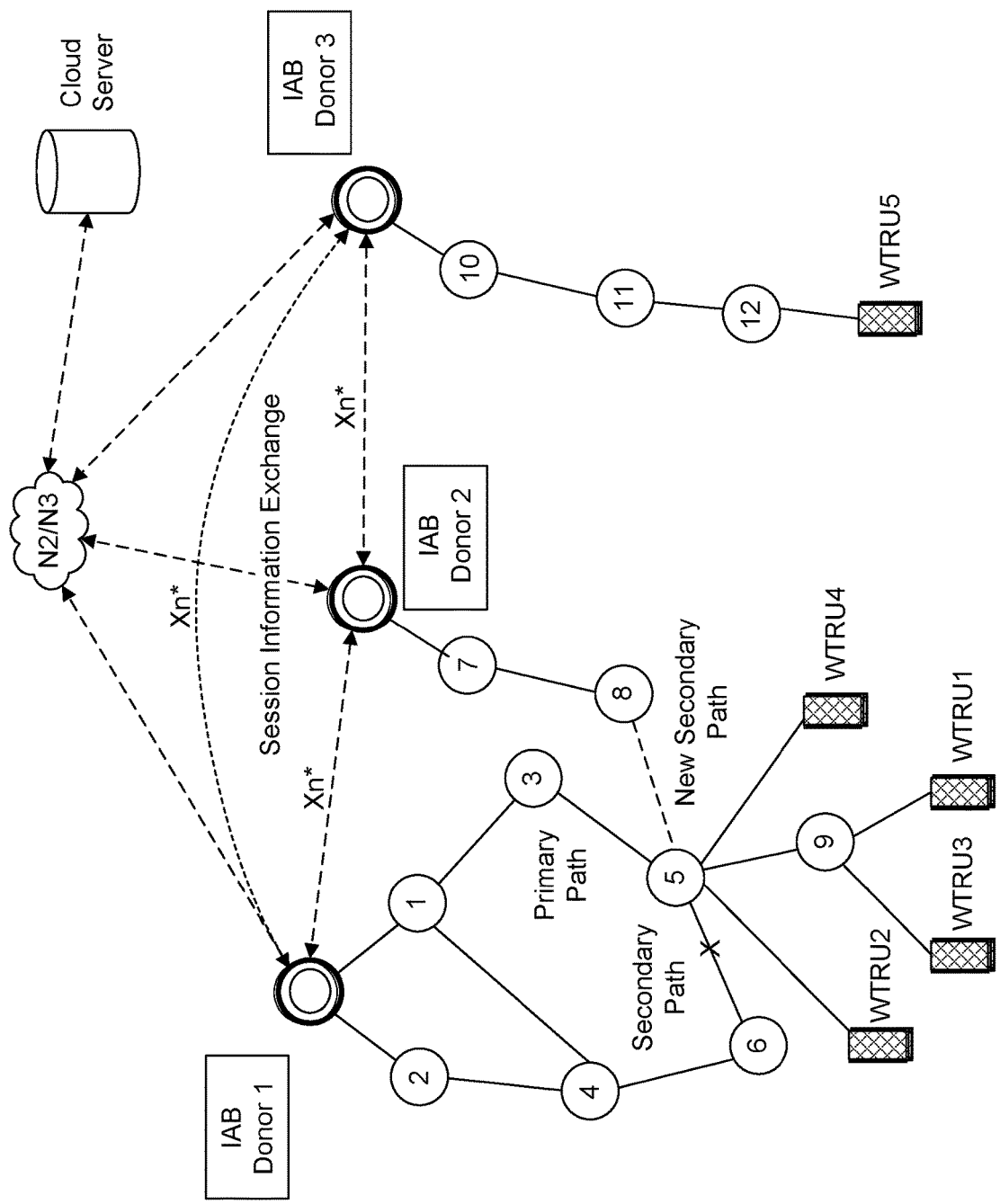
FIG. 12 illustrates an example of URLLC service over multiple different network IAB donor nodes.

FIG. 12 illustrates an example of URLLC service over multiple (e.g., two) different network IAB donor nodes. A (e.g., one) path (e.g., due to path degradation) may be switched to a new path over a new IAB donor node introducing inter-IAB donor node communications. A secondary backhaul path may be established to the new IAB donor node, which may act as a new second anchor node for backhaul communications.

FIG. 12 illustrates an example scenario where WTRUs (e.g., WTRU1-WTRU4) may be served URLLC communications by IAB donor node 1. One or more of the WTRUs may be served by the IAB node. The end point of the URLLC communications may be to another node outside of the IAB donor node network serving the WTRUs. For example, the end node for the URLLC communications may be WTRU5 (e.g., a virtual reality application) or the end node for the URLLC communications may be a remote cloud server.

The source IAB donor node may be an anchor for the communications to the IAB node. The traffic for the path being re-routed through the new IAB donor node may be channeled through the mutually shared Xn* interface, for example, if/when re-routing from an intra-IAB donor node configuration to an inter-IAB donor node configuration. The Xn* path hop latency may be eliminated, for example, to reduce delay and latency.

Following re-routing, the IAB node serving the URLLC communications of the WTRUs may be over multiple (e.g., two) IAB donor node paths that may be in different networks, with several example scenarios provided below.

In a first example scenario, multiple (e.g., two) IAB donor nodes serving the primary and secondary paths of the IAB node may independently receive traffic from the core network, which may avoid the additional routing delay through the Xn* interface for one path. For example, WTRU4 may be served by IAB donor node 1 and IAB donor node 2. IAB donor node 1 may (e.g., following rerouting) continue to be an anchor for traffic between the IAB node 8 and the newly established IAB donor node 2 path. In an example, WTRU4 may be interacting with the cloud server. The URLLC traffic anchor for the secondary path may move from IAB donor node 1 to IAB donor node 2. IAB donor node 2 may directly interact with the cloud server via the core network, which may avoid additional re-routing delay through the Xn* interface between IAB donor node 1 and IAB donor node 2.

In a second example scenario, a node may be in another IAB donor node network than the IAB donor node network serving the WTRUs. Multiple (e.g., two) communicating IAB donor nodes may be in different IAB donor networks. The delay over two Xn* interface hops for one path may be avoided. For example, WTRU4 may be served by IAB donor node 1 and IAB donor node 2. IAB donor node 1 may (e.g., following re-routing) continue to be an anchor for traffic between the IAB node 8 and IAB donor node 2 path. In an example, WTRU4 may be interacting with WTRU5 in another IAB network. The URLLC traffic anchor may move from IAB donor node 1 to IAB donor node 2. IAB donor node 2 may directly interact with IAB donor node 3, which may avoid the additional re-routing delay through the Xn* interface between IAB donor node 1 and IAB donor node 2.

In a third example scenario, an end node may be in a neighbor IAB roaming network, e.g., a private network or a network with a roaming arrangement with the network operating the IAB network serving the WTRUs. Traffic (e.g., in this scenario) may (e.g., need to) be routed through the core network. For example, WTRU4 may be served by IAB donor node 1 and IAB donor node 2. IAB donor node 1 may (e.g., following rerouting) continue to be an anchor for traffic between the IAB node 8 and the newly established IAB donor node 2 path. WTRU4 may be interacting with the cloud server with the neighbor network. The URLLC traffic anchor for the secondary path may move from IAB donor node 1 to IAB donor node 2. IAB donor node 2 may directly interact with the cloud server via the core network, which may avoid additional re-routing delay through the Xn* interface between IAB donor node 1 and IAB donor node 2.

The IAB donor node traffic steering, switching, splitting, and duplication anchor may be moved from the existing IAB donor node to a new anchor node (e.g., for one or more of the example scenarios). The RRC control anchor may be positioned, for example, at IAB donor node 2. Additional delay and latency may be avoided, for example, by avoiding the Xn* hop and transport of packets between the new IAB donor node and the originating IAB donor node (e.g., over the Xn* interface) to reach the node that is at the other end of a URLLC communications.

WTRU QoS flows that may benefit from being re-routed to a new anchor node for traffic steering, switching, splitting, and duplication may be identified, for example, based on the WTRUs being serviced by an IAB node and the various QoS flows being serviced by the IAB node. For example, the QoS flows that relate to low latency and real-time traffic, such as URLLC traffic, may benefit from an anchor node change.

In a reconfiguration process (e.g., as shown by example in FIGS. 10A-10C), an originating IAB donor node may make a determination that some of the QoS flows of served WTRUs may be re-mapped to a new anchor node. A reconfiguration may include a re-mapping of configuration information and routing of the anchor node (e.g., for traffic handling over the two paths) from the originating IAB donor node to an alternative node. Remapping and routing may depend on the specific scenario (e.g., as described herein). Reconfiguration may (e.g., also) establish a new control path for selected QoS flows of selected WTRUs between an IAB node suffering a link degradation and a new IAB donor node network, which may become the new control anchor for the backhaul traffic for the re-routed path. The result may be multiple (e.g., two) separate WTRU control paths (e.g., over different F1-C backhaul anchors for each path) for each of the (e.g., two) paths to (e.g., two) different IAB donor nodes. A configuration may (e.g., depending on the particular IAB architecture option and protocols) cause the WTRUs or the serving IAB node to handle multiple (e.g., two) concurrent and different RLC channel end points. An RLC state of WTRU QoS flows that may be (e.g., are being) moved to a new path (see, e.g., RRC configuration at S1040-S1050) may be reconfigured from the originating IAB donor node 1 to the new IAB donor node 2, which process may occur (e.g., seamlessly) for the WTRUs (e.g., without service disruption).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method, performed in a network node that is part of a first network having a first top node, the method comprising:
   upon determining link degradation in the first network:
   transmitting link degradation messages to neighbor nodes, the link degradation messages destined for the first top node and indicating request for path setup;
   receiving configuration information of a backhaul path, the backhaul path from the network node to a target network node;
   attaching, using the configuration information, to the target network node; and
   transmitting uplink (UL) data to the target network node.

2. The method of claim 1, wherein the first top node is a neighbor of a second top node of a second network and the target network node is part of the second network.

3. The method of claim 1, wherein the link degradation messages further include at least one of a request for duplication of downlink (DL) data to the network node and a request for buffering of the DL data.

4. The method of claim 3, further comprising:
   buffering UL data;
   receiving buffered DL data; and
   aligning the received buffered DL data with already received DL data, and wherein transmitting data comprises aligning UL buffered data.

5. The method of claim 1, further comprising:
   receiving configuration information for attaching to the target network node; and
   detaching from a parent network node.

6. The method of claim 1, wherein the network node is an Integrated Access and Backhaul, IAB, node and the first top node is an IAB donor node.

7. The method of claim 4, wherein the UL data is buffered in coordination with child nodes of the network node.

8. The method of claim 1, further comprising:
   receiving a configuration message comprising at least one channel quality parameter for determining an action to be taken on sending packets along a multi-hop path to a destination node and an aggregate channel quality across a multi-hop path to the destination node, and at least one timer value to be used to determine a link degradation;

determining an aggregate channel quality measurement based on channel quality measurements for the at least one configured channel quality parameter on the multi-hop path; and determining whether there is link degradation on the multi-hop path based on a comparison of the aggregate channel quality measurement with the at least one configured channel quality parameter and at least one timer value.

9. The method of claim 8, wherein determining an aggregate channel quality measurement comprises receiving channel quality measurements from at least one neighbor node.

10. The method of claim 8, further comprising, after determining link degradation on the multi-hop path, sending a measurement report to at least one neighbor node.

11. A network node comprising:
memory configured to store program code instructions; and
at least one hardware processor configured to execute the program code instructions to:
upon determining link degradation in a first network having a first top node and of which the network node is part:
transmit link degradation messages to neighbor nodes, the link degradation messages destined for the first top node and indicating request for path setup;
receive configuration information of a backhaul path, the backhaul path from the network node to a target network node;
attach, using the configuration information, to the target network node; and
transmit uplink (UL) data to the target network node.

12. The network node of claim 11, wherein the first top node is a neighbor of a second top node of a second network and the target network node is part of the second network.

13. The network node of claim 11, wherein the link degradation messages further include at least one of a request for duplication of downlink (DL) data to the network node and a request for buffering of the DL data.

14. The network node of claim 13, wherein the at least one hardware processor is configured to execute the program code instructions to
buffer UL data;
receive buffered DL data; and
align the received buffered DL data with already received DL data, and wherein transmitting data comprises aligning UL buffered data.

15. The network node of claim 11, wherein the at least one hardware processor is configured to execute the program code instructions to:
receive configuration information for attaching to the target network node; and
detach from a parent network node.

16. The network node of claim 11, wherein the network node includes an Integrated Access and Backhaul, IAB, node and the first top node includes an IAB donor node.

17. The network node of claim 14, wherein the UL data is buffered in coordination with child nodes of the network node.

18. The network node of claim 11, wherein the at least one hardware processor is configured to execute the program code instructions to:
receive a configuration message comprising at least one channel quality parameter for determining an action to be taken on sending packets along a multi-hop path to a destination node and for determining an aggregate channel quality across a multi-hop path to the destination node, and at least one timer value to be used to determine a link degradation;
determine an aggregate channel quality measurement based on channel quality measurements for the at least one configured channel quality parameter on the multi-hop path; and
determine whether there is link degradation on the multi-hop path based on a comparison of the aggregate channel quality measurement with the at least one configured channel quality parameter and at least one timer value.

19. The network node of claim 18, wherein determine an aggregate channel quality measurement comprises receiving channel quality measurements from at least one neighbor node.

20. The network node of claim 18, wherein the at least one hardware processor is configured to execute the program code instructions to, after determining link degradation on the multi-hop path, send a measurement report to at least one neighbor node.

* * * * *